(12) United States Patent
Delson et al.

(10) Patent No.: US 6,307,285 B1
(45) Date of Patent: Oct. 23, 2001

(54) ACTUATOR WITH REPULSIVE MAGNETIC FORCES

(75) Inventors: Nathan J. Delson, Branford, CT (US); John S Houston, New York, NY (US)

(73) Assignee: Coactive Drive Corporation, Del Mar, CA (US)

( * ) Notice: Subject to any disclaimer, the term of this patent is extended or adjusted under 35 U.S.C. 154(b) by 0 days.

(21) Appl. No.: 09/707,220

(22) Filed: Nov. 6, 2000

Related U.S. Application Data

(62) Division of application No. 09/350,782, filed on Jul. 9, 1999, now Pat. No. 6,147,422, which is a division of application No. 08/932,741, filed on Sep. 17, 1997, now Pat. No. 6,002,184.

(51) Int. Cl.[7] ............................. H02K 41/00; G06F 17/00
(52) U.S. Cl. ........................... 310/14; 273/148 R; 341/20
(58) Field of Search ................................ 310/12, 13, 14, 310/17, 23, 28, 75 R, 112; 273/148 R; 341/20; 901/2, 15; 74/471 R

(56) References Cited

U.S. PATENT DOCUMENTS

| 4,689,538 | 8/1987 | Sakaguchi et al. | 318/568 |
|---|---|---|---|
| 4,853,630 | 8/1989 | Houston | 324/208 |
| 4,928,028 | 5/1990 | Leibovich | 310/23 |
| 5,168,221 | 12/1992 | Houston | 324/207.13 |
| 5,281,899 | 1/1994 | Culp | 318/116 |
| 5,825,308 | 10/1998 | Rosenerg | 341/20 |
| 6,002,184 | 1/1999 | Delson et al. | 310/14 |

OTHER PUBLICATIONS

B. Lesquesne, "Fast–Acting Long–Stroke Bistable Solenoids with Moving Permanent Magnets," May/Jun. 1990, pp. 401–407, IEEE Transactions on Industry Applications.

K. Nagaya and M. Sugiura, "A Method for Obtaining a Linear Spring for a Permanent Magnet Levitation System Using Electromagnetic Control," May 1995, pp. 2332–2338, IEEE Transactions on Magnetics.

T. Shinshi, "Noncontact Precision Positioning By Electromagnetic Actuators," 1996, (month unknown) pp. 1151–1157, ASME Japan/USA Symposium on Flexible Automation.

E.D. Fasse, N. Hogan, S.R. Gomez, and N.R. Mehta, "A Novel Variable Mechanical–Impedance Electromechanical Actuator," 1994, pp. 311–318, ASME Winter Annual Meeting, Dynamic Systems and Control. (month unknown).

(List continued on next page.)

Primary Examiner—Nestor Ramirez
Assistant Examiner—Judson H. Jones
(74) Attorney, Agent, or Firm—Steven J. Weissburg

(57) ABSTRACT

A new class of actuators and mechanisms use opposing repulsive magnetic forces. The repulsive forces are typically generated between a stationary magnet and a moving magnet, where the moving magnet is coupled to the mechanism output member. The mechanisms are generally configured such that the repulsive force from one electromagnet is opposed by a repulsive force from another electromagnet, where the opposing forces are simultaneously applied to the mechanism's output member. This configuration is similar in certain aspects to the way biological flexor and extensor muscles are configured in a musculoskeletal system. The opposing configuration allows for open loop control of position and stiffness. The actuator mechanism may have both rotary and linear motion output, and may have either a single degree of freedom or multiple degrees of freedom. Permanent magnets can be used to create a baseline repulsive force without electric power, and electromagnets can modulate the repulsive force magnitude. The actuator can provide high fidelity motion and force output, and is well suited for human interface devices, such as force feedback joysticks. Other applications include adjustable stiffness devices, and high bandwidth mechanisms.

17 Claims, 39 Drawing Sheets

⊙ - current coming out of page
⊗ - current going into page

OTHER PUBLICATIONS

H.M. Paynter, "Low–Cost Pneumatic Arthrobots Powered by Tug–&–Twist Polymer Actuators," 1996, pp. 107–110, ASME Japan/USA Symposium on Flexible Automation. (month unknown).

E. Bizzi, W. Chapple, and N. Hogan, "Mechanical Properties of Muscles," 1982, pp. 395–398, Trends in NeuroSciences. (month unknown).

Allen Fox, "Review: Microsoft SideWinder Force Feedback Pro," Aug. 29, 1997, GamerzEdge.

Dr. Louis B. Rosenberg, "A Force Feedback Programming Primer," 1997, pp. 35–42, Immersion Corporation. (month unknown).

"Microsoft Force Feedback Pro Technical Backgrounder," prior to Sep. 17, 1997.

Hannes Blueler, "A Survey of Magnetic Levitation and Magnetic Bearing Types," 1992, pp. 335–342, JSME International Journal. (month unknown).

K. Nagaya and N. Arai, "Analysis of a Permanent Magnet Levitation Actuator with Electromagnetic Control," 9/91, pp. 472–478, Transactions of the ASME.

G.C. Burdea, "Force and Touch Feedback for Virtual Reality," 1996, pp. 41–74, 82–87, 104–109, and 199–223. (month unknown).

⊙ - current coming out of page
⊗ - current going into page

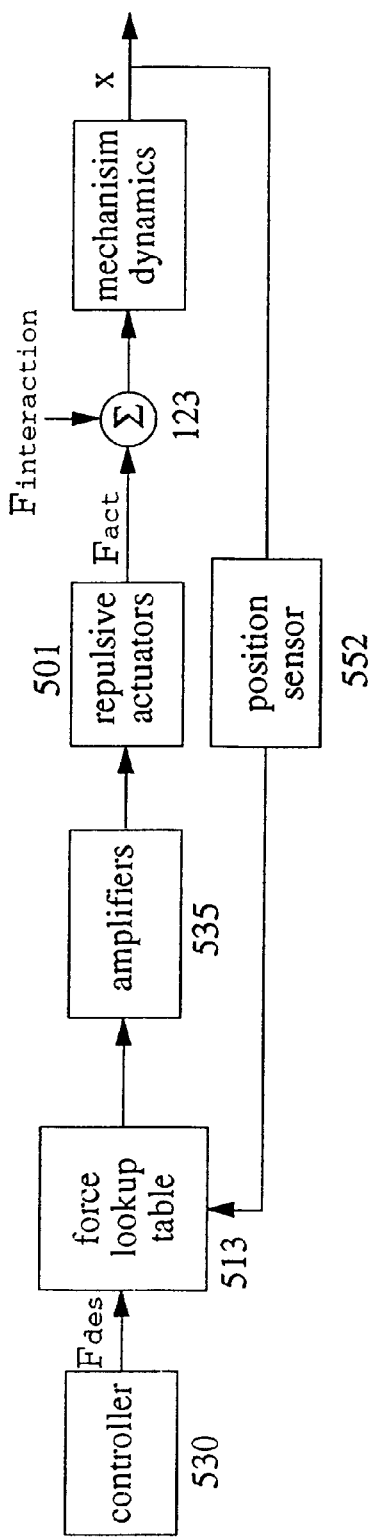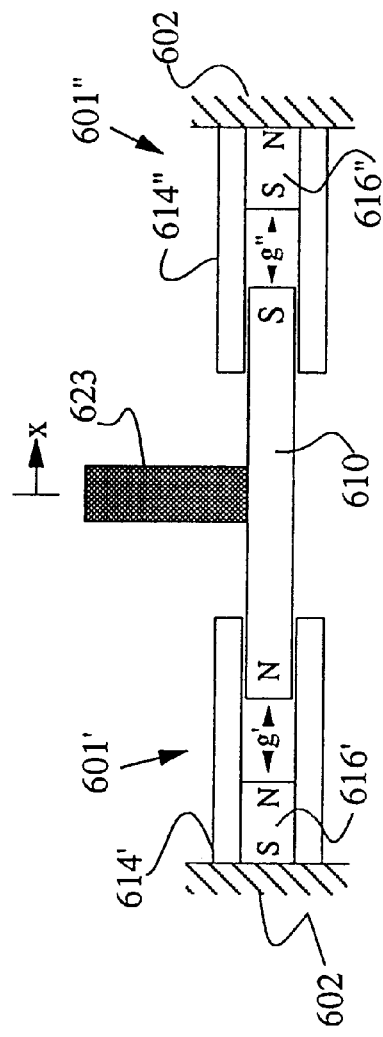
Fig. 24
Fig. 25

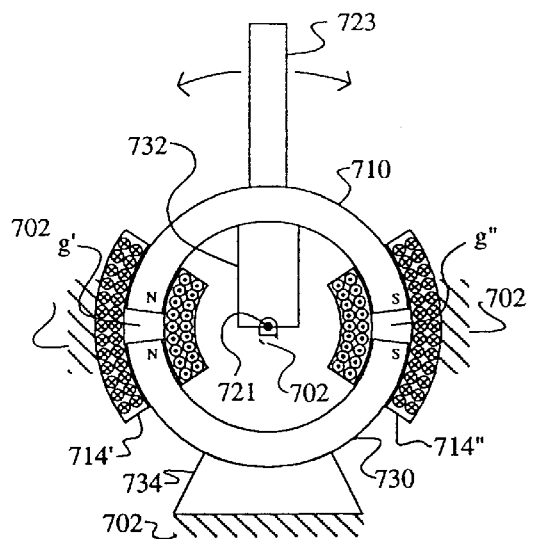
⊙ - current coming out of page
⊗ - current going into page
Figure 26
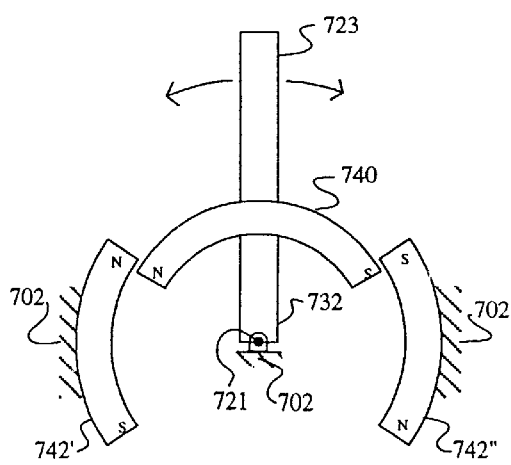
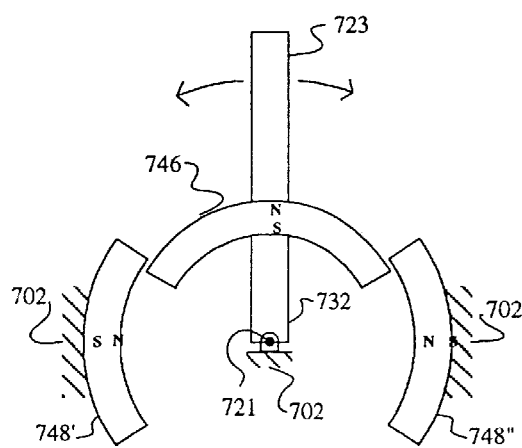
Figure 27A
Figure 27B

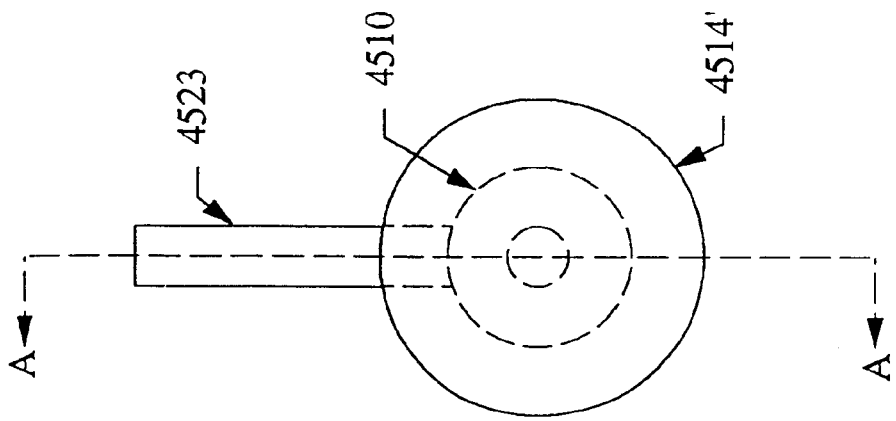
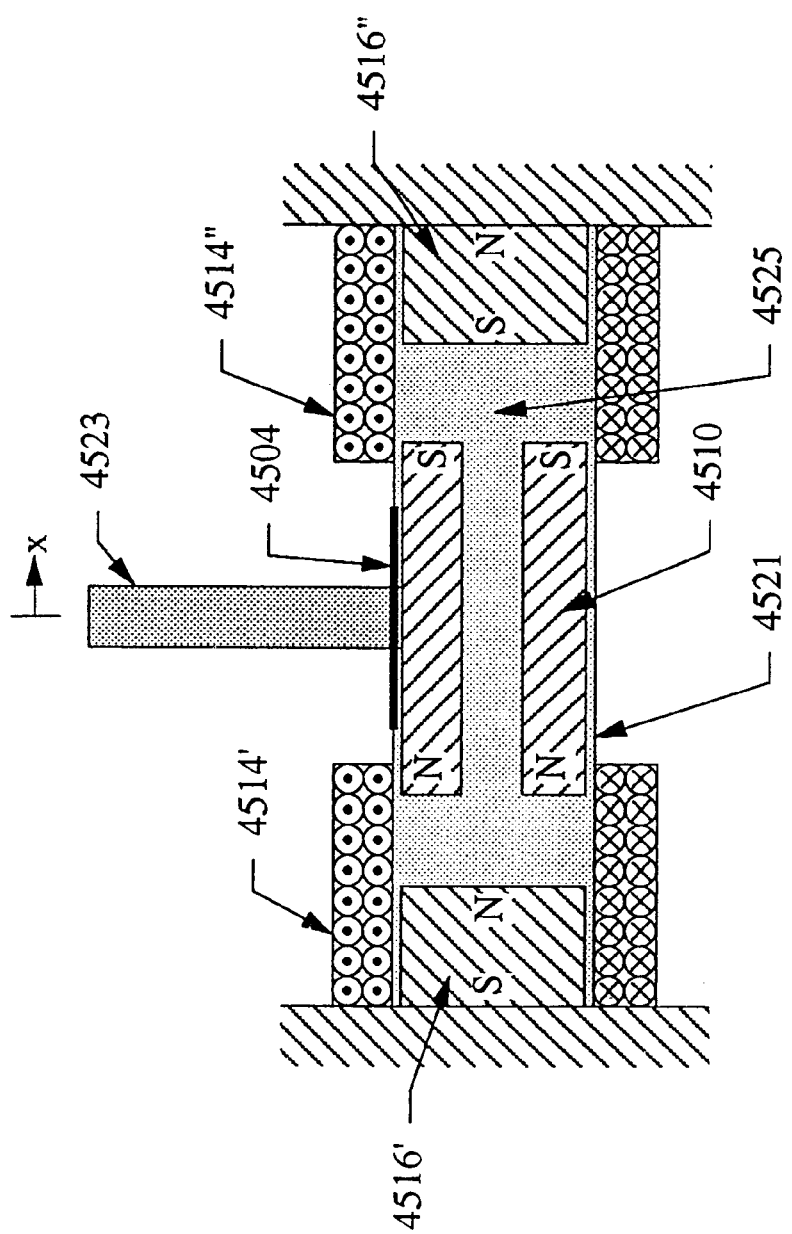
Fig. 45B
Fig. 45A

ACTUATOR WITH REPULSIVE MAGNETIC FORCES

RELATED DOCUMENTS

This application is a divisional of application Ser. No. 09/350,782, filed on Jul. 9, 1999, now U.S. Pat. No. 6,147,422, which is, a divisional of application Ser. No. 08/932,741, filed on Sep. 17, 1997, now U.S. Pat. No. 6,002,184.

BACKGROUND

This invention relates to actuators and mechanisms which can generate motion and force output. It relates more specifically to devices that use electromagnetic forces to generate actuator output. It relates to computer operated machines. It relates to machines that act as an interface between a human user and machines of all types, including computers and machine tools.

This invention relates to computer controlled machines, where a computer specifies the desired performance of a mechanism. The computer may use sensor feedback, where sensor measurement of a mechanism is used by the computer to control the mechanism. A computer may also use sensor-less, or open-loop control, where the computer controls the mechanism without sensor feedback. One such control method is open-loop stiffness control, where the stiffness of a mechanism is specified, without sensor measurement of force applied to or position of the mechanism.

Computer controlled mechanism have a wide variety of applications, including robotics, automatic machining, consumer products, and medical devices. In lieu of a computer control, actuators can be controlled from simple controllers, signals from other mechanisms, or directly by humans (or even animals).

A specific application of this invention is for actuated human interface devices. Many machines are controlled, either directly or indirectly, by a human operator. The interface through which the operator controls the machine and receives information from the machine should be as easy to use as possible. The user may input commands to, receive information from, and otherwise interact with such machines through various devices, such as a lever, joystick, foot pedal, mouse (having buttons and a tracking mechanism), exoskeleton, keyboard, touch screen, digitized pad or tablet, head mouse, haptic force reflecting mechanism, etc. In general the component that the user physically touches is referred to as an "interface member."

In certain instances it is desirable that the interface device be actuated so that forces can be applied by the mechanism onto the user. A system that accomplishes this is sometimes referred to as a "force reflecting" system or a "haptic" interface, because it relates to the human system of touch.

An actuated interface device can function as both an input and output device. The user may input signals into a computer by manipulating the interface device, and the computer may output signals by imparting force and motion onto the user through the interface device. Thus, an interface member may also be referred to as an output device, or a display, etc. The format of the input and output signals can be in terms of force and torque, and position and rotation (and their time derivatives including velocity and acceleration).

Force reflecting interfaces are surveyed and described in general by Burdea, Grigore, in *Force and Touch Feedback For Virtual Reality,* John Wiley & Sons, Inc., New York (1996).

One use of actuated human interface devices is for telepresence and in teleoperated systems. Telepresence is when a person or teleoperator uses technology to mediate interactions with a remote physical environment. In the master/slave configuration, the user manipulates a "master" input device in the user's local environment. There may be a "slave" robot, typically in a different, non-local environment, which moves in accordance to the user's manipulations. The configuration of the master device may or may not conform to some degree to the conformation of the slave device. Teleoperation is useful in applications where direct interactions might be impossible because of physical conditions which are hazardous to humans, for example working with radioactive waste, or working in an underwater environment a mile deep. Other physically impossible conditions might be related to physical scale, such as nanomanipulation of a molecule, or the macromanipulation of an enormous crane. An example of telepresence is remote surgery, in which a surgeon uses a force-feedback scalpel at one location connected to a robotic scalpel in a surgical suite at another location. The surgeon's locally generated forces are transmitted to a remote actuator, and the remote forces generated by that actuator in contact with the patient are "fed back" to the surgeon's hand held scalpel, creating an effective, telemanipulative operation.

Another application of actuated human interface devices is "virtual presence." In virtual presence human operators control and interact with "virtual" machines and environments, which are not physical, but rather are "embodied" or reside in a computer model. A virtual environment relates to an environment that bears some mapping to an actual physical instance of the environment. For instance, a computer representation of a real slave environment is considered herein to be a virtual environment that corresponds to the physical slave environment. Virtual presence may also be used for semi-autonomous control of interaction with physical objects. This might occur when communications lag time between a person and the remote environment is too long, such as when operating a remote device on the planet Mars.

One objective of an actuated interface is to increase the realism of human interaction with virtual representation of objects by expanding the scope of human sensation and perception to include physical characteristics such as interaction forces with an object; and for movable objects; heft and inertia. This increase in realism allows humans to perform tasks better by leveraging human motor skills, and a heightened experience related to the interaction.

Actuated interface devices can be used to convey general information to the user. The force interactions may not necessarily correspond to a remote slave environment, or to a virtual environment mapped from a physical environment. For example a force interaction may be used to indicate the misspelling of a word in a word processing program. Actuated interface devices may also be used in computer games, by providing force-feedback to the users.

This invention also relates to actuators and mechanisms with numerous Degrees of Freedom (DOF). Each rigid body may have up to six DOF including translation and rotation. Moreover, the interface mechanisms may have numerous rigid members or flexible members. Thus, the overall number of DOF of such a mechanism may be greater than six. For example a master arm may have a hand portion, with several fingers, each with several joints.

For actuators in general, and especially for actuated interface mechanisms, high fidelity is often an important design consideration. A high fidelity actuator will have an output that is as close as possible to the desired output. The fidelity of the output relates to both accuracy in magnitude and in timing. Accordingly, a high fidelity mechanism will have a high bandwidth, and a minimum time delay from the instance that an output is desired and when the actuator responds. To achieve a high fidelity in the magnitude of the output it is desirable to minimize detrimental friction and backlash, which are often inherent in systems with transmissions between the actuators and the interface member.

Much of the engineering design effort related to force-feedback has centered on reducing the costs of present force-feedback input devices and development of software for authoring haptic cues, rather than basic force-feedback actuator design. Many present force-feedback input device rely on traditional motor actuators and closed-loop control, despite their many limitations, such as backlash and limited bandwidth. Therefore, there is a need for a high fidelity, robust, and low-cost actuator for use in these applications.

Known actuators meet many current needs. Most known mechanisms actuate a single DOF with a single powered actuator. However, many of the limbs of humans and animals function by a balancing between two opposed actuators (flexor and extensor muscles), which can be energized independently or simultaneously. Moreover, the forces generated by human and animal muscle vary depending on the length of muscle extension. Conversely, many mechanical actuators are designed to generate a force output that remains constant despite variations in the actuator's position.

Some known devices are similar to biological muscles in that they incorporate actuators whose output is a function of position, in a configuration that balances two opposed actuators. For example the pneumatic actuators described by H. M. Paynter "Low-Cost Pneumatic Arthrobots Powered By Tug-&-Twist Polymer Actuators" Japan/USA Symposium on Flexible Automation, Volume 1 pp. 107–110, July 1996, achieve the biological advantage of simplified control of position. However these systems use pneumatic power, which has the disadvantage that they require a source of pressurized fluid or gas which makes the size of the device large and noisy, and thereby unsuitable for many environments.

Known devices that use a single actuator for each DOF can operate under a control scheme that controls the stiffness, the position, or both of the device. However, most such devices require position sensors, and then perform calculations based on the measured position of the device. Thus, they use closed loop position and/or stiffness controllers. Often the computational time necessary to operate such closed loop stiffness or position control renders the device sluggish, or unrealistic in feel, given the typical computational limitations of computers available for common applications. Thus, the bandwidth of stiffness control is rather low. Further, instability in the control can arise if the lag in the control loop is too great, causing loss of control. For many actuated user interface mechanisms, low bandwidth degrades the quality of the device, and the computation time of the feedback loop is a limiting factor in system performance (see Burdea chapter 8, cited above).

Many mechanisms and actuated user interfaces require performance tradeoffs to achieve the desired magnitude of force or torque output. Often such systems use rotating electric motors as the power source. The torque output of an electric motor is proportional to the diameter of the rotor, and thus high torque motors have a very large diameter. In many actuator applications, a high force or torque is required to be applied at a low speed, and over a limited range of motion. To achieve a high level of torque while avoiding the cost of a large electric motor, a small motor is often operated at a high speed and coupled to a transmission that increases the torque while reducing the speed. However, transmissions typically have disadvantages that degrade the system performance of controlling position, force, and stiffness. Geared transmissions have backlash due to gaps between the meshing gear teeth. When the motor reverses direction, the transmission output does not respond until the gear gap is closed, which results in a lag in the response and rough performance. Other types of transmissions use cables, yet these systems have disadvantages of cable stretch and need adjustment to remove cable slack to avoid backlash. Novel and expensive actuators have been designed for user input devices, in part to avoid the use of transmissions, see Burdea cited above.

Many actuators and mechanisms have a limited amount of travel, such as a given distance for linear actuators and a given amount of rotation for rotating actuators. When the actuator or mechanism reaches the end of its travel, it often contacts a mechanical stop. The impact force with the mechanical stop can damage the actuator and mechanism. In addition, if a device is a user input device, then hitting the stop can abruptly change the device sensation in an undesirable fashion. If the maximum actuator force near the limits of travel is not sufficiently large, then hitting the mechanical stops can occur frequently. Accordingly, to avoid detrimental contact with the travel limit it is desirable to have a large actuator force near the travel limit.

In many systems with rotary motors, the motors themselves do not have mechanical stops, but they are coupled to an output member that does have a limited range of motion. In such systems the motor force typically remains constant over the complete range of travel. Since the actuator force does not increase near the limits of travel, hitting mechanical stops may occur frequently. Increasing the overall force generated by the motor may be inefficient, since large forces may only be required near the limits of travel.

Another disadvantage of using rotary motors, is that it can be difficult to build compact multi-degree of freedom systems. Rotary actuators are often combined in series when building multi-degree of freedom mechanisms. In a series configuration, the motors closer to the base reference move both the mechanism linkages and the motors that are farther from the base. Since the base motors must move the weight of other motors, their power requirements and size are large. Cable systems are sometime introduced to place the motors in a stationary location. However, as the number of degrees of freedom increase, the cable routing can become very complex. Accordingly, there is a need for actuators that can be configured in compact multi-degree of freedom mechanisms.

One possible approach to building compact multi-degree of freedom mechanisms is to use actuators that generate linear motion, and combine them in a parallel fashion. Thereby, the weight of the actuators is not directly applied to other actuators, and smaller actuators can be used. Thus it is advantageous to have compact linear actuators. However, most electric powered actuators are rotary.

For many computer input devices, it is desirable that the interface device return to a set point, or home position, when the user releases the interface member. A computer input device that has force feedback capabilities, can be programmed to return to a set point. However, if the force feedback actuators expend energy in return-to-set-point operations, then the device may overheat, since the return-to-set-point occurs frequently. In addition, when the force feedback device is in a retail sales display, where there is no electric power, it is desirable that potential customers can feel a return-to-set-point behavior. Accordingly, it is advantageous that the actuator for a force feedback computer input device be able to return the device to a set point position without the expenditure of energy.

A known method of returning a computer input device to set point is to use mechanical springs. This method does not expend energy, yet it has disadvantages. In a force feedback device, the actuators would have to overcome the spring force to generate the desired output force. Moreover, in order to prevent a loose spring, the springs are often pre-tensioned such that a user must overcome a threshold force before the interface member begins to move. This configuration hinders the user from imparting high precision, low force level inputs. Moreover, the threshold force may impart a directional preference in multi-degree of freedom devices that hinders the user from imparting their desired direction of input. The spring preload can also increase the friction in the system, further hindering high precision user input.

Known mechanisms are often deliberately built with specific degrees of compliance (i.e. springiness). For example, the shock absorbers in an automobile absorb variations in road surface, and a robot gripper may be designed with specific degrees of compliance to accommodate misalignments in the parts being assembled. The degrees of compliance are often fine tuned to achieve the desired performance of the mechanism, including the natural frequency of the mechanism and the level of forces applied by the mechanism. Typically the compliance in these devices are determined by the material properties of the materials and springs used. In such mechanisms, changing the compliance level requires a mechanical change to the mechanism.

When the conditions of operation change it may be desirable to change the compliance of a mechanism. For example when a robot arm experiences high accelerations it may be desirable to increase the stiffness in the gripper to avoid undesirable vibrations and perturbations. However, when the robot arm slows down to perform fine motion during assembly, a higher level of springiness in the gripper may be desirable to enable the robot gripper to accommodate part misalignment. Moreover, different levels of compliance may de desired for different parts being assembled. If the compliance is generated from mechanical springs, then modifying the mechanism compliance requires changing the mechanical configuration, which is complex and requires additional actuators. Accordingly, there is a need for a simple method to modify the compliance of a mechanism, such as with electronic control.

Thus one of the objectives of the invention includes an actuated mechanism that can be controlled with electrical power, yet incorporates some of the advantages of biological musculoskeletal systems. It is also an objective to provide passive stability, and the ability for open loop position and stiffness control, which would facilitate high bandwidth performance. Another objective of the invention is to facilitate an actuated human interface device, with a high fidelity position and torque or force signal provided to the user. Another objective is to provide an interface that can generate a large output force or torque in a compact configuration, without the use of geared or cable transmissions and thereby avoid backlash and friction in the system. It is also an objective to generate large forces near the limits of travel without increasing the overall size of the actuator, thereby minimizing or preventing impacts with any mechanical stops of the mechanism. It is also advantageous to provide actuators that can be configured as a multi-degree of freedom mechanism in a compact manner by using linear actuators in parallel configurations. It is further an object to provide such a mechanism that automatically returns to a set-point without expending power. Another object of the invention is to control stiffness of the actuators electrically, so that mechanism compliance and natural frequency can be adjusted, without mechanically changing the apparatus.

Accordingly, for the foregoing reasons, there is a need for an actuator that can provide position and stiffness control without sensors for either, and which provides a stable set point even in the absence of power to the device, and can otherwise achieve the objectives identified above.

SUMMARY

There are many aspects of the present invention, due to its pioneer nature. The devices described herein are a class of actuators and mechanisms that use repulsive magnetic forces. The repulsive force is typically generated between a stationary magnet and a moving magnet, where the moving magnet is attached to the mechanism output member. The mechanisms are generally configured such that the repulsive force from one electromagnet is opposed by a repulsive force from another electromagnet, where the opposing forces are applied to the mechanisms output member. This configuration is similar in certain aspects to the way biological flexor and extensor muscles are configured in a musculoskeletal system. The opposing configuration allows for open loop control of position and stiffness. The actuator mechanism may have both rotary and linear motion output, and may have either a single degree of freedom (DOF) or multiple degrees of freedom. Permanent magnets can be used to create a baseline repulsive force without electric power, and electromagnets can modulate the repulsive force magnitude. The actuator can provide high fidelity motion and force output, and is well suited for human interface devices, such as force feedback joysticks. Other applications include adjustable stiffness devices, and high bandwidth mechanisms.

Two repulsive electromagnetic actuators can be linked together in a way that motion in one increases the repulsive force in the other. The two actuator configuration for a single degree of freedom provides additional features, such as passive stability, open loop position and stiffness control, force control using a position sensor, an automatic return to a set point, and similarity to human muscular actions. Additional pairs of actuators can be associated together to actuate additional degrees of freedom, such that all of the degrees of freedom of an interface or effector can be actuated using repulsive actuator pairs.

It is possible to build a multi-DOF mechanism with twice as many repulsive actuators as DOFS. Such mechanisms allow open loop control of position and stiffness in each DOF. However, it is also possible to reduce the number of actuators in a mechanism. Rather than having a pair of actuators for each actuated degree of freedom, it is possible to use N+1 actuators to actuate N degrees of freedom. Further, when actuator pairs are used, one of the actuators of a pair can be replaced by a spring, or other energy storage device such as a weight subject to gravity. As the number of actuators in a mechanism decrease, the ability to independently control position and stiffness in the different DOF diminishes. The actuators can be used as a display of position and force, an interface device, output type devices, or as part of a robot or end-effector.

Certain aspects of the invention may be summarized as follows, in parallel with the appended claims.

According to a preferred embodiment of the apparatus of the invention, an actuator has an electromagnet, fixed relative to a reference body, a second magnet, movable relative to the reference body and a third magnet, fixed relative to the reference body and oriented relative to the second magnet such that magnetic repulsion arises between the second and third magnets. A travel guide is arranged to constrain motion of the second magnet relative to the reference body, so that the second magnet is movable relative to the travel guide and so that magnetic repulsion between the second and third magnets is maintained non-zero. The electromagnet is shaped and spaced relative to the second and third magnets to generate a magnetic field that counters any magnetic repulsion that arises between the second and third magnets if current is applied to the electromagnet in a first direction and enhances any magnetic repulsion that arises between the second and third magnets if current is applied to the electromagnet in a second, opposite direction. One of the electromagnet and the second magnet has an internal open space, sized and arranged relative to the other of the electromagnet and the second magnet, such that a portion of the other of the electromagnet and the second magnet is locatable inside the internal open space. The internal open space may be circular.

According to another preferred embodiment of this aspect of the apparatus of the invention, there may further be a fourth magnet, movable relative to the reference body, the fourth magnet being spaced from the second magnet and arranged such that magnetic repulsion arises between the second and fourth magnets. The fourth magnet is constrained in its motion so that the magnetic repulsion between the second and fourth magnets is maintained non-zero.

According to another preferred embodiment of the apparatus of the invention, there is an electromagnet and a movable second magnet, and a third fixed magnet, arranged as above such that magnetic repulsion arises between the second and third magnets. This embodiment also has a fourth magnet, movable relative to the reference body and the second magnet and oriented relative to the second magnet such that magnetic repulsion arises between the second and fourth magnets. A travel guide is arranged to constrain motion of the second and fourth magnets relative to the reference body, so that the second and fourth magnets are movable relative to the travel guide and so that magnetic repulsion between the second and third magnets and between the second and fourth magnets is maintained non-zero. The electromagnet is shaped and located relative to the first, second and fourth magnets to generate a magnetic field that counters any magnetic repulsion that arises between the second and third magnets if current is applied to the electromagnet in a first direction. The magnetic field also enhances any magnetic repulsion that arises between the second and third magnets if current is applied to the electromagnet in a second, opposite direction. This embodiment does not necessarily have one or the other of the electromagnet and the moving magnet fit within the other.

According to another preferred embodiment, the electromagnet may be fixed relative to the reference, and located between the third and the second magnets.

According to yet another preferred embodiment, the actuator may further comprise a fifth magnet, which is also an electromagnet, that is fixed relative to one of the movable second and fourth magnets, and is located between the fourth and the second magnets, to generate a magnetic field that counters any magnetic repulsion that arises between the second and fourth magnets if current is applied to the electromagnet in a first direction and enhances any magnetic repulsion that arises between the second and fourth magnets if current is applied to the electromagnet in a second, opposite direction.

According to still another preferred embodiment the apparatus of the invention has at least one electromagnet, a second magnet, movable relative to a reference body, a third magnet, fixed relative to the reference body and oriented relative to the second magnet such that magnetic repulsion arises between the second and third magnets, and a fourth magnet, movable relative to the reference body and the second magnet and oriented relative to the second magnet such that magnetic repulsion arises between the second and fourth magnets. A travel guide is arranged to constrain motion of the second and fourth magnets relative to the reference body, so that the second and fourth magnets are movable relative to the travel guide and so that magnetic repulsion between the second and third magnets and between the second and fourth magnets is maintained non-zero. A current director controls the flow of current to the electromagnet based on the location of the second magnet relative to the reference body. The electromagnet is shaped and located relative to the first, second and fourth magnets to generate a magnetic field that: counters any magnetic repulsion that arises between the second and fourth magnets if current is applied to the electromagnet in a first direction; and enhances any magnetic repulsion that arises between the second and fourth magnets if current is applied to the electromagnet in a second, opposite direction.

The current director may be a sliding electrical contact between the second magnet and the travel guide.

According to another preferred embodiment, the apparatus of the invention is an actuator unit having an interface member and a first actuator, coupled to the interface member, arranged to perform work on the interface member, the work arising from magnetic repulsion. The unit also has a force generator, also coupled to the interface member, arranged to perform work on the interface member simultaneously with performance of the work on the interface member by the first actuator. The first actuator and the force generator are arranged in opposition.

The work performed by the first actuator on the interface member may arise from the application of force, torque or both.

The force generator may be another actuator, whose work arises from magnetic repulsion, or it may be any other type of actuator, or a passive energy storage device, such as a spring, or a mass in a gravitational field.

According to yet another preferred aspect of this embodiment of the invention, the first actuator of the unit includes a first magnet that is fixed relative to a reference, and a second magnet that is movable relative to the reference, one of the fixed and movable magnets comprising an electromagnet. The other of the magnets may be a permanent magnet. The actuator unit may have the movable magnet as a permanent magnet, the fixed magnet as an electromagnet, the first actuator further comprising a third magnet, which is fixed relative to the reference, and which is arranged to establish magnetic repulsion with the movable second magnet. Like the embodiment first discussed above, the electromagnet is arranged to generate a magnetic field that counters the magnetic repulsion that arises between the second and third magnets if current is applied to the electromagnet in a first direction; and enhances the magnetic repulsion that arises between the second and third magnets if current is applied to the electromagnet in a second, opposite direction.

The gap closure between the moving and stationary magnets of any of the embodiments discussed may be direct, or tangential.

The interface member may be free to translate or rotate through at least one DOF.

According to still another preferred embodiment, if the force generator is a second actuator, with work performed by this second actuator arising from magnetic repulsion, both of the actuators can include an electromagnet. The apparatus may then further comprise circuitry for delivering a different current signal to each of the electromagnets.

In the case of still another preferred embodiment, where the force generator is a second actuator, and each of the first and second actuators has a first magnet that is fixed relative to a reference, and a second magnet that is movable relative to the reference, one of the fixed and movable magnets comprising an electromagnet, the movable magnet of the first actuator and the movable magnet of the second actuator may be the same magnet, which is thus shared by both actuators. This shared movable magnet may be either an electromagnet or a permanent magnet.

According to yet another preferred embodiment, there can be in the actuator, an additional movable magnet, movable relative to the reference. The additional movable magnet is spaced from the movable second magnet and is arranged such that magnetic repulsion arises between the movable second magnet and the additional movable magnet.

According to all of the embodiments of the actuator unit already discussed, the work performed by the first actuator and the force generator may arise from a force applied by each to the interface member, and the forces may be substantially colinear, or not.

According to a three element embodiment of the invention, the force generator may itself again be a second actuator, and there may further be a third element, ie. a second force generator, also coupled to the interface member, arranged to perform work on the interface member simultaneously with performance of work on the interface member by the first and second actuators. The second force generator is arranged in opposition. This second force generator may be a repulsive magnetic actuator, or another type of actuator, or a passive energy storage device, as discussed above.

With still another preferred embodiment of this aspect, the apparatus of the invention has the first and second actuators arranged such that any work performed by them causes motion of the interface member with respect to a first DOF. The second force generator is arranged such that any work performed by it causes motion of the interface member with respect to a second DOF.

This second force generator may itself be a third actuator, and the actuator unit may further comprise a third force generator, also coupled to the interface member, arranged to perform work on the interface member simultaneously with performace of work on the interface member by the first, second and third actuators, the fourth actuator being arranged in opposition.

The third force generator may be arranged such that any work performd by the third force generator causes motion of the interface member with respect to a third DOF.

According to some preferred embodiments, any work performed by the first actuator and the force generator cause motion of the interface member with respect to a first DOF. The actuator unit may further include a second pair of actuator and force generator, described as the first pair, also in opposition, such that work done by the actuator and the force generator of the second pair causes motion of the interface member with respect to a second DOF.

According to this embodiment, the actuator unit may further include a third pair of actuator and force generator, described as the first pair, also in opposition, such that work done by the third pair of actuator and force generator causes motion of the interface member with respect to a third DOF. Any of the force generators may be repulsive magnetic actuators, as described above, other forms of actuators, or energy storage devices.

Another preferred, significant embodiment of the invention, is a two DOF actuator assembly. It includes an interface member and two actuator units. Each has two force generators, each force generator being coupled to the interface member such that each force generator performs work on the interface member, each of the force generators being in opposition, any work performed by the force generators causing motion of the interface member with respect to a DOF for each actuator unit. One of the force generators of each actuator unit comprises an actuator, with the work performed by the actuator arising from magnetic repulsion.

With any of the preferred embodiments discussed above, the interface member may be advantageously sized and shaped to engage with a human scale body member selected from the group consisting of finger, hand, arm, head, tongue, mouth, foot, leg, buttocks and torso.

According to still a different preferred embodiment, the apparatus of the invention is an actuator unit comprising an interface member, a first actuator, coupled to the interface member and a force generator also coupled to the interface member. The first actuator is arranged to apply force to the interface member that urges the interface member to move in a first direction, the force arising from magnetic repulsion. The force generator is arranged to apply force to the interface member simultaneously with application of force to the interface member by the first actuator, the force generator force urging the interface member to move in a second direction, having a component opposite to the first direction.

The motion may be a translation relative to a reference or rotation around a reference point.

According to similar preferred embodiments, the actuator and force generators apply a torque to the interface member.

According to other important aspects, the apparatus of the invention includes control apparati. For instance, there would typically be a current supply for delivering current to the electromagnet at a level that corresponds to a preselected position of the interface member with respect to the reference. Rather than corresponding to a position, the current may correspond to a stiffness sought to be imparted to the interface member.

According to one preferred embodiment, the apparatus of the invention also includes a signal generator that specifies the preselected position or stiffness, a lookup table that correlates the preselected position or stiffness to a current level for the electromagnet, coupled to the signal generator; and a current amplifier that generates current supplied to the electromagnet at a level based on a correlation from the lookup table to a corresponding preselected position or stiffness from the signal generator.

Rather than specifying position or stiffness alone, other important embodiments of the invention specify a combination of position and stiffness. Further, rather than using a lookup table to correlate the preselected position and/or stiffness to current, a processor may perform the correlation by processing an appropriate algorithm.

Another preferred embodiment of the apparatus of the invention, particularly used in conjunction with the embodiments that have an actuator unit with at least two repulsive magnetic actuators that contribute to a single DOF, is to provide, for each of the actuators, a current supply for delivering to the respective electromagnet of each actuator, current at levels that correspond to a preselected combination of stiffness with respect to a DOF of motion and position of the interface member with respect to the same DOF. This permits independent control of stiffness and position for a single DOF.

According to this embodiment, the current supply for each actuator may comprise, as discussed above, a separate signal generator, stiffness and position lookup table or algorithm processor and current amplifier.

According to a still further preferred embodiment, the apparatus of the invention may be an actuator unit comprising first and second actuator members. The first actuator member comprises: a first magnetic region and a second magnetic region, coupled to the first magnetic region such that motion of one magnetic region with respect to a reference results in motion of the other region with respect to the reference. The second actuator member comprises: a first magnetic region, arranged to magnetically repel the first magnetic region of the first actuator member; and a second magnetic region, arranged to simultaneously magnetically repel the second magnetic region of the first actuator member. The second actuator member is arranged relative to the first actuator member such that the first and second magnetic regions are in opposition relative to each other. A electromagnet is arranged with respect to the first magnetic regions of the first and second actuator members to generate a magnetic field that: counters any magnetic repulsion that arises between the first magnetic regions, if current is applied to the electromagnet in a first direction; and enhances any magnetic repulsion that arises between the first magnetic regions if current is applied to the electromagnet in a second, opposite direction.

According to this preferred embodiment, the first and second magnetic actuator members may each be permanent magnets and the first and second magnetic regions may comprise spaced apart regions of a single permanent magnet. Thus, a single magnet may be shared to actuate two DOF.

A preferred embodiment of the method of the invention is a method for controlling position of an interface member. The method comprises the steps of: coupling the interface member to a first actuator, the first actuator arranged to apply force to the interface member, the force arising from magnetic repulsion; and coupling the interface member to a force generator, the force generator arranged to apply force to the interface member, the force generator being in opposition to the first actuator. The method further includes the steps of simultaneously causing the first actuator and the force generator to apply the respective forces to the interface member; and selectively modulating the magnetic repulsion, thereby controlling the position of the interface member.

According to this preferred embodiment of the method of the invention, the force generator may be a second actuator and the force applied by the second actuator may also arise from magnetic repulsion. In that case, the step of selectively modulating the magnetic repulsion comprises the step of selectively modulating the magnetic repulsion associated with the first and second actuators.

The first actuator may comprise an electromagnet that is coupled to a current source, and the step of selectively modulating the magnetic repulsion then comprises the step of selectively modulating current supplied by the current source to the electromagnet.

According to this embodiment of the method of the invention, the force generator may be a second actuator, and the force applied by the second actuator may also arise from magnetic repulsion. The first and second actuators each can comprise an electromagnet that is coupled to a current source. The step of selectively modulating the magnetic repulsion comprises the step of simultaneously selectively modulating current supplied to each the electromagnet.

According to this preferred embodiment for controlling position, the current supply may further comprise a signal generator that correlates each of a plurality of positions of the interface member with a current level to be supplied to the electromagnet. The step of selectively modulating current comprises the step of identifying a position to the signal generator, which then generates a current level signal correlated to the identified position.

According to yet another preferred embodiment, the method of the invention is a method for controlling stiffness of an interface member. The steps are similar to those described for the preceding series of embodiments, but, rather than selectively modulating the magnetic repulsion to control position, it is modulated to control the stiffness of the interface member. The modulated magnetic repulsion may be of only a single actuator, or of two actuators. Rather than modulating magnetic repulsion to control only stiffness or position, modulation can be conducted to control both stiffness and position, if the force generator is also an actuator, particularly a repulsive magnetic actuator.

According to still another preferred embodiment, the method of the invention is a method for controlling position or stiffness or both of an interface member similar to that described immediately above, but rather than applying a force to the interface member, the first actuator and force generator each apply a torque to the interface member.

According to yet another preferred embodiment, the apparatus of the invention is an apparatus for physically exchanging a force with an environment. The apparatus comprises an interface member for physically contacting the environment; a first sensor for generating a sensor signal that relates to position of the interface member with respect to a reference; a first actuator, coupled to the interface member, arranged to apply a force to the interface member, the force arising from magnetic repulsion; and a force generator. The force generator is also coupled to the interface member, arranged to apply a force to the interface member simultaneously with application of the force to the interface member by the first actuator. The force generator is arranged in opposition with the first actuator.

In still another embodiment, the apparatus for exchanging force further may comprise means for modifying the force applied by the first actuator to the interface member, based on the sensor signal. The first actuator may comprise an electromagnet that contributes to the force arising from magnetic repulsion. The means for modifying the force applied by the first actuator may comprise means for modulating any current supplied to the electromagnet.

According to yet another embodiment, the apparatus for exchanging force discussed above may be arranged such that the first sensor generates a sensor signal that relates to a position of the interface member with respect to a first DOF of motion and the first actuator and the force generator cause motion of the interface member through the first DOF. The apparatus further comprises a second sensor, actuator and force generator, arranged relative to each other as described above with respect to the first sensor, actuator and force generator, the second sensor generating a signal that relates to a position of the interface member with respect to a second DOF. The second force generator and the second actuator cause motion of the interface member through the second DOF.

According to yet another, similar embodiment, the apparatus of the invention is again an apparatus for physically exchanging a force with an environment. The apparatus comprises: an interface member for physically connecting to the environment; a first sensor for generating a sensor signal that relates to a position of the interface member with respect to a first DOF of motion; a first actuator unit comprising an actuator and a force generator, each coupled to the interface member such that each applies a force to the interface member, the actuator and the force generator being in opposition and causing motion of the interface member through the first DOF. The force of the actuator arises from magnetic repulsion. The apparatus also comprises a second sensor for generating a sensor signal that relates to a position of the interface member with respect to a second DOF of motion; and a second actuator unit comprising an actuator and a force generator, each coupled to the interface member such that each applies a force to the interface member. The actuator and the force generator of the second actuator unit are in opposition with each other and cause motion of the interface member through the second DOF. The force of the actuator of the second actuator unit arises from magnetic repulsion.

According to a still further preferred embodiment of the method of the invention, the invention is a method for physically exchanging a force between an interface member and an environment. The method comprises the steps of: coupling the interface member to a first actuator, arranged to apply a force to the interface member, the force arising from magnetic repulsion; coupling the interface member to a force generator, also arranged to apply a force to the interface member simultaneously with application of the force to the interface member by the first actuator. The first actuator and the force generator being arranged in opposition. The method further includes the steps of causing the interface member to exchange a force having a component along the first DOF with the environment; generating a position signal that relates to position of the interface member with respect to the first DOF; and modifying the force applied by the first actuator based on the position signal.

The first actuator may comprise an electromagnet that contributes to the force arising from magnetic repulsion, and the step of modifying the force may comprise the step of modulating any current supplied to the electromagnet.

The method for physically exchanging a force of this embodiment may further comprise the steps of: simultaneous with the steps of coupling the interface member to the first actuator and the force generator, coupling the interface member to a second actuator and a second force generator, both arranged relative to each other and the interface member as described above with respect to the first actuator and force generator, the force of the actuator arising from magnetic repulsion. The second actuator and the second force generator cause the interface member to exchange a force having a component along a second DOF with the environment. A second DOF position signal is generated that relates to position of the interface member with respect to the second DOF and the force applied by the second actuator is modified based on the second DOF position signal.

Another preferred embodiment of the invention is a method for physically exchanging a force between an interface member and an environment, having components through two DOF. The method comprises the steps of: coupling the interface member to a first actuator unit comprising an actuator and a force generator, each coupled to the interface member such that each applies a force to the interface member, the first actuator and the force generator opposing each other and causing the interface member to exchange a force having a component along the first DOF with the environment, the force of the actuator arising from magnetic repulsion. Simultaneously with the step of coupling the interface member to the first actuator unit, the interface member is coupled to a second actuator unit comprising an actuator and a force generator, each coupled to the interface member such that each the actuator and force generator of the second actuator unit applies a force to the interface member, the actuator and the force generator of the second actuator unit opposing each other and causing the interface member to exchange a force having a component along the second DOF with the environment. The force of the actuator of the second actuator unit arises from magnetic repulsion. The method further includes the steps of generating a first DOF position signal that relates to position of the interface member with respect to the first DOF; generating a second DOF position signal that relates to position of the interface member with respect to the second DOF; and modifying the force applied by the first and second actuator units based on the first and second DOF position signals.

Still another preferred embodiment of the apparatus of the invention is an actuator assembly comprising: an interface member constrained by a travel guide to have between one and six DOF of motion; and a set of actuators, each actuator of the set arranged to apply a force onto the interface member, where: the force applied by each actuator is generated by repulsive magnetic forces; and each actuator of the set is in opposition.

Still another preferred embodiment of the apparatus of the invention is an actuator assembly comprising: an interface member, constrained by a travel guide to have between one and six DOF of motion; a set of force generators, each being arranged to apply a force onto the interface member; and a set of actuators, each actuator of the set also being arranged to apply a force onto the interface member, the force of each actuator being generated by repulsive magnetic forces, each actuator being in opposition with at least one other actuator or force generator.

The force generators may be actuators, or passive energy storage devices, such as a spring or a weight in a gravitational field.

According to this embodiment, the interface member may be movable through a number N of Degrees of Freedom equal to the total number of actuators plus force generators minus one. Further, the assembly may comprise, for each actuator of the set, an electromagnet and an amplifier. For each of the amplifiers, the assembly may comprise a lookup table from which to select current values or an algorithm processor to establish current values. The current values may be correlated to positions, stiffnesses or combinations thereof.

Yet another preferred embodiment of the invention is an actuator assembly comprising: an interface member, constrained by a travel guide to have between one and six DOF of motion; and a plurality of pairs of actuators, where: each actuator is arranged to apply a force onto the interface member, each force being generated by repulsive magnetic force; and each of the pairs of actuators being configured such that the actuators within the pair are in opposition with each other.

A preferred aspect of this embodiment has each of the actuators comprising an electromagnet, each actuator pair being associated with an amplifier configured such that an increase in current from the amplifier increases the repulsive force in one of the pair of actuators and decreases the repulsive force in the other pair. The amplifier may alternatively be configured such that an increase in current from the amplifier increases the repulsive forces in both pairs, or changes the position of the interface member.

According to this embodiment, the assembly may further comprising a lookup table or an algorithm processor that specifies the current from the amplifier corresponding to an actuator assembly set position, a stiffness or a force applied by the actuator assembly.

BRIEF DESCRIPTION OF THE DRAWINGS

These and other features, aspects, and advantages of the present invention will become better understood with regard to the following description, appended claims and accompanying drawings, where:

FIG. 24 is a schematic block diagram showing another closed loop control embodiment of the invention, configured to provide force control without a force sensor;

FIG. 25 is a schematic representation of a single repulsive actuator pair, linked to each other with a single, linearly moving magnet that is shared by both repulsive actuators;

FIG. 26 is a schematic representation of a single repulsive actuator pair, linked to each other with a single, rotationally moving magnet that is shared by both repulsive actuators;

FIG. 27A is a schematic representation of a single repulsive actuator pair, linked to each other with a single rotationally moving magnet that is shared by both repulsive actuators, with the poles of the magnets aligned circumferentially;

FIG. 27B is a schematic representation of a single repulsive actuator pair, as shown in FIG. 27A, with the poles of the magnets aligned radially;

FIG. 45A shows schematically, in cross-section along lines A—A (FIG. 45B) an embodiment of an actuator pair of the invention, where two actuators share a moving magnet, and where the moving magnet moves through a cavity filled with ferromagnetic fluid;

FIG. 45B shows schematically, in an end view, the ferromagnetic fluidembodiment of the invention shown in FIG. 45A;

DETAILED DESCRIPTION

The devices described herein are a class of actuators and mechanisms that use repulsive magnetic forces. The repulsive force is typically generated between a stationary magnet and a moving magnet, where the moving magnet is attached to the mechanism output member. The mechanisms are generally configured such that the repulsive force from one magnet pair is opposed by a repulsive force from another magnet pair, where the opposing forces are applied to the mechanism output member. This configuration is similar in certain aspects to the way biological flexor and extensor muscles are configured in a musculoskeletal system. The opposing configuration allows for open loop control of position and stiffness. The actuator mechanism may have both rotary and linear motion output, and may have either a single degree of freedom or multiple degrees of freedom. Permanent magnets can be used to create a baseline repulsive force without electric power, and electromagnets can modulate the repulsive force magnitude. The actuator can provide high fidelity motion and force output, and is well suited for human interface devices, such as force feedback joysticks. Other applications include adjustable stiffness devices, and high bandwidth mechanisms.

This description of the invention has two primary sections. The first section describes individual actuators that use repulsive magnetic forces. The second segment describes how the repulsive actuators can be used in various mechanisms and in opposing configurations. Methods for controlling such mechanisms are presented, including methods for open loop position and stiffness control.

The combination of opposing actuators whose force output is a function of position, such as is present in biological systems, has the advantage of simplifying the position and stiffness control of limbs. This simplification provides passive stability to the system; therefore feedback control is not required to position the mechanism in a stable fashion. Moreover, position and stiffness of the mechanism can be controlled in an open-loop configuration, i.e. without the use of a position sensor. Even when a position sensor is present, the system performance is relatively insensitive to the speed of the feedback loop. Most mechanical systems lack these advantages.

Repulsive Magnetic Actuator

Figure 1:
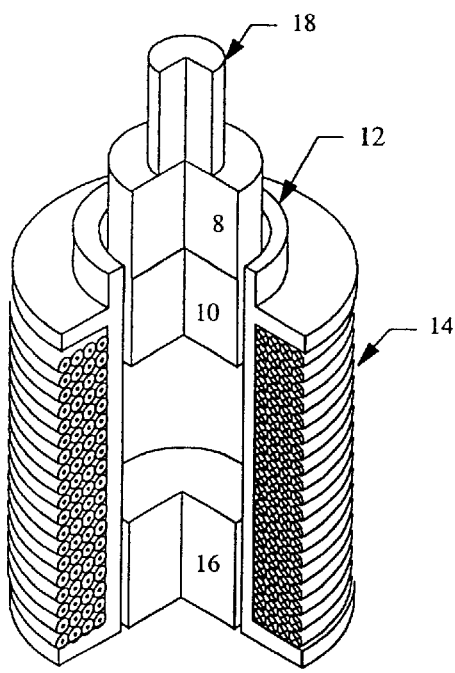
FIG. 1 is a perspective view of a preferred embodiment of a single actuator of the invention, referred to herein as a "repulsive actuator", having a pair of magnets (either permanent or electromagnets), one of which is movable, and a surrounding electromagnet.
Figure 1A:
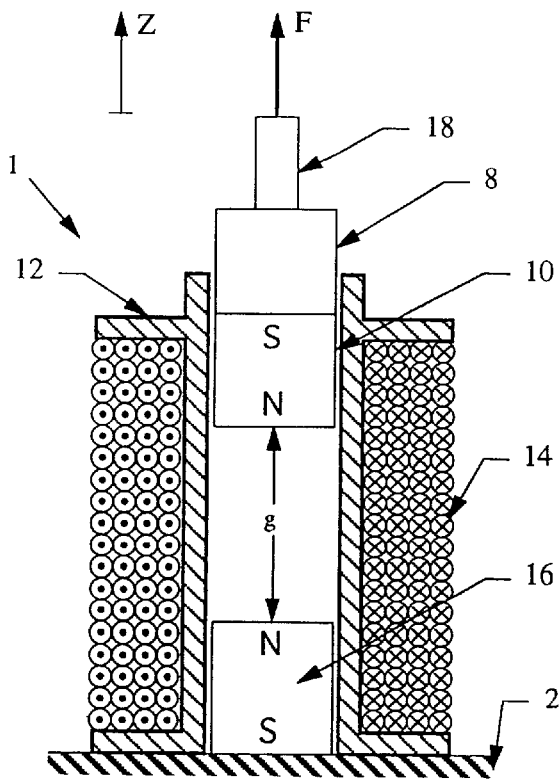
FIG. 1A is a cross-sectional side view of the actuator of FIG. 1, along the lines A—A (shown in FIG. 1B)
Figure 1B:
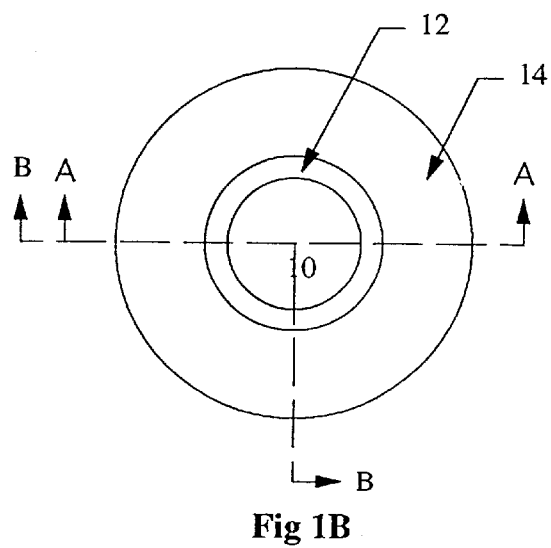
FIG. 1B is a top view of the actuator of FIG. 1.

A preferred embodiment of a single repulsive magnetic actuator of the invention is shown schematically in a perspective sectional view in FIG. 1, with FIG. 1A showing a vertical cross-sectional view along lines A—A (of FIG. 1B) and FIG. 1B showing a top view. A permanent magnet 10 is movable relative to a reference body 2. In the embodiment shown a ferromagnetic segment 8 (which is discussed in more detail in the following) is coupled to the moving magnet 10, and an output member 18 is coupled to segment 8. A travel guide 12, (made of non-magnetic material) in the form of a hollow centered bobbin, constrains the movable magnet 10 to move in the direction generally indicated by the arrow z. The movable magnet is arranged with its poles aligned along the z axis, for instance with its north pole facing toward the reference 2. An electromagnet 14 is arranged around the outside of the travel guide 12. A third magnet 16 is fixed relative to the reference 2, and is located adjacent the reference, at the opposite end of the travel guide 12, along the z axis, away from the movable magnet 10. The fixed magnet 16 and the movable magnet 10 are typically permanent magnets, although either or both can be electromagnets. The fixed magnet 16 is arranged with its poles relative to the movable magnet 10, such that they repel each other magnetically.

The repulsive magnetic forces can be described in terms of repulsion between magnetic poles. Alternatively, the magnetic force can be described in terms of the magnetic flux paths. As magnets in a repelling configuration are brought closer together, the flux path between the magnets becomes compressed, which can be used to indicate an increase in potential energy and repulsive force.

A typical configuration is to have the poles be substantially collinear, such as shown in FIG. 1A, with either the north or south poles of the movable 10 and permanent 16 magnets facing each other. However, they need not be substantially collinear, as long as there is a resultant repulsive magnetic force that acts along a line of force between the two, where the line of force is substantially parallel with the dimension z along which the travel guide 12 allows the movable magnet 10 to move.

As shown in FIG. 1, the magnets are cylindrical, however, they need not be, and can have a rectangular or any other cross-section.

Figure 20:
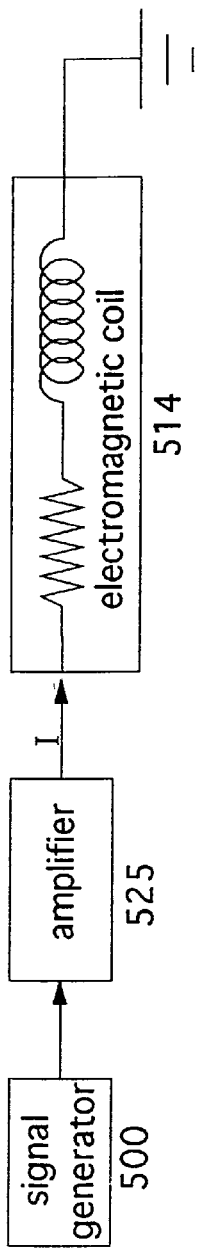
FIG. 20 is a schematic representation in block diagram form of the control apparatus for a single repulsive actuator of the invention.

Current to the electromagnet 14 can be controlled by an amplifier. FIG. 20 shows such an amplifier 525, which receives a command indicating the desired level of current from a signal generator 500. The amplifier then supplies the current I to the electromagnetic coil 514, which has both electrical resistance and inductance as shown in FIG. 20.

When there is no current in the electromagnet 14, the movable and fixed magnets 10 and 16 (which are both permanent in the embodiment shown) repel each other. If the moving magnet 12 is pushed toward the stationary magnet 16, the gap g between the magnets closes, causing an increase in repulsive magnetic force on the moving magnet 10.

When current is applied to the electromagnet 14, an electromagnetic field is generated. When the direction of current is as shown in FIG. 1A, then the electromagnetic coil generates a magnetic field that strengthens the repulsive magnetic force applied between the stationary magnet 16 and the moving magnet 10. When the direction of current is reversed, the electromagnetic coil generates a magnetic field that weakens the repulsive force applied between the stationary magnet 16 and the moving permanent magnet 10.

Figure 9:
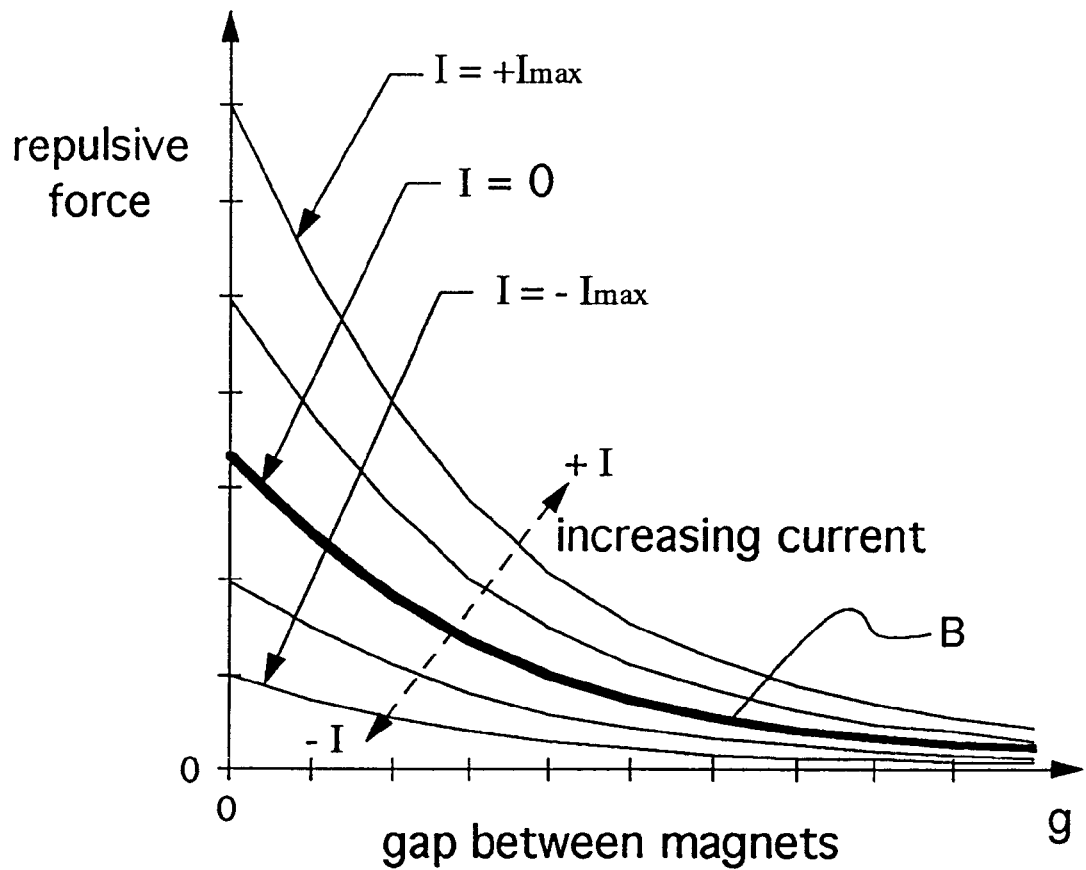
FIG. 9 is a graphical representation showing schematically the relation between the repulsive force and the gap between magnets of a repulsive actuator, for different levels of current supplied to a third magnet, which is an electromagnet.

FIG. 9 shows schematically a graph of the repulsive magnetic forces applied to the movable magnet 10 as a function of the gap g between the moving magnet 10 and the fixed magnet 16. The current applied to the coil of electromagnet 14 is indicated by I. When the current applied to the electromagnet 14 is zero, the relation between the force and the gap is shown at the baseline curve B (heavy line). As the current is increased to $+I_{max}$, (moving away from the baseline curve B along the line +I) the repulsive force increases with gap spacing, such as at curve $+I_{max}$. When a negative voltage is applied (moving away from the baseline curve B along the line −I) the repulsive force decreases with gap spacing such as at curve $-I_{max}$.

Several important features are evident from FIG. 9. When no current is applied to the electromagnet, there is still a repulsive force between the movable and the non-moving magnets, if they are both permanent. This facilitates a stable home point, particularly when two repulsive actuators are used to actuate a single DOF. (This is discussed in detail below.) Additionally, the net force between the moving and stationary magnets remains repulsive, even if the electromagnet applies an attractive force to the moving magnet. (It is possible to completely overpower the repulsive force of the stationary magnet, resulting in a force being applied to the moving magnet that actually attracts it towards the stationary magnet. However, this is not typically done.) Another important feature to note is that the relationship between repulsive force and separation gap is typically not linear. In many situations, a non-linear relation between force and gap is desired, and the actuator disclosed automatically produces one. One example of such a situation is a limited motion mechanism, where it is desirable to increase the force near the limit of travel to prevent large impact forces against the travel stops.

The typical repulsive electromagnetic actuator 1 has been described with a single electromagnet, and with two permanent magnets. In fact, either or both of the permanent magnets may also be electromagnets. If two of the magnets are electromagnets, then the actuator would not have a force applied to the movable magnet when no power is applied to the actuator. Further, to achieve the same degree of repulsive force as shown in FIG. 9, for the same amount of current applied to the electromagnet 14, would typically require additional power to be applied to the second electromagnet. This would then increase the energy demands of the actuator. Thus, unless some countervailing considerations of repulsive force, or control suggest two or more electromagnets, using only one electromagnet is advantageous.

Thus, as used herein and in the appended claims, unless otherwise specified, "magnet" shall mean both a permanent field magnet and an electromagnet.

Figure 4A:
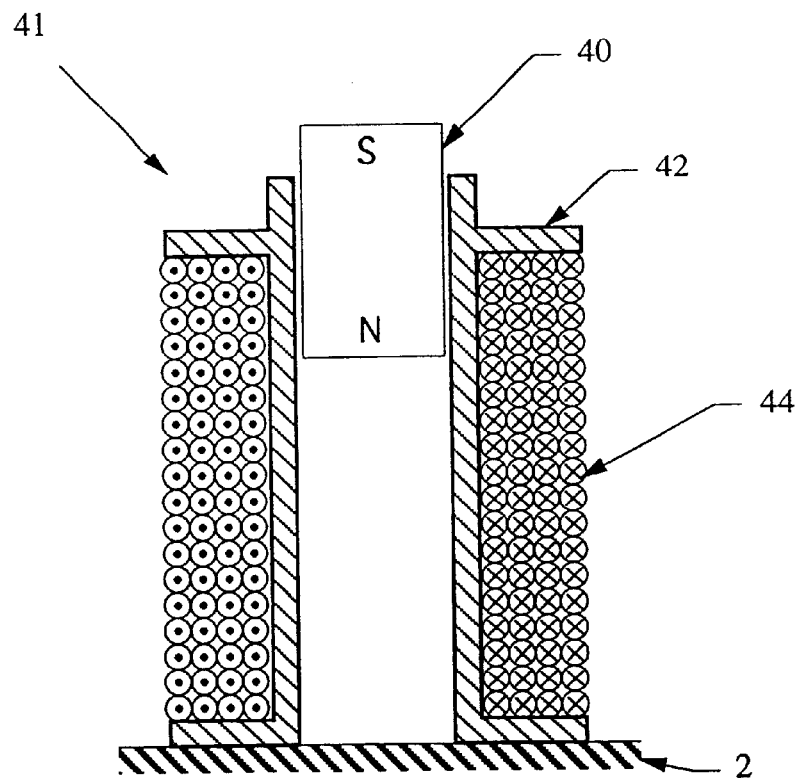
FIG. 4A is a verticle cross-sectional view of another embodiment of a repulsive actuator of the invention having a single magnet (either permanent or electromagnet) that is movable, and a surrounding electromagnet.
Figure 4B:
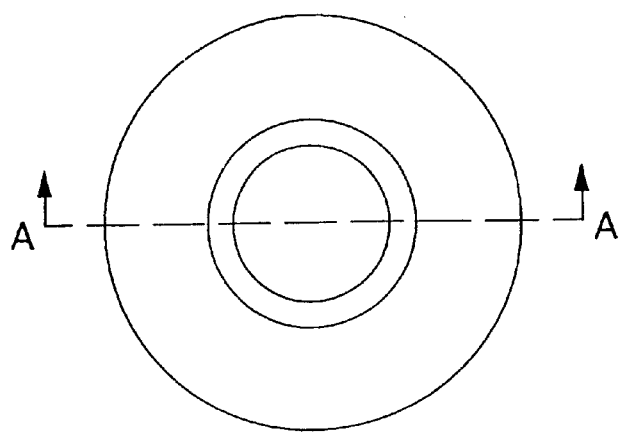
FIG. 4B is a top view of the repulsive actuator of FIG. 4A.

Similarly, the stationary permanent magnet 16 provides a zero current repulsive force, and thus provides a baseline of repulsive force that is always available. If these features are not important, the fixed permanent magnet 16 could be eliminated, and a repulsive electromagnetic actuator could be made with only two magnets. Such an actuator 41 is shown in FIG. 4A and FIG. 4B, where magnet 44 is stationary relative to the reference frame 2, and magnet 40 moves within the travel guide 42. The poles of the magnets are aligned such that a repulsive force exists between them. If either magnet 40 or 44 is an electromagnet, then the repulsive force can be modulated by varying the current through the electromagnet.

An additional advantage of using permanent magnet 16, is that it extends the range of repulsive forces that can be generated by the actuator. Without magnet 16, the current in electromagnet could only be applied in a single direction to generate a repulsive force with magnet 10; reversing the current direction would generate an attractive force. However, magnet 16 allows for the current to be applied in either direction, while still maintaining a repulsive force on magnet 10. Thus, the size of the electromagnet, and current amplifier can be reduced while achieving the same range of repulsive force.

Figure 2A:
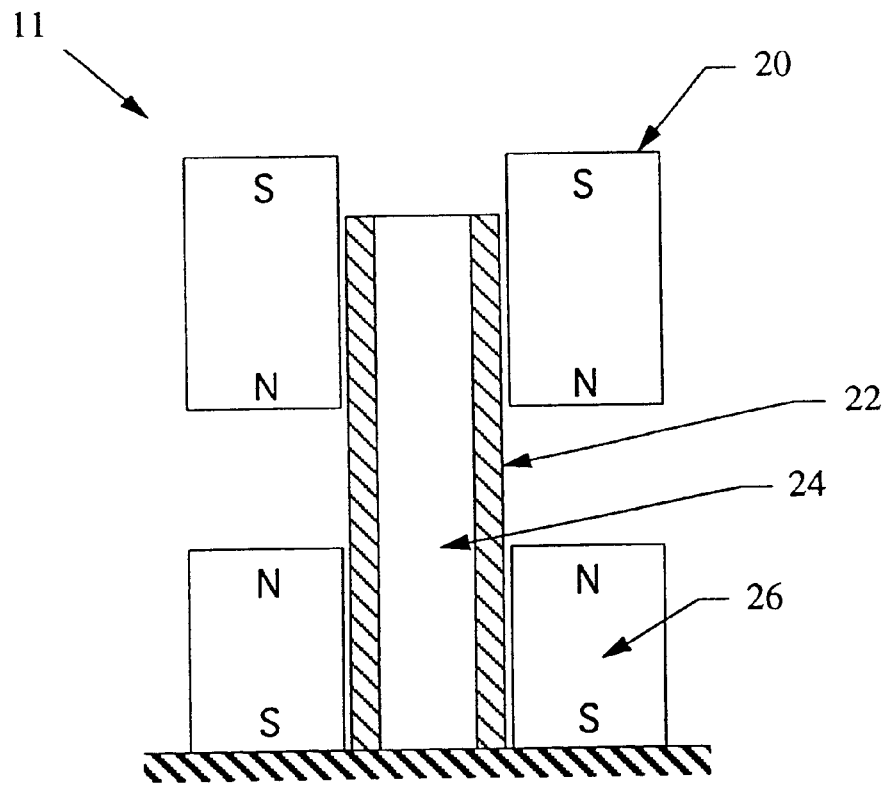
FIG. 2A is a vertical cross-sectional view of another embodiment of a repulsive actuator of the invention along the lines A—A (shown in FIG. 2B), having a pair of magnets (either permanent or electromagnets), one of which is movable, surrounding an electromagnet.
Figure 2B:
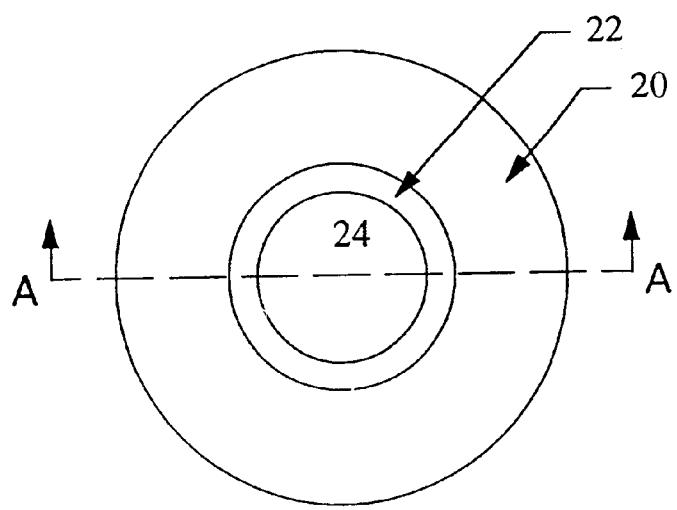
FIG. 2B is a top view of the repulsive actuator of FIG. 2A.

An alternate configuration of a repulsive electromagnetic actuator 11 is shown in FIG. 2A and FIG. 2B. Two ring magnets 20 and 26, are used as the movable and stationary magnets, respectively, both typically being permanent magnets. An electromagnetic coil 24 is placed inside of a non-magnetic sheath guide 22, that guides the linear motion of the moving magnet 20. The electromagnet coil 24 can be fabricated by wrapping the wire around itself, wrapping it around a cylindrical bobbin, or wrapping it around a ferromagnetic cylinder.

Figure 3A:
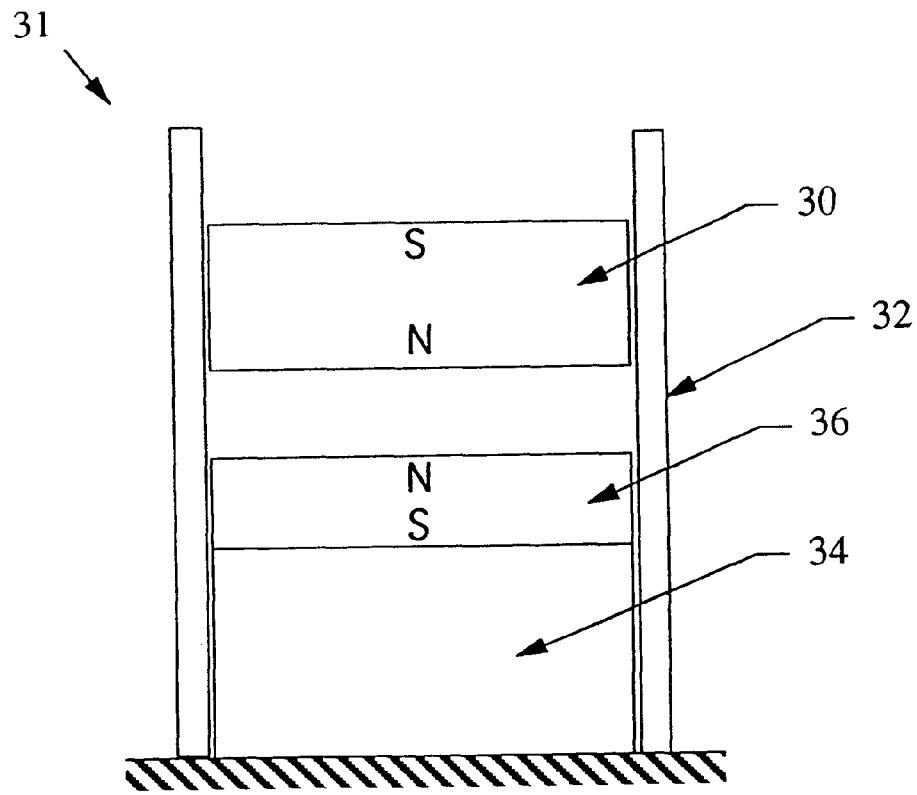
FIG. 3A is a vertical cross-sectional view of another embodiment of a repulsive actuator of the invention along the lines A—A (shown in FIG. 3B), having a pair of magnets (either permanent or electromagnets) with one being adjacent an electromagnet that is distant from the other magnet.
Figure 3B:
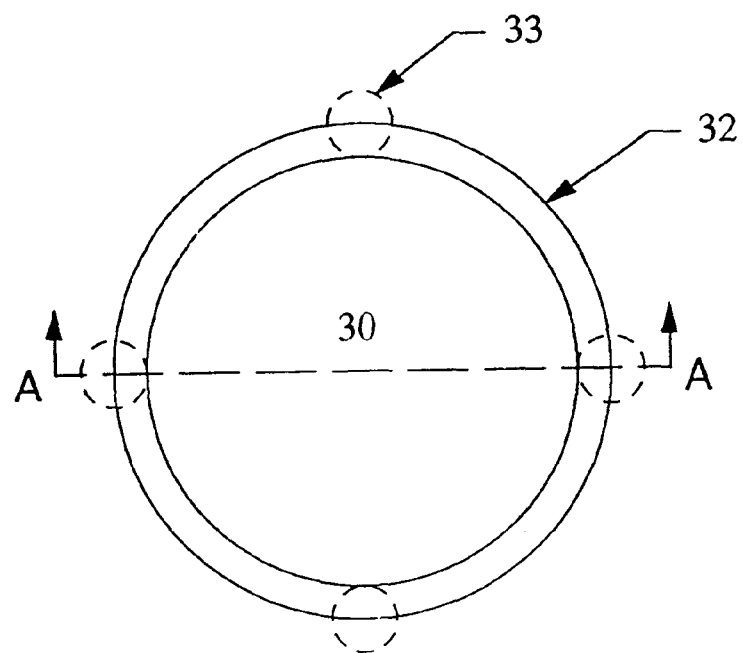
FIG. 3B is a top view of the repulsive actuator of FIG. 3A.

Another alternate configuration of a repulsive electromagnetic actuator 31 is shown schematically in FIG. 3A and FIG. 3B. An electromagnet coil 34 is underneath a stationary magnet 36. The moving magnet 30 is guided by a non-magnetic sheath 32. The sheath can have a continuous circumference, or it can be a pattern of guides 33, such as fence posts, shown in dotted outline. The magnets can be ring magnets, or solid. Rather than having an exterior guide, if ring magnets are used, a central guide may be used, as shown in FIG. 2A.

In all of the configurations shown, it is possible to replace a portion of a magnet with a ferromagnetic segment, which typically costs less than the magnet material. The ferromagnetic segment will typically become magnetized by the adjacent magnet, and thereby increase the magnetic force. The upper portion of the moving magnet 10 contains a ferromagnetic segment 8 (shown in FIG. 1A). Similarly, it is possible to replace a lower portion of the stationary magnet 16 with a ferromagnetic segment, which will be magnetized by the magnet 16. It is also possible to replace the interior segment of a magnet with ferromagnetic material, leaving magnetic material on either ends of the magnet.

In this fashion, an actuator has been provided that is powered and modulated by electrical power, which can be easily controlled by conventional signal generating and processing equipment. The actuator has the advantage of having a translational degree of freedom of motion along a straight line, rather than a rotary motion around an axis. If an output member 18 (FIG. 1A) is coupled to the moving magnet 10, such as shown schematically in FIG. 1A, a force F is applied by the actuator along a straight line, rather than a torque around an axis being supplied, such as by a rotary motor.

In a preferred embodiment, a Neodymium Iron Boron disc magnet of diameter 0.5 in. and length 0.5 in. is configured as moving magnet 10 in FIG. 1A. An iron cylinder of diameter 0.5 in. and length 0.5 in. is configured as a ferromagnetic extension 8. A Neodymium Iron Boron disc magnet of diameter 0.5 in. and length 0.25 in. is configured as stationary permanent magnet 16. An iron cylinder of diameter 0.5 in. and length 0.25 in. is configured as a ferromagnetic extension on the bottom of magnet 16. The Neodymium magnets are sold by The Magnet Source of Marietta, Ohio, USA. A 12 Volt DC electromagnet with an inner diameter of approximately 0.5 inch, a length of 1.68 inch, a wire size of 24.5, a total of 1028 turns, and a coil resistance of 7.3 Ohms, sold by Guardian Electric Manufacturing Co. of Woodstock Ill., USA is also configured generally as shown in FIG. 1A by electromagnet 14. When supplied with voltage between +12 and −12 VDC, the moving magnet can apply a force of between 0 and 140 oz. The range of motion of the moving magnet under the gravitational load of the moving magnet is on the order of 25 mm (1 in.).

Multiple Gap Repulsive Electromagnetic Actuators

Figure 30A:
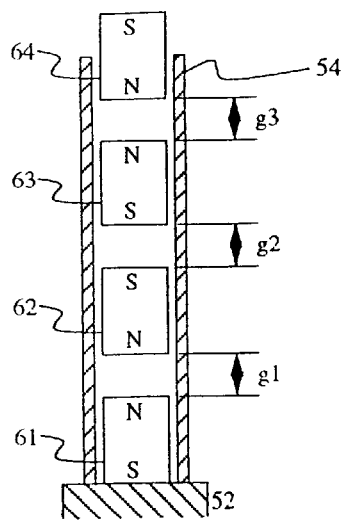
FIG. 30A is a schematic representation in side cross-section of at lines A—A (FIG. 30B) a multi-gap repulsive actuator.
Figure 30B:
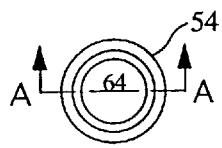
FIG. 30B is a top view of the multi-gap repulsive actuator shown in FIG. 30A.

In order to increase the range of motion of a repulsive electromagnetic actuator, one can incorporate multiple magnetic gaps in the actuator, as shown in the FIG. 30A and FIG. 30B. (FIG. 30B shows a top view, and FIG. 30A shows a side view cross-section at lines A—A of FIG. 30B.) In the representative configuration shown, there are four magnets. Magnet 61 is stationary relative to the reference 52, while magnets 62, 63, and 64 slide within the guide 54. The output of the actuator is attached to magnet 64. The magnets 61, 62, 63, and 64 are oriented such that each magnet repels the adjacent magnets. Thus, as magnet 64 is compressed downwards, gap g3, will compress and increase the repulsive forces between magnets 63 and 64. Due to this increase in force, gap g2 will compress along with gap g1. If all magnets are of equal strength and the external load on the actuator remains constant, then in steady state all gaps between the magnets will be the same length. In order to modulate the repulsive force, at least one of the magnets must be an electromagnet.

The multiple gap configuration will not necessarily increase the maximum repulsive force from the actuator, which occurs when the gaps go to zero. However, multiple gaps will increase the range of motion, and the magnitude of the repulsive force over that motion. In a multiple gap actuator, the total motion of the output member will equal the sum of the motion in all gaps. Thus, for a given motion of the output magnet 64, the gap size of g1, g2, and g3 will be one third of the size of a single gap repulsive electromagnetic actuator. The smaller gap size will provide a significantly stronger magnetic force, as shown in FIG. 9. Furthermore, the range of motion of the three gap actuator in FIG. 30A could be three times longer than that of a single gap actuator.

The guide 54 shown in FIG. 30A is on the external side of the moving magnets. However, an internal guide, such as member 22 in FIG. 2A, can also be used in a multi-gap actuator. The magnets used with such a guide would have a central hole, such as in a ring magnet. The number of magnets and gaps in the actuator can be selected to suit the range and force requirements of the application.

Both poles of the magnets 62 and 63 in FIG. 30A are subject to repulsive forces. In such magnets it is possible to replace an interior portion of the magnet with a ferromagnetic segment that costs less than magnetic material. For the magnets on either end of the actuator, 61 and 64, it is possible to replace the side of the magnet that is not subject to repulsive forces with a ferromagnetic segment, as discussed above.

Figure 31A:
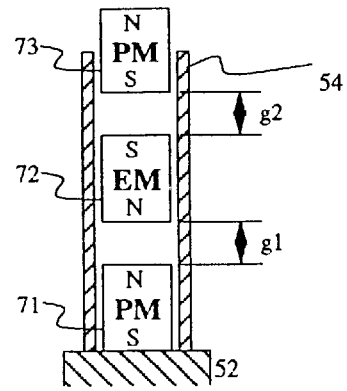
FIG. 31A is a schematic representation in side cross-section at lines A—A (FIG. 31B) of a multi-gap repulsive actuator, having alternating permanent magnets and electromagnets.
Figure 31B:
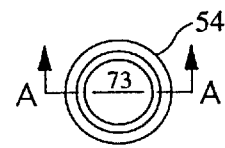
FIG. 31B is a top view of the multi-gap repulsive actuator shown in FIG. 31A.

FIG. 31A and FIG. 31B show a specific embodiment of a multi-gap actuator, where permanent magnets are designated by PM, and electromagnets are designated EM. (FIG. 31B shows a top view, and FIG. 31A shows a side view cross-section at lines A—A of FIG. 37B.) Here, permanent magnets alternate with electromagnets. The permanent magnet 71 is fixed relative to the reference frame 52. Electromagnet 72 slides in the guide 54 above magnet 71, and permanent magnet 73 slides in the guide 54 above it. The orientation of the field generated by the electromagnet is shown by the north and south poles, and is aligned to repel both permanent magnets. When no current is applied to the electromagnet, a repulsive force does not exist, and indeed an attractive force could exist between magnets 73 and 71, since the electromagnet 72 would not be interfering with the flux path between these two magnets. Accordingly, for the embodiment shown in FIG. 31, a current must be present to generate a repulsive force, and the current can only flow in a single direction to generate repulsive forces. Although only a single electromagnet is shown in FIG. 31, the alternating series can be continued for any number of permanent and electromagnets. The electromagnets could be connected to the same power source, and thus have the same currents flowing through all electromagnets.

Figure 32A:
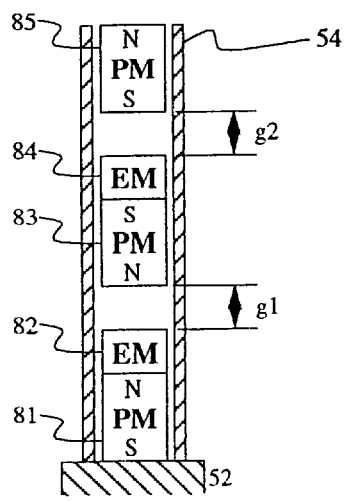
FIG. 32A is a schematic representation in side cross-sectional at lines A—A (FIG. 32B) view of a multi-gap repulsive actuator having alternating permanent magnets and electromagnets, with pairs of each that are attached together.
Figure 32B:
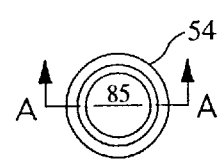
FIG. 32B is a top view of the multi-gap repulsive actuator shown in FIG. 32A.

FIG. 32A and FIG. 32B (with FIG. 32B showing a top view, and FIG. 32A showing a side view cross-section at lines A—A of FIG. 32B) show another multi-gap actuator embodiment. Here a permanent magnet 81 is fixed on the bottom to the reference 52, and on the top to electromagnet 82. Sliding in the guide 54, a permanent magnet 83 is attached to an electromagnet 84. The uppermost magnet is a permanent magnet 85, which slides in the guide above gap g2. Here the permanent magnets are aligned so that they repel other adjacent permanent magnets. Thus, the electromagnets can increase or decrease the repulsive forces by reversing the direction of current. In this configuration, repulsive forces exist even without current in the electromagnets. A disadvantage with this configuration is that the gap between the permanent magnets cannot go to zero (because the electromagnets fill that space), and thus the base repulsive force with no current in the electromagnets is lower than it would be if the gap could be brought to zero.

Figure 33A:
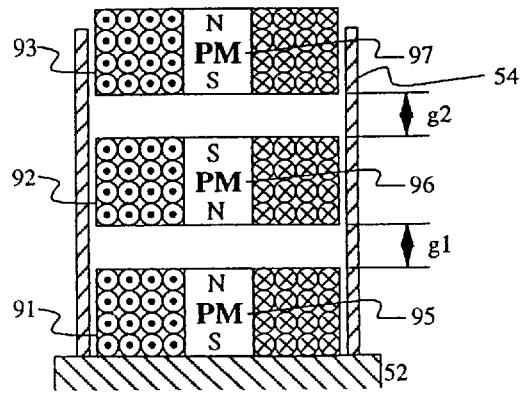
FIG. 33A is a schematic representation in side cross-section at lines A—A (FIG. 33B) of a multi-gap repulsive actuator with central permanent magnets surrounded by annular electromagnets.
Figure 33B:
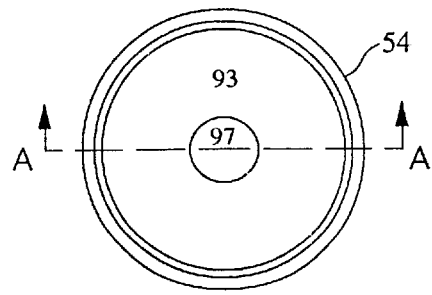
FIG. 33B is a top view of the multi-gap repulsive actuator shown in FIG. 33A.

FIG. 33A and FIG. 33B show another multi-gap actuator. (FIG. 33B shows a top view, and FIG. 33A shows a side view cross-section at lines A—A of FIG. 33B.) Here the electromagnets surround permanent magnets. The permanent magnet 95 is attached to and surrounded by electromagnet 91, and both are fixed relative to the reference 52. Above gap g1, permanent magnet 96 is attached to and surrounded by electromagnet 92, and both slide in guide 54. Above gap g2 permanent magnet 97 is surrounded by and attached to electromagnet 93, and both slide in guide 54. The permanent magnets are oriented such that each permanent magnet repels the adjacent permanent magnet. Thus, repulsive forces exist even without current in the electromagnets, and the current can flow in either direction of the electromagnet to increase or decrease the repulsive force. Moreover, the gaps between the permanent magnets can go to zero, and thus a relatively large base repulsive force can be generated without current in the electromagnets. This advantage may override the disadvantage of a larger perimeter of the actuator due to the surrounding permanent magnets. An alternative configuration would be to switch the location of the permanent magnets with the electromagnets, so that the permanent magnets would surround the electromagnets.

Figure 40A:
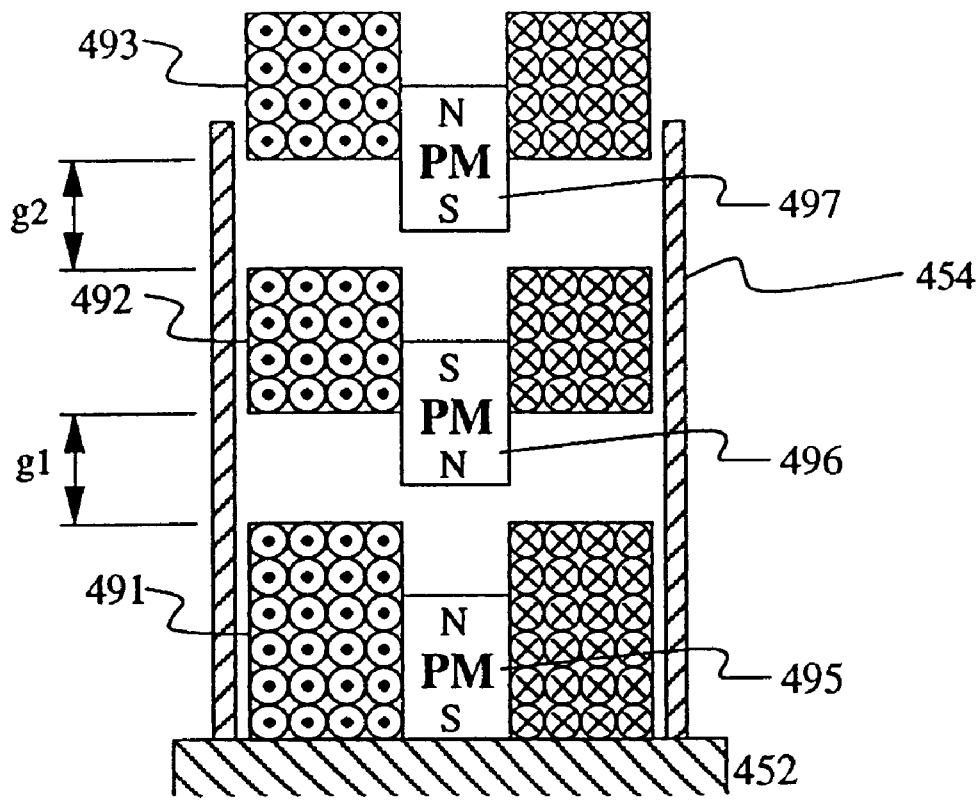
FIG. 40A shows schematically, in cross-section along lines A—A (FIG. 40B) a multi-gap actuator embodiment of the invention where the moving magnets can enter an opening in other moving or stationery magnets.
Figure 40B:
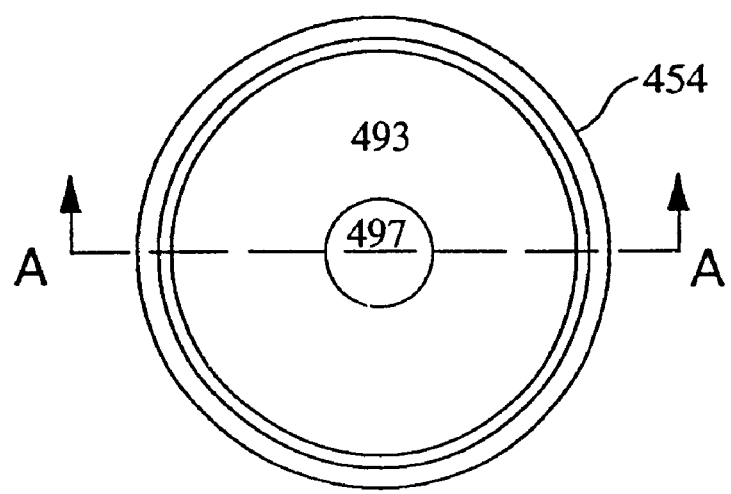
FIG. 40B shows a top view of the embodiment shown in FIG. 40A, of the multi-gap actuator where the moving magnets can enter an opening in other moving or stationery magnets.

FIG. 40A and FIG. 40B show a multi-gap actuator, where the moving magnets can enter an opening in other moving or stationary magnets. (FIG. 40B shows a top view, and FIG. 40A shows a side view cross-section at lines A—A.) As in the embodiment in FIG. 33A, the electromagnets surround permanent magnets, yet here the permanent magnets are displaced in axial direction so that during motion of the moving magnets, a permanent magnet may enter the opening of an adjacent electromagnet. The permanent magnet 495 is attached to and surrounded by electromagnet 491, and both are fixed relative to the reference 452. Above a gap g1, permanent magnet 496 is attached to and surrounded by electromagnet 492, and both slide in travel guide 454. As the gap g1 decreases, permanent magnet 496 becomes surrounded by electromagnet 494, and thus achieves a high magnitude of repulsive magnetic force. Above gap g2 permanent magnet 497 is surrounded by and attached to electromagnet 493, and both slide in guide 454, and magnet 497 enters the opening in magnet 492 as gap g2 decreases. The permanent magnets are oriented such that each permanent magnet repels the adjacent permanent magnet, and the electromagnets can be controlled to increase or decrease the repulsive magnetic forces. Alternative configurations are possible where moving magnets enter openings of other magnets. For example an electromagnet could enter into an opening of a permanent magnet, and a moving magnet could enter into openings in adjacent magnets both above and below it.

A single amplifier can be used to power all of the electromagnets in a multi-gap actuator. The electromagnets can be connected in series or in parallel to the amplifier. An increase in current from the amplifier can then increase or decrease the repulsive force in all gaps simultaneously. The advantage of using a single amplifier for all the electromagnets is a reduction of cost of the actuator.

However, it is also possible to control the current to each electromagnet in a multi-gap actuator with a separate amplifier. Such a configuration will allow one to generate different levels of force and stiffness in different gaps. One advantage of separate amplifiers is an increased ability in selecting the natural frequencies of the actuator. Due to the inertia of the multiple moving magnets, a multi-gap actuator will have multiple resonant frequencies. If it is desired to generate a high amplitude oscillation actuator output, it can be advantageous to drive the actuator at its resonant frequency. By separately adjusting the current in different electromagnets, the natural frequencies of the actuator can be selected to suit the application.

An additional advantage of using separate amplifiers for each electromagnet in a multi-gap actuator is to compensate for undesirable dynamics. In steady state, the force in all the gaps will equilibrate, and the gap distance will be the same in all gaps assuming similar strength moving magnets. However, the inertia of the moving magnets prevents the force in the gaps from instantaneously equilibrating. Thus, for a transient period of time after a force input, there may be different forces in the gaps. If this detrimentally affects actuator performance, then separate amplifiers for the different electromagnets can be used to compensate for this force imbalance. The compensation can be done without sensors, with a single sensor on the output, or can use multiple position sensors that measure each gap magnitude.

Figure 37A:
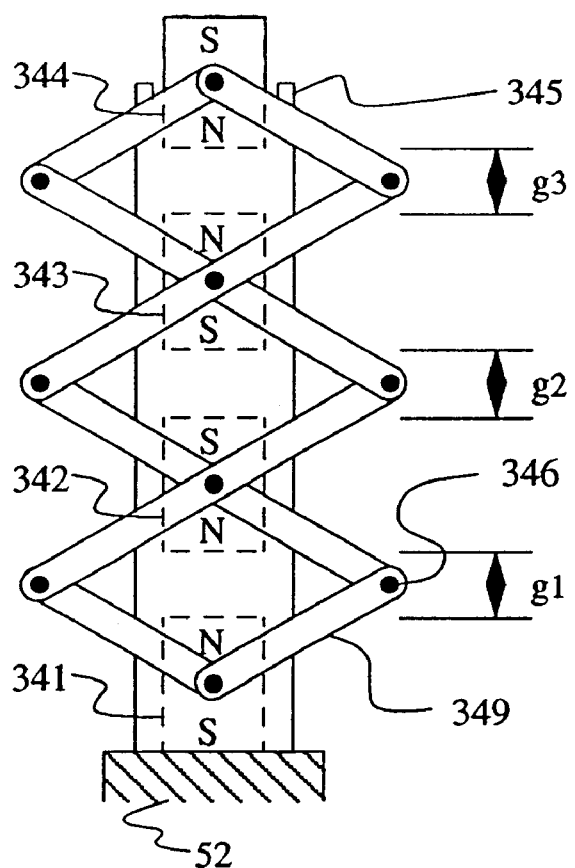
FIG. 37A is a schematic representation in side view of a multi-gap repulsive actuator, having alternating permanent magnets and electromagnets, with an articulating travel guide.
Figure 37B:
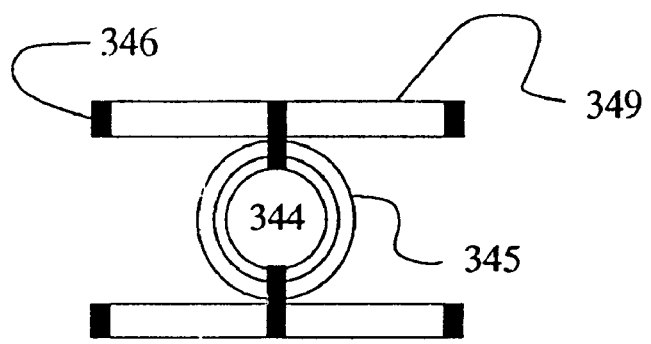
FIG. 37B is a top view of the multi-gap repulsive actuator shown in FIG. 37A.

An alternative approach for addressing transient variations between gap sizes in a multi-gap actuator is through use of a mechanical linkage that maintains the same magnitude gap between all the moving magnets. One such embodiment is shown in FIG. 37A and FIG. 37B (FIG. 37B shows a top view, and FIG. 37A shows a side view). Here a magnet 341 is fixed on the bottom to the reference 52. Magnets 342 and 343 are constrained to move vertically in the travel guide 345. These magnets are oriented such that repulsive forces are generated between the gaps, g1, g2, and g3, as shown in FIG. 37A. The linkage mechanism consists of links 349, and pivots 346. In the embodiment in FIG. 37A the linkage ensures that the gaps g1, g2, and g3 have the same magnitude. The links can be placed on either side of the moving magnets as shown in FIG. 37B. Slots can be provided in the travel guide 345, to allow for clearance with the pivots 346.

Multi-Gap Actuator With Commutation: The previous section presents multi-gap actuators where a number of magnets move, and thus maintain the desired repulsive forces between the magnets. However, another approach to moving a magnetic field, is to control the current in various windings of electromagnets which may be stationary or moving. Such approaches are used in control of electric motors and other electromagnetic devices, and is referred to in that context as "commutation." A review of different apparatus and methods used for commutation is given by: Electric Machines, by G. R. Slemon, and A. Straughen, Addison-Wesley Publishing Co. 1980.

Figure 38A:
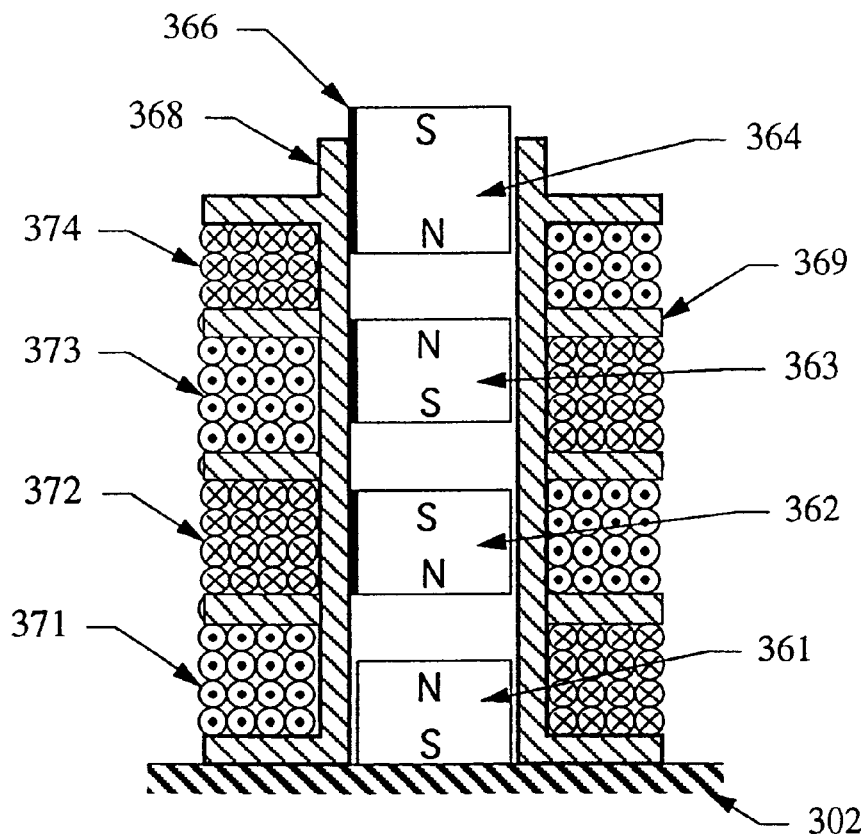
FIG. 38A is a schematic representation in side cross-section along the lines A—A (FIG. 38B) of a multi-gap repulsive actuator with central permanent magnets surrounded by annular electromagnets, with the permanent magnets being movable, and the electromagnet being fixed, and arranged with like poles facing each other.
Figure 38B:
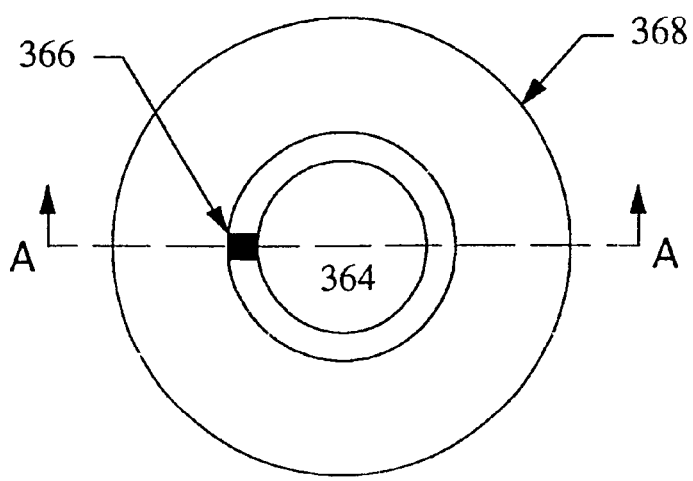
FIG. 38B is a top view of the multi-gap repulsive actuator shown in FIG. 38A, with like poles facing each other.

One embodiment of a multi-gap repulsive actuator which uses a new form of commutation of stationary electromagnets is shown in FIG. 38A and 38B. (FIG. 38B shows a top view, and FIG. 38A shows a side view cross-section at lines A—A of FIG. 38B.) Here a series of electromagnets, 371, 372, 373, and 374, are wrapped around a travel guide 368, and held in a stationary position relative to the reference frame 302. A separator 369 separates between the discrete electromagnet windings. As shown, the direction of wire winding alternates between clockwise and counterclockwise in adjacent electromagnets. The travel guide surrounds the stationary magnet 361, and moving magnets 362, 363, and 364. The moving magnets, are configured in a repulsive orientation to the adjacent moving magnet as shown. The moving magnets are typically permanent magnets and therefore have low inertia, while the electromagnets typically have a higher inertia. By having only the low inertia magnets move, the dynamic performance of the actuator can be improved. However, the repulsive force created by the surrounding electromagnets can vary substantially as a function of the position of the moving magnets. Accordingly, to provide the desired repulsive force, the current to each the electromagnets is adjusted based on the location of the moving magnets. One method to adjust the current to the electromagnets, is to place an electrical contact 366 onto the moving magnets. As these electrical contacts slide against the travel guide, the open and close circuits to the electromagnets. Thus, the motion of the moving magnets can automatically direct the current to the appropriate electromagnet.

Figure 39A:
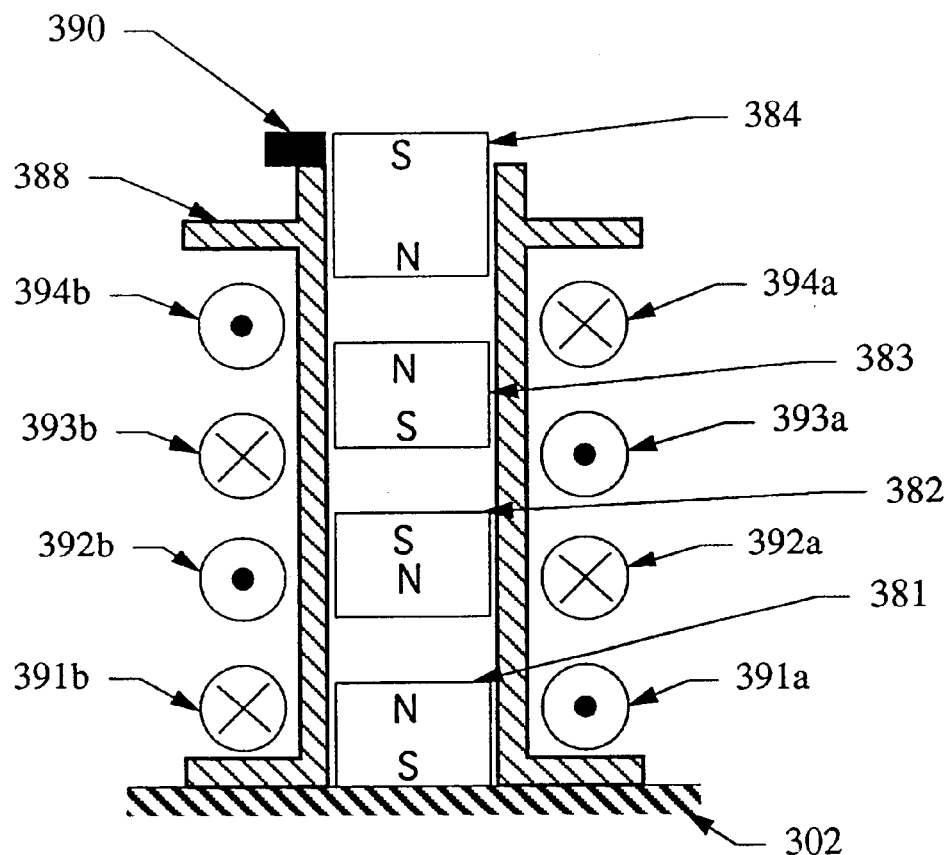
FIG. 39A is a schematic representation in side cross-section along the lines A—A (FIG. 39B) of a multi-gap repulsive actuator with central permanent magnets surrounded by annular electromagnets, with the permanent magnets being movable, and the electromagnets being fixed, with overlapping windings, having variable wire density as a function of height up the travel guide
Figure 39B:
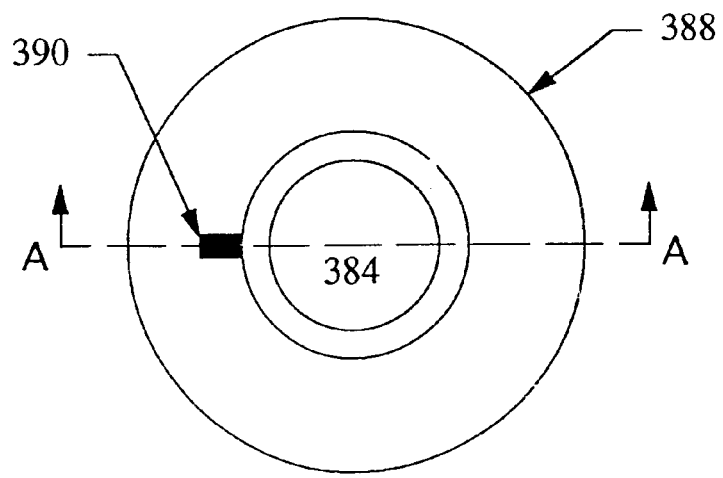
FIG. 39B is a top view of the multi-gap repulsive activator shown in FIG. 39A.

Another embodiment of a multi-gap repulsive actuator which uses commutation of stationary electromagnets is shown in FIG. 39A and 39B. (FIG. 39B shows a top view, and FIG. 39A shows a side view cross-section at lines A—A of FIG. 39B.) The magnets inside the travel guide are configured in a similar orientation to the embodiment in FIG. 38A, where the magnet 381 is stationary, and magnets 382, 383, and 384 move. However, in this embodiment, the electrical windings of the electromagnets are not separated discretely. The electromagnets surround the travel guide 388, yet the winding density can vary as a function of height in the travel guide, and can overlap with other windings. Accordingly, the windings are represented by the symbol of a single large conductor, which actually represents a center of winding density. Thus the first stationary electromagnet is represented by symbol 391*a* which indicates the center of winding density going into the page, and symbol 391*b* which indicates the center of winding density coming out of the page. The actual number of winding density tapers off from this center of density. In a similar fashion the second electromagnet is represented by winding centers 392*a* and 392*b,* the third electromagnets is represented by centers 393a and 393b, and the centers of the fourth electromagnetic are shown by 394a and 394b. The tapering of the winding density in each electromagnet, can provide a smoother output of actuator repulsive force. However, to provide optimal repulsive forces, it is still necessary to modify the current in the stationary electromagnets as a function of the position of the moving magnets. Here an alternate approach is used to modify the current in the electromagnets. A sensor 390 measures the position of the last moving magnet 384. The sensor can be magnetic, optical, contact, or non-contact. The sensor output is used to modify the amplifiers for each electromagnet. Since the sensor can measure the position continuously, it is possible to continuously modify the electromagnet currents, instead of discrete on and off operations. This approach will further smooth the profile of the actuator's repulsive force.

In addition to the two embodiments described above, other commutation methods can be applied to multi-gap repulsive electromagnetic actuators. The control of the electrical currents to various winding can be accomplished using moving electrical contacts, or sensors and a control circuit. A single sensor can be used that measures the position of one moving magnet, and the position of the other magnets can be inferred. Alternatively sensors can be placed on each moving magnet to provide a more accurate measurement of each magnet location. Commutation can be applied to both stationary and moving magnets. The various methods used for commutation of electric motors can be applied to control windings in multi-gap repulsive electromagnetic actuators.

Curved Magnet Actuators

Figure 34A:
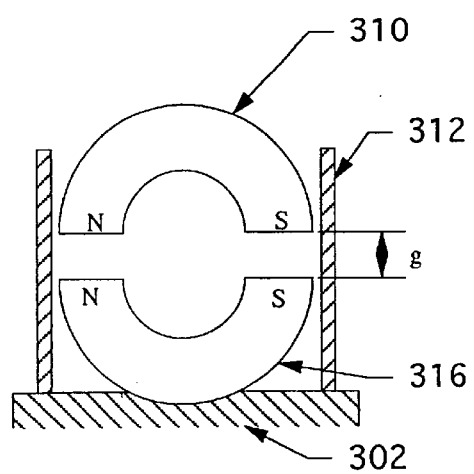
FIG. 34A is a schematic representation in side cross-section at lines A—A (FIG. 34B) of a repulsive actuator of the invention, using a pair of horseshoe magnets.
Figure 34B:
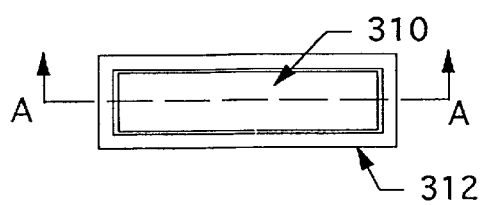
FIG. 34B is a top view of the horseshoe repulsive actuator shown in FIG. 34A.

In order to increase the force of a repulsive electromagnetic actuator one can use a curved magnet as shown in the FIG. 34A and FIG. 34B. (FIG. 34B shows a top view, and FIG. 34A shows a side view cross-section at lines A—A of FIG. 34B.) By a "curved" magnet, it is meant a magnet where the magnetic field within the magnet is not aligned in linear fashion, regardless of the physical shape of the magnet. The curved magnet 316 is held stationary relative to reference body 302, and magnet 310 is constrained to move vertically by the travel guide 312. The magnets 310 and 316 are oriented such that repulsive forces are generated between both sets of poles. Thus, the repulsive magnetic force may be stronger than with a straight magnet actuator. In order to modulate the repulsive force, at least one of the magnets 310 or 316 must be electromagnetic.

Figure 35A:
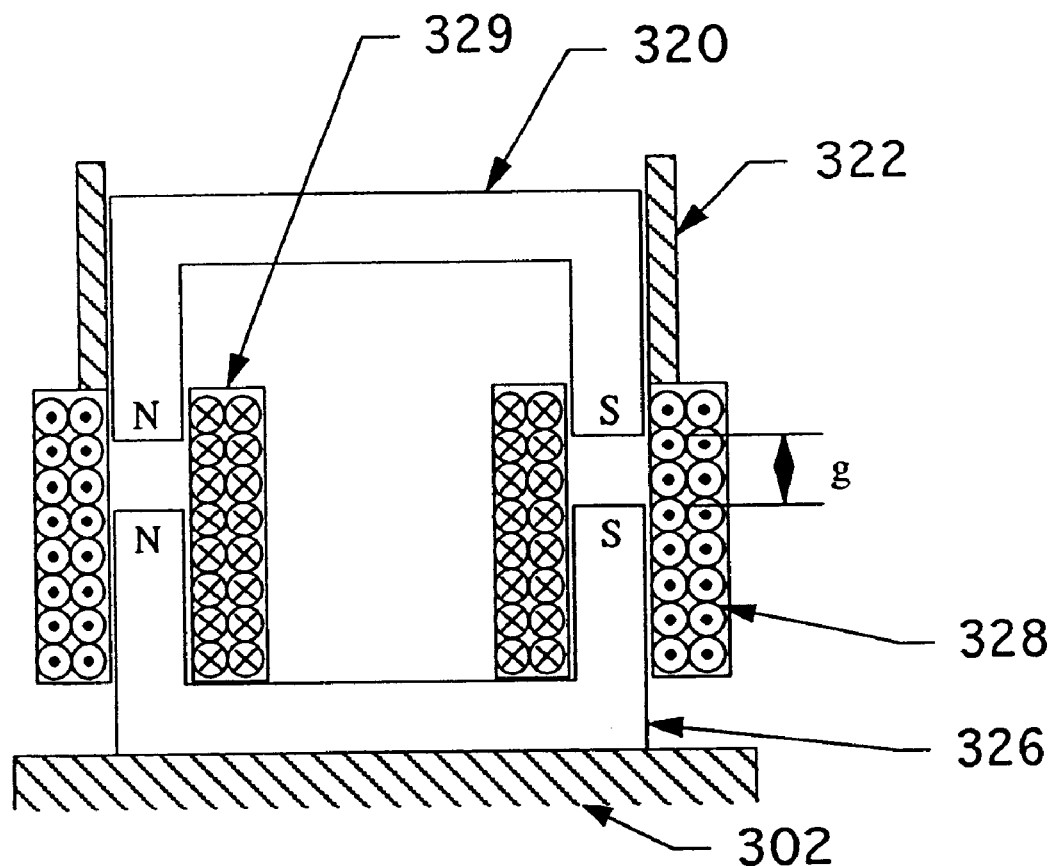
FIG. 35A is a cross-sectional side view (at lines A—A, FIG. 35B) of a repulsive actuator with square "U" shaped magnets with an electromagnet surrounding each pair of facing, like poles.
Figure 35B:
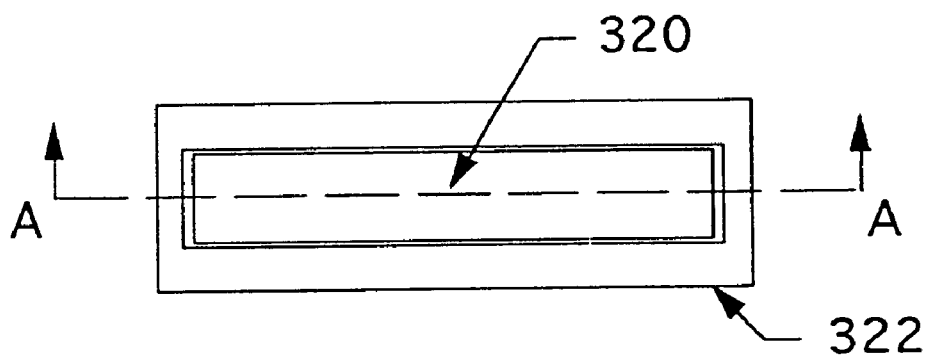
FIG. 35B is a top view of the square "U" shaped repulsive actuator shown in FIG. 35A.

A curved magnet can also be surrounded by an electromagnet as shown in FIG. 35A and FIG. 35B (FIG. 35B shows a top view, and FIG. 35A shows a side view cross-section at lines A—A of FIG. 35B.) A curved magnet 326 is held stationary relative to a reference body 302. A curved magnet 320 can move vertically while constrained by the travel guide 322. Magnet 320 is held in an orientation so that both of its poles are repelled by magnet 326. Electromagnet 328 surrounds one pole of magnet 326, and electromagnet 329 surrounds the other pole. By applying current to the electromagnets 328 and 329, it is possible to increase or decrease the repulsive force on magnet 320. If both magnets 320 and 326 are permanent magnets, then a baseline repulsive force can exist without electrical power, and the direction of current in magnets 328 and 329 can be selected to either increase the repulsive force above the baseline, or decrease the force below the baseline. Both electromagnets 328 and 329 can be connected to a single amplifier and thereby operated together.

Figure 36A:
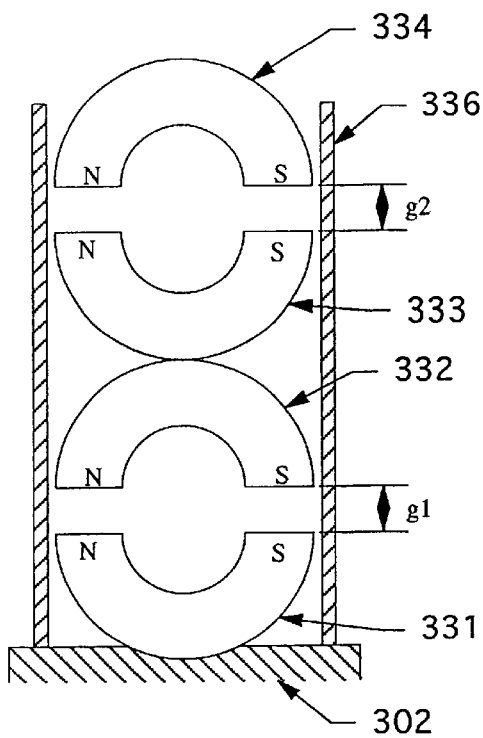
FIG. 36A is a schematic representation in side cross-section (at lines A—A, FIG. 36B) of a repulsive actuator of the invention, with two pairs of horseshoe magnets and two pairs of gaps.
Figure 36B:
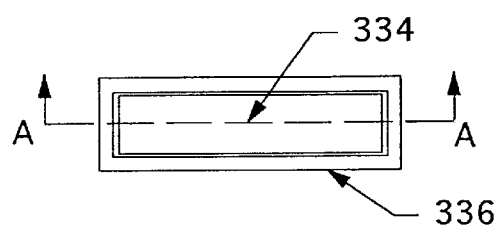
FIG. 36B is a top view of the multiple pair horseshoe repulsive actuator of FIG. 36A.

It is possible to incorporate curved magnets into a multi-gap repulsive actuator, as shown in FIG. 36A and FIG. 36B (FIG. 36B shows a top view, and FIG. 36A shows a side view cross-section at lines A—A of FIG. 36B.) The curved magnet 331 is held stationary relative to a reference body 302. A magnet 332 is oriented such that it is repelled by the magnet 331, and is attached to a magnet 333. Both magnets 332 and 333 move together vertically, while they are constrained by the travel guide 336. A magnet 334 is also constrained by the travel guide, and is held in an orientation that repels it from magnet 333. This configuration uses all poles of the magnets in a repulsive configuration, thus providing a large repulsive force. In addition, the multiple gaps (in FIG. 36A shown as g1 and g2) provide for an increase in range of motion.

Opposing Force Mechanisms

Figure 5A:
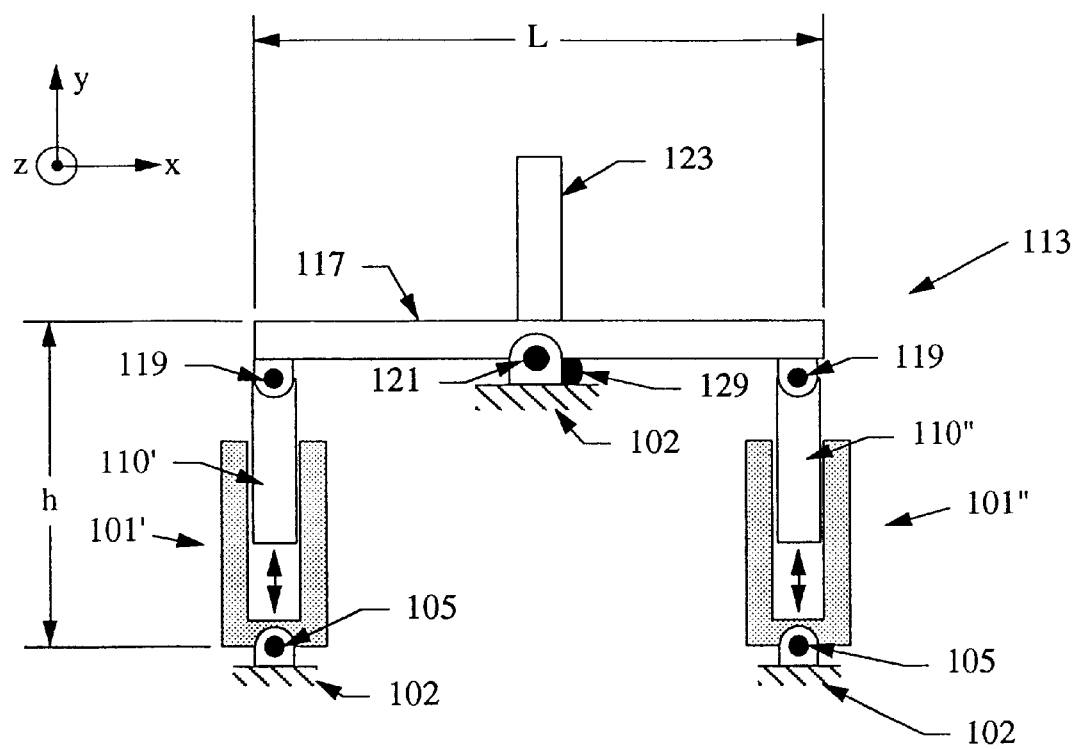
FIG. 5A shows schematically a mechanism that is movable through one degree of freedom, composed of two repulsive actuators, with movable magnets linked to each other, in a nominal home position.
Figure 17A:
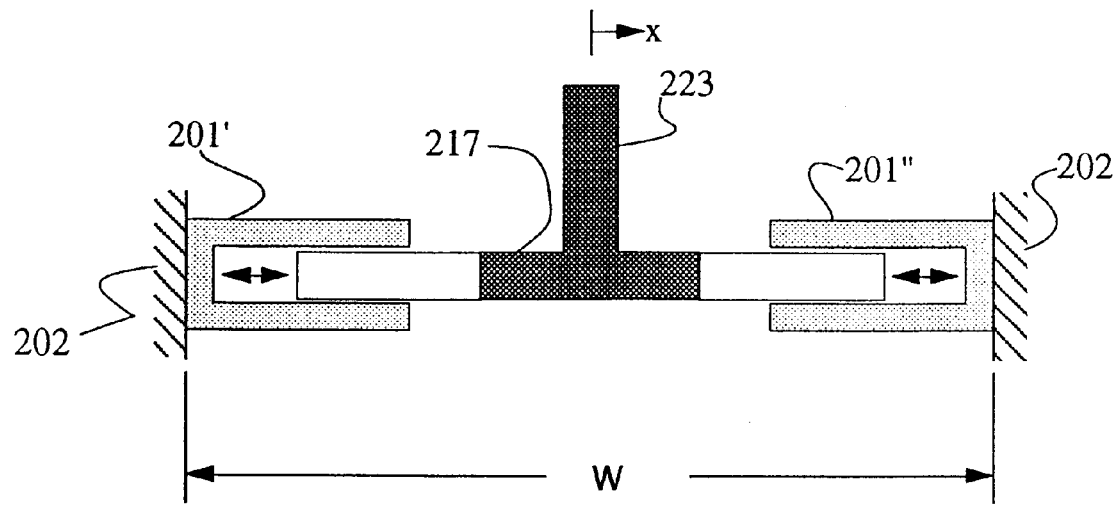
FIG. 17A is a schematic representation of a single repulsive actuator pair of the invention, linked to each other with moving magnets that move along substantially collinear dimensions.

Placing two actuators (of any type) in an opposing fashion (as shown in FIG. 5A and FIG. 17A, and as discussed below) is a nonstandard actuator configuration, because it requires two actuators to control a single degree of freedom. This has monetary, size and weight costs that are traditionally not desired. Nevertheless, use of opposing forces arises in nature, such as with the flexure and extension muscles in musculoskeletal systems. The device disclosed herein has many of the advantages of biological muscles and yet can be controlled with electrical power. The devices use repulsive magnetic actuators, such as those described previously, and configures these actuators in an opposing configuration. The combination of opposing actuators, and repulsive magnetic forces provide a number of advantages which will be described in detail in the following. Some of these advantages include, passive stability, and open loop control of position and stiffness.

These advantages provide for high fidelity motion and force output, and therefore are well suited for human interface devices such as force feedback joysticks. Another application is the construction of an electromechanical muscle, which can be used to simulate biological muscles. Other applications include adjustable stiffness devices, and high bandwidth mechanisms. For example in robotic assembly it is often useful to incorporate compliance into the robot gripper during assembly to accommodate part misalignment, yet this compliance can result in undesirable vibrations during periods of high acceleration of the robot gripper. The adjustable stiffness device presented here can be used to provide low stiffness during robot assembly, and high stiffness during high speed motion. Another application of stiffness control is the tuning of a system suspension. The natural frequency of a suspension system depends on the stiffness and mass of the system. Thus, the stiffness can be controlled to vary the suspension characteristics, or adapt to variations in mass.

There are numerous other advantages to these devices. These devices can be configured to return to a home position without expending energy, thereby increasing their energy efficiency and maintain a set position even with power off. These devices can be configured with a direct drive between the actuator and the mechanism output, thus eliminating the needs for a transmission which would otherwise introduce undesirable backlash and friction into the system. The actuators provide large forces near the limit of travel which minimizes detrimental impact forces with the travel stops. The configuration of the mechanism allows for low cost adjustment of the relationship between travel distance and force output, and thereby can provide a low cost actuator with a high level of force output.

The following description is divided into sections. The first section describes single Degree of Freedom (DOF)

mechanisms. The second section describes methods and apparatus for control of the mechanisms. The third sections describes multi-DOF mechanisms.

1-DOF Mechanism Using 2 Repulsive Actuators

This section describes a single DOF mechanism that is powered by two repulsive actuators (as shown in FIG. 5A and FIG. 17A.) The actuators use repulsive magnetic forces, such as those described previously. The actuators are configured and connected such that the force from one actuator opposes the force from the other actuator. In other words, an attempt to increase the gap in one actuator tends to reduce the gap in the second actuator, which attempted reduction is resisted by the repulsive forces in the second actuator.

The mechanism may have an output of translation, rotation, or both translation and rotation. The mechanism may display, to a user, position, velocity, acceleration, jerk (the derivative of acceleration), a force, or torque.

The interface member may be configured to display position information to the user, or to move a workpiece to a desired location, such as in a robotic end effector. Alternatively it may be configured to couple with a human user, such as by being grasped by a user's finger, hand, or mouth, or such as engaging a user's finger or foot. In general, the interface member may be sized and shaped so that it will engage with any human scale body member, such as a finger, hand, arm, tongue, mouth, head, foot, leg, buttocks or torso.

1 DOF Rotary Mechanism: Two repulsive actuators 101' and 101" can be coupled to each other to create a 1 DOF rotary mechanism 113 as shown in FIG. 5A. Any of the single repulsive actuator configurations discussed above can be used for the actuators 101' and 101", and the actuators 101' and 101" may be identical or different. Each repulsive actuator 101' and 101" is translationally fixed relative to a reference ground 102 through a hinge joint 105. The hinge joints 105 allow slight rotation of the repulsive actuators, to allow the moving magnets to move to close or open the gap, given other couplings described below. Typically, it will be assumed that each repulsive actuator has three magnets, one of which is an electromagnet and two of which are permanent magnets. There are two magnets that are fixed relative to the hinge 105, one of which is the electromagnet and one of which is a permanent magnet. The moving magnets 110' and 110" are permanent magnets and are coupled to a connecting link 117 through hinges 119. (Rather than this typical configuration, the two magnet configurations discussed above could also be used.) In the embodiment shown, the connecting link 117 is also coupled to the reference ground 102 through a hinge 121. An interface member 123 is coupled to the connecting link 117. If the interface is used as a display device, then it would be appropriate to consider the interface member 123 as a display member or output member. If the interface is used for a user to provide instructions to a machine, then it would be appropriate to consider the interface member 123 as an input member. Further, both input and output can be embodied in the same interface, for instance, when used as a haptic interface.

In general the interface member may consist of a number of segments coupled together. For example, in FIG. 5A the interface member 123 is coupled to link 117, and thus link 117 could also be considered part of the interface member. In the mechanisms described herein the designated interface member may not necessarily be the actual part through which the device interacts with an external environment, but rather this interaction may be done through a second component or components that is attached to the designated interface member.

A sensor 129 can be incorporated into the mechanism, and can measure position, velocity, acceleration, jerk (the derivative of acceleration), force or torque. The types of sensors that may be used include, but are not limited to, potentiometers, encoders, resolvers, optical, ultrasonic, strain gauges, capacitive, and magnetic. As will be presented in the following the sensor may be used as part of an input device or for closed loop control.

Figure 5B:
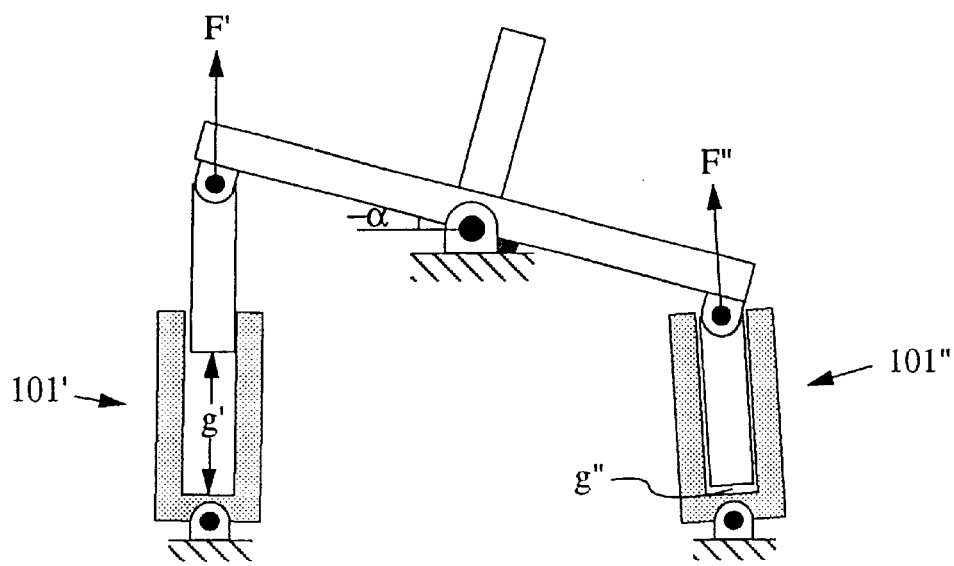
FIG. 5B shows the mechanism of FIG. 5A, in a position that is away from a nominal home position.

The embodiment shown in FIG. 5A is movable through one DOF, which may be characterized by a rotation about an axis that is collinear with the axis of the central pivot hinge 121 (coming out of the page) and can be quantified by the angle α, shown in FIG. 5B. The repulsive forces F' and F" from each of the actuators 101' and 101" result in the application of torques τ' and τ" to the connecting link 117 about the hinge 121. The torque from each actuator is equal to the force times the perpendicular lever arm from the pivot 121. By convention the torque applied by repulsive force from the right actuator 101" is considered to be positive, while the torque applied by the left actuator is negative.

Figure 17B:
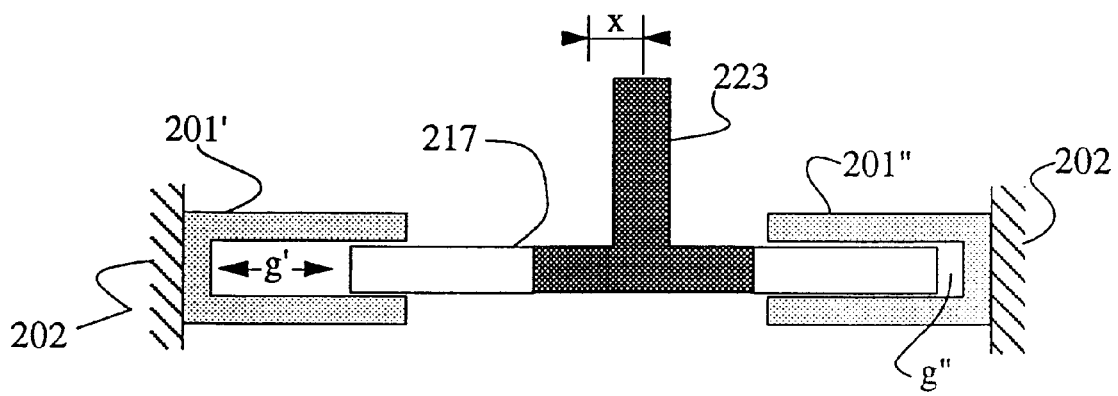
FIG. 17B shows the mechanism of FIG. 17A, in a position that is away from a nominal home position.

1-DOF Translation Mechanism: Alternatively, as shown in FIGS. 17A and 17B, two repulsive actuators 201' and 201" can be coupled to each other to create a 1 DOF translational mechanism. Each repulsive actuator 201' and 201" is fixed relative to a reference ground 202. As in the rotary case, typically it will be assumed that each repulsive actuator has three magnets, one of which is an electromagnet and two of which are permanent magnets. Two magnets are fixed relative to the reference ground, one of which is the electromagnet and one of which is a permanent magnet. The moving magnets 210' and 210" are permanent magnets and are coupled to a connecting link 217. An interface member 223 is coupled to the connecting link 217. In the embodiment shown in FIG. 17A, the DOF of the mechanism is translation of the interface member 223 along the dimensions indicated by the double headed arrows, and the actuators apply a force onto the interface member.

In FIG. 17B the mechanism is shown where the interface member is translated through its DOF to the right. This motion causes the gap g' in actuator 201' to increase while the gap g" in actuator 201" decrease.

Accordingly, a repulsive magnetic actuator can apply a force, a torque, or a combination thereof onto an interface member. The resulting motion of the interface member may include rotation, translation, or a combination thereof. Many of the characteristics of forces and translational mechanisms, apply also to torques and rotational devices. Accordingly, in the descriptions herein, when referring to a force, it should be understood that similar understanding can also be had regarding torques, unless specified otherwise. In a similar fashion, when describing translation of an object a similar understanding can also be made regarding rotation, unless specified otherwise.

Opposing Actuator Configuration

The repulsive actuators in FIG. 5A and FIG. 17A are configured in opposition to each other. This section describes what is meant by in "opposition." As shown in FIG. 5A and FIG. 17A, a component of the force and/or torque from one actuator is applied to another opposing actuator (typically through an interface member, but sometimes directly, for instance as shown in FIG. 17A), and a component of the force and torque component from the second, opposing actuator is in the opposite direction of that of the first actuator. Actuators can also be configured in opposition to passive energy storage devices, such as the spring shown in FIG. 10A, and gravity shown in FIG. 10B (which is discussed in more detail in a section on alternative opposing forces). Thus an opposing configuration can be defined in terms of general "force generators," where a force generator may be an active actuator, such as a repulsive electromagnet actuator or any general type of actuator, such as a motor (linear or rotary) a pneumatic or hydraulic actuator, or any other, less common actuators, such as magnetorestrictive, piezoelectric motors, polymeric gels and metal hydrades. Force generators also include a passive device such as a spring, a weight acting against gravity, or any other source of force.

By configuring a force generator in "opposition," it is meant that mechanical work (as defined by energy transfer) applied from the force generator will cause work to be done on at least one other force generator in the assembly that is connected to the interface member. An opposing configuration is also defined mathematically in terms of linear algebra using vector and matrix notation, as follows.

The class of mechanisms considered have their output presented through an interface member (such as 123 in FIG. 5), and a set of force generators apply forces and torques, directly or through intermediary links, onto the interface member. The motion of the interface member can be evaluated at a designated location on the interface member, and when the interface member is a rigid body the complete motion of the interface member is defined by the motion at the designated point. The velocity of the designated point is given by: $v=[v_x, v_y, v_z, \omega_x, \omega_y, \omega_z]^T$, where the first three variables indicate the Cartesian components of linear velocity and the last three variables indicate the Cartesian components of angular velocity. Lowercase variables in bold are used to indicate vector quantities, and uppercase variables in bold indicate matrices. The superscript "T" indicates the transpose of a vector or matrix. Thus v is a 6×1 column vector.

Figure 29:
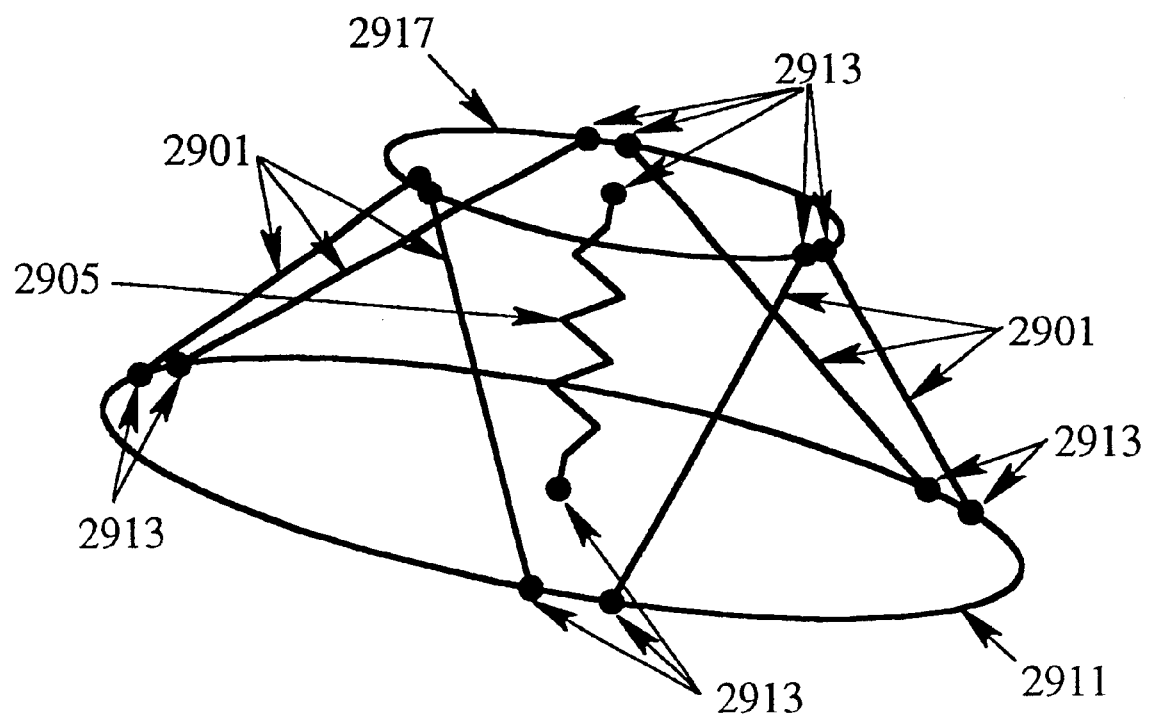
FIG. 29 is a schematic representation of a 6 DOF stewart platform controlled by repulsive actuators.

The DOF of an unconstrained rigid is six. However, in some mechanisms, the interface member may be constrained by a travel guide, such as a pivot 121 in FIG. 5A constrains the interface member 123. In other mechanisms, such as the Stewart Platform shown in FIG. 29, the interface member is unconstrained and has the complete six DOF. In either case, the number of DOF of the interface member is given by the variable "n." The admissible motion space of the interface member consists of the directions of velocity allowed by the DOF of the interface member. The admissible motion space can be defined in terms of the 6×n matrix, $A_p$. The columns of $A_p$ are orthonormal and span the space of the admissible motion at the designated point on the interface member. (Note for a given mechanism $A_p$ may vary depending on the position of the mechanism). The velocity vector v can be given by:

$$v = A_p a_p \tag{t1}$$

where $a_p$ is a n×1 column vector.

In a mechanism with "m", force generators, each force generator can be referred to by a subscript "i", where "i" is the corresponding integer between 1 and m. Each force generator can apply a force and/or torque onto the interface member, where the torque is specified at the designated location on the interface member. Typically each force generator applies a net force at a given contact point with the interface member, which can also result in a torque on the interface member. However, a force generator may also directly apply a torque onto the interface member, depending on how they are configured. The force and torque vector from the ith force generator is given by: $f_i=[f_{xi}, f_{yi}, f_{zi}, \tau_{xi}, \tau_{yi}, \tau_{zi}]^T$, where the first three variables indicate the Cartesian components of force and the last three variables indicate the Cartesian components of torque. The magnitude of $f_i$ is selected to be a value not equal to zero.

To show that the ith force generator is configured in opposition, the 6×(m−1) matrix, $B_i$, is defined with column vectors consisting of all the force vectors excluding the ith one, as shown in the equation below:

$$B_i = [f_1 | f_2 | \ldots f_{i-1} | f_{i+1} \ldots f_{m-1} | f_m] \tag{t2}$$

Energy is transferred to or from a force generator when a component of motion of the interface member is aligned with the direction of force (or torque) of the force generator. The components of admissible motion that are aligned with the forces comprising $B_i$, are given by projecting the matrix $B_i$ onto the admissible motion space, where the projection matrix is given by $(A_p A_p^T)$. This quantity can be further projected onto vector $f_i$ to see if there exists a component of force to oppose the force generator "i." If this projection is not equal to the null space, then there exists a non-zero component. Moreover, if one of these components is negative, then indeed the direction opposes the motion of the force generator "i." Accordingly, a force generator "i" is in an opposing configuration if the following equation is true $$(A_p A_p^T B_i)^T f_i \neq \{\emptyset\} \tag{t3}$$

and at least one component of the resultant of the left hand side of equation t3 is less than zero.

An example of the linear algebra interpretation is given with respect to the embodiment shown in FIG. 5A, where a Cartesian coordinate system is defined with a horizontal "x" axis, a vertical "y" axis, and a "z" axis perpendicular to the plane of the page. The designated location on the interface member is selected at the pivot 121. The force vector from actuator 101' is given by $f_1=[0\ 1\ 0\ 0\ 0\ -L/2]^T$, and the force from actuator 101" is given by $f_2=[0\ 1\ 0\ 0\ 0\ +L/2]^T$. The interface member 123 is constrained to rotate with a single DOF about the z axis, and thus $A_p=[0\ 0\ 0\ 0\ 0\ 1]^T$. To evaluate whether the first actuator is configured in opposition equation t3 is evaluated. Matrix $B_1$ is equal to $f_2$ (see eq. t2)=[0 1 0 0 0+L/2]$^T$. Using these values, the quantity on the left hand side of equation t3 is seen to be a 1×1 vector equal to $-L^2/4$. Thus it is shown that actuator 101' is configured in opposition. In a similar manner it is possible to show that actuator 101" is also configured in opposition.

1-DOF Mechanism: Description of Operation

Position Control: The mechanism 113 shown in FIG. 5A is in equilibrium when the sum of the torques on the interface member 123 is equal to zero. The interface member 123 can be held in an equilibrium position by applying repulsive forces from both actuators 101' and 101". Accordingly, when there is no external force applied to the interface member, the equilibrium position is defined as the "set position", $\alpha_{set}$, and occurs when the torques resulting from both actuators, $\tau'$ and $\tau''$, have equal magnitude. The set position can be adjusted by modifying the electrical current applied to the actuators. Since the embodiment shown in FIG. 5A is symmetric, when equal levels of current are applied to both actuators 101' and 101", the set position of the mechanism will be at an angle of $\alpha_{set}=0$.

Figure 7:
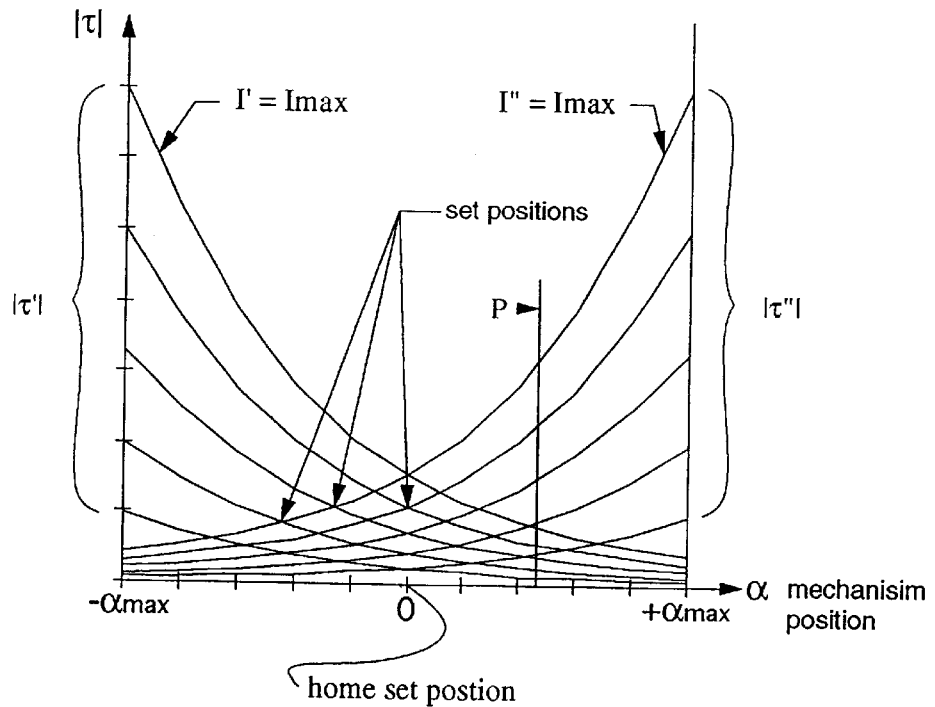
FIG. 7 is a graphical representation of the relation between the torque applied by a repulsive actuator and the displacement α from a nominal rest position, for different current levels, for a pair of linked repulsive actuators.

However, by adjusting the current to the actuators it is possible to specify arbitrary set positions. In FIG. 7, the absolute value of the torques applied to the interface member 123 resulting from each actuator is plotted for different levels of current. The torque from the left actuator 101', $|\tau'|$, corresponds to the force curves shown in FIG. 9 multiplied by the perpendicular lever arm to the hinge 121. These torques are maximum for a negative value of $\alpha$. The torques from the right actuator 101", $|\tau''|$, are also plotted in FIG. 7, and these torques are maximum for a positive value of $\alpha$. Possible set positions occur wherever $|\tau'|$ is equal to $|\tau''|$, which is indicated in FIG. 7 at intersections between the torque curves of $|\tau'|$ and $|\tau''|$. As seen in FIG. 7, set positions occur at multiple values of $\alpha$. Since the current level can be varied continuously, any arbitrary set position within a range can be specified. The set position that occurs when no current is applied to either actuator is defined as the home position, and is shown in FIG. 7 at $\alpha=0$ (for a symmetrical apparatus).

Passive Stability: An advantage of using repulsive magnetic forces for the opposing actuators is that the mechanism is passively stable, as described in the following. An equilibrium position of a mechanism can, in general, be stable or unstable. If an equilibrium position is unstable, then any slight external force would cause the mechanism to move farther away from the equilibrium position. Accordingly, for practical control of a mechanism, it is necessary that the equilibrium position be stable. Mechanisms that are unstable, such as an inverted pendulum, can be stabilized through active control. In active control, a feedback loop is used to control an actuator and restore stability. However, if the speed of the feedback loop is not sufficiently high, then stability may be lost. On the other hand, a passively stable device, such as a traditional pendulum, is stable without active control which greatly simplifies control of the mechanism.

For a mechanism to be stable, it must satisfy the following condition: when the mechanism is perturbed from an equilibrium position and then released, the forces acting on the mechanism must act to restore it to the equilibrium position. The mechanism shown in FIG. 5A is passively stable, meaning that it is stable without closed loop control of its actuators. Accordingly, passive stability is evaluated in terms of open loop control, where constant control currents are applied to both actuators. The stability of the mechanism shown in FIG. 5A can be demonstrated by considering what happens when link 117 is tilted clockwise, as shown in FIG. 5B, by an external force. To be passively stable, the actuator forces should act to restore the mechanism to its equilibrium position when the external force is removed. As shown in FIG. 5B, when link 117 is tilted clockwise under the influence of an external force, such as that applied when a user pushes the interface member 123, the gap g" within the right actuator 101" decreases. Therefore the repulsive force F" increases. Thus, the actuator 101" applies an increased torque to the link 117 in the counterclockwise direction. Simultaneously, the gap g' in the left actuator 101' increases and the force F' decreases. Thus, the actuator 101' applies a decreased torque in the clockwise direction. The net effect is that the total torque applied to the mechanism is in the counterclockwise direction, and thus tends to restore the mechanism to the equilibrium position shown in FIG. 5A, indicating passive stability.

Mathematically, it can be shown that a mechanism is in a stable equilibrium position if it takes a positive amount of work to perturb the mechanism from its equilibrium position. The physical quantity of work can be defined by force multiplied by distance; or, in the case of rotation, the torque multiplied by angle of rotation. The total actuator torque, $\tau_{act}$, applied by the actuators 101' and 101" onto the mechanism shown in FIGS. 5A and 5B, is given by:

$$\tau_{act}(\alpha)=\tau'(\alpha)+\tau''(\alpha) \tag{t4}$$

Figure 6:
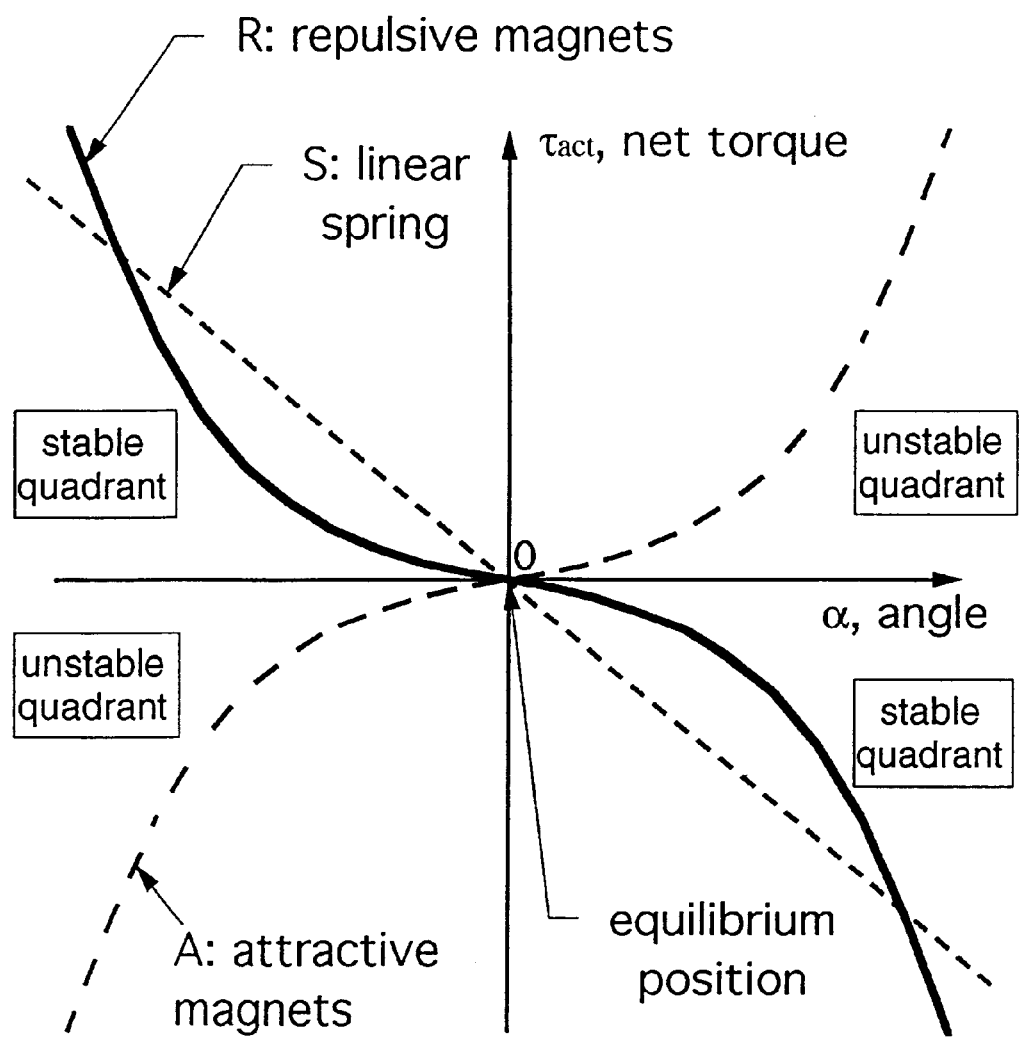
FIG. 6 is a graphical representation of the relation between the torque applied by a repulsive actuator pair unto an interface member and the angle of displacement α of the interface member from a nominal rest position, such as shown in FIG. 5B.

To evaluate passive stability, the value of $\tau_{act}(\alpha)$ is determined for a constant level of current being applied to each actuator. Curves of absolute value, $|\tau'(\alpha)|$ and $|\tau''(\alpha)|$, at different current levels are shown in FIG. 7. Due to the opposing force configuration, the magnitude of $\tau'(\alpha)$ is negative while the magnitude of $\tau''(\alpha)$ is positive. A curve for $\tau_{act}(\alpha)$ can be determined by combining curves for $\tau'(\alpha)$ and $\tau''(\alpha)$ for given levels of current in the actuators 101' and 101". A plot of $\tau_{act}$ vs. displacement $\alpha$, is shown in FIG. 6 by the curve R in the heavy line. It can be seen that the slope of $\tau_{act}(\alpha)$ is continually negative. An infinitesimal amount of work dW, applied to the mechanism, is given by:

$$dW=-\tau_{act}d\alpha \tag{t5}$$

where $d\alpha$ is an infinitesimal amount of motion. Stability is shown, since for any motion away from the equilibrium position at $\alpha=0$, the negative slope of curve R in FIG. 6 ensures that the magnitude of the product of dW is positive. If $d\alpha$ is positive, then $\alpha>0$ and $\tau_{act}$ is negative, resulting in a positive dW. Alternatively, if $d\alpha$ is negative, then $\alpha<0$ and $\tau_{act}$ is positive, also resulting in a positive dW. Thus, the mechanism is shown to be passively stable.

The characteristic of passive stability is due to opposing repulsive magnetic forces, and can be applied to both rotary and translational mechanisms. In the case of a translational mechanism, such as is shown in FIGS. 17A and 17B, the combined actuator force is given by, $F_{act}$, and the position of the mechanism is given by x. Here $F_{act}(x)$ is a simple summation of the repulsive forces from both actuators. Since repulsive magnetic forces increase monotonically as the gap, g, between the magnets decreases, as shown in FIG. 9, the curve of $F_{act}(x)$ is ensured to have a negative slope, and the mechanism will be passively stable. For a rotary mechanism, such as is shown in FIGS. 5A and 5B, passive stability is ensured by the negative slope of the torque vs. angle curve $\tau_{act}(\alpha)$. However, $\tau_{act}$ depends on both the actuator force and the length of the lever arm to the pivot point. In some rotational mechanisms, including the one shown in FIGS. 5A and 5B, the length of the lever arm can vary during motion of the mechanism due to changes in angles of the mechanism. In the embodiment shown in FIG. 5A, for small angular motion of $\alpha$, changes in the lever arm length are small. However, in the event of a relatively large motion of $\alpha$, such as 90 degrees for the configuration shown in FIG. 5A, the torques from the two actuator forces would not oppose each other any more, and therefore stable equilibrium positions could not be maintained. Accordingly, for rotational mechanisms, it is necessary to consider variations in lever arm length when evaluating stability. However, for rotary mechanisms with relatively small ranges of motion, it is usually possible to design the device such that changes in moment arms are relatively small and do not effect stability.

The stability of repulsive magnetic forces is compared in FIG. 6 to mechanisms held in equilibrium by mechanical springs and attractive magnetic forces. The torque that would be generated by opposing linear springs is shown by the dashed straight line curve S. Such a spring system is stable, since its torque monotonically increases as the angle $\alpha$ decreases, and occupies the same quadrants in the plot as the repulsive electromagnetic actuator forces curve R discussed above. (A disadvantage of a spring system is that its stiffness cannot be modified electrically.) Indeed, these quadrants correspond to a stable system. However, if opposing attractive magnetic forces were used, as shown at dashed curve A (as in traditional solenoids, or two permanent magnets), then the equilibrium position would not be stable. Curve A occupies the quadrants that correspond to an unstable system. While attractive magnetic forces can hold an item in equilibrium, a small perturbation would cause the mechanism to be pulled away from its equilibrium position.

The force output from most actuators is not primarily from repulsive magnetic forces, and thus most actuators would not provide passive stability even if configured as a pair in an opposing configuration. Many actuators are specifically designed to provide a constant level of force or torque output over their range of motion. For example, most pneumatic and hydraulic actuators have a constant force output over their length of travel. Electric motors are typically designed to have a constant torque output (i.e. torque ripple is minimized) over their output positions. If two actuators with constant force levels are put in an opposing configuration, any disturbance force or small difference in force levels will result in one actuator eventually pushing the other one all the way to the limit of travel. In addition, actuators with a constant force output over distance will not provide the open loop stiffness control presented by the invention and discussed in the following section. Thus, passive stability achieved by the proposed invention arises due to the use of opposing actuators and the characteristic of monotonically increasing repulsive magnetic forces.

Accordingly, the use of opposing repulsive magnetic forces provides for passive stability. This stability, is similar to the stability that can be achieved by mechanical springs, yet the magnetic forces can be controlled electrically which is not the case with mechanical springs. Moreover, the use of repulsive, instead of attractive, magnetic forces, provides for passive stability. Passive stability enhances the ability to control the mechanism. It is not necessary to actively direct the mechanism back to a stable set position, because it automatically assumes the position. If it were necessary to control the mechanism to assume these positions, as is the case in attractive magnetic systems, significant computational loads would be demanded by the system. If these computational loads are not met, the system would become unstable or appear to react very slowly and thus degrade performance.

Open Loop Stiffness Control: All position control systems have a stiffness associated with them, which corresponds to the restoring force that arises when the object being positioned is displaced from its equilibrium position by an external force. An advantage of a mechanism of the invention that uses opposing repulsive electromagnetic actuators, is that the stiffness can be controlled in an open loop fashion. Most known systems are unable to provide stiffness control with an open control loop.

Figure 21:
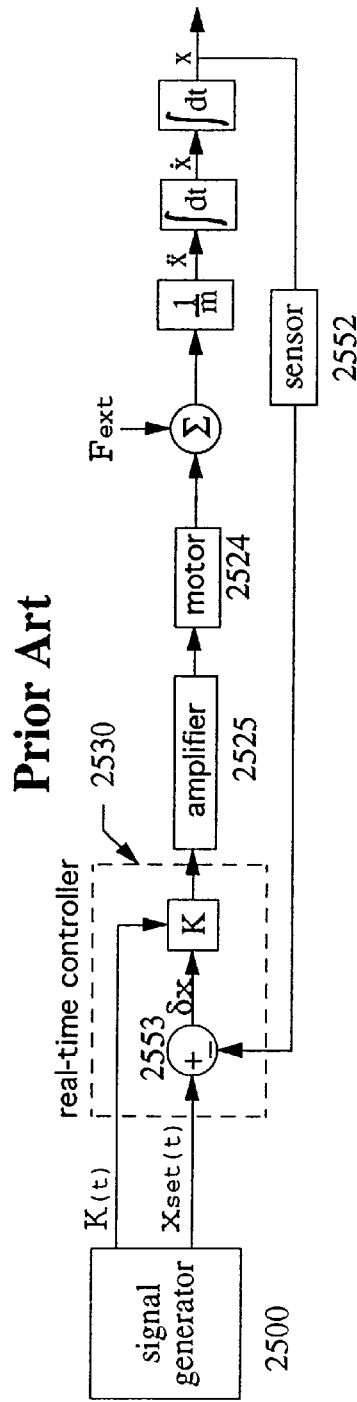
FIG. 21 is a schematic representation in block diagram form of a prior art control apparatus for a motor actuator.

To control stiffness with a traditional system, a closed loop controller is required that monitors position sensors and generates the appropriate command signals to the actuators. A block diagram of a typical prior art stiffness controller is shown in FIG. 21. A signal generator 2500 specifies the desired set position, $x_{set}$, and stiffness K. A sensor 2552 measures the actual output position, x, of the mechanism, which is fed back and summed at a summer 2553 to the specified set position, $x_{set}$, to generate a position difference signal, δx. The real-time controller 2530 multiplies the position difference, δx, by the specified time dependent stiffness signal, K(t), to generate the required voltage. signal that is amplified by an amplifier 2525 and delivered to the motor 2524. This configuration requires a position sensor 2552 as well as a real-time controller 2530 to perform the feedback calculations. When the closed loop controller is implemented with a digital computer, the time required for measuring the sensed position and calculating the output motor current command, causes a computational delay in the feedback loop. This computational delay causes a lag between movement in the output position under the influence of an external force $F_{ext}$ and the required restoring force from the actuator. This computation delay reduces the bandwidth of the system and can cause instability in the system. Even if stability is maintained the computational delay can degrade the quality of haptic interface devices, and the limiting factor with some haptic interface devices is the computational delay [see Burdea, Ch. 8, cited previously]. Thus, the problems of closed loop position control, discussed above, exist. The system response time is affected by the data capture speed of the position sensors 2552. Further, the control apparatus would then need to process the position measurements and calculate the appropriate actuator commands. All of these steps take time, and can significantly impair the response time of the system, thereby necessitating relatively powerful and speedy signal processors (computers) to perform adequately.

Such a known system is described generally in A Force Feedback Programming Primer, For Gaming Peripherals Supporting DirectX 5 and I-FORCE 2.0, Louis B. Rosenberg, Immersion Corporation, San Jose, Calif., 1997, which is incorporated herein fully by reference. This article discusses a distributed processing architecture, where a local force processor is within a first, local control loop, between sensors and motors that control a haptic interface peripheral, such as a handpiece. The local force processor is also part of a host control loop, where it receives force commands from a host computer, and sends position data and button data to the host computer.

Open loop stiffness control is a significant advantage of the invention. In open loop control there is no need for a position sensor or a real-time controller, and thus the problems associated with computational delay do not affect system performance. As will be shown in the following, when the repulsive forces are simultaneously increased in both actuators in FIG. 5A, the stiffness of the mechanism increases (just as a person can co-contract their flexor and extensor muscles in their arm to increase its stiffness without changing its position or orientation). To illustrate open loop stiffness control, the embodiment in FIG. 5A is considered. The stiffness level corresponds to the magnitude of the restoring torque, $\tau_{act}$, generated by the repulsive actuators 101' and 101" for a given displacement, δα, from the set position, $\alpha_{set}$. As seen in FIG. 6, the magnitude of $\tau_{act}$ for a given δα depends on the steepness of the $\tau_{act}(\alpha)$ curve (heavy curve R). Accordingly, the stiffness level close to the set position corresponds to the slope of the $\tau_{act}(\alpha)$ curve at $\alpha = \alpha_{set}$. The slope of the $\tau_{act}(\alpha)$ curve varies, as seen the in FIG. 6, due to the nonlinearity of magnetic forces. This nonlinearity provides advantages to the mechanism that are discussed below. However, regardless of the nonlinearity, the restoring force and stiffness will increase as the overall steepness of the $\tau_{act}(\alpha)$ curve R increases.

The ability to select different stiffness values can be seen with reference to FIG. 7. There are multiple actuator current levels (and corresponding force levels) for a given value of α. The different current levels generate different slopes in the actuator torque curves, and thereby different stiffness levels. It is possible to identify different stiffness configurations for each set position, by moving vertically in the graph in FIG. 7 along a line, such as P. To increase the stiffness, the current in both actuators is increased. The increase in opposing repulsive forces does not necessarily change the set position, but as shown in FIG. 7, the intersection point between the right and left actuator torques occur at a higher torque absolute value and with steeper slopes in the torque vs. position curves. Steeper slopes of $|\tau'|$ and |τ"| correspond to steeper slopes of $\tau_{act}(\alpha)$ and an increase in stiffness. Thus, the overall stiffness of the mechanism can be controlled.

Figure 8:
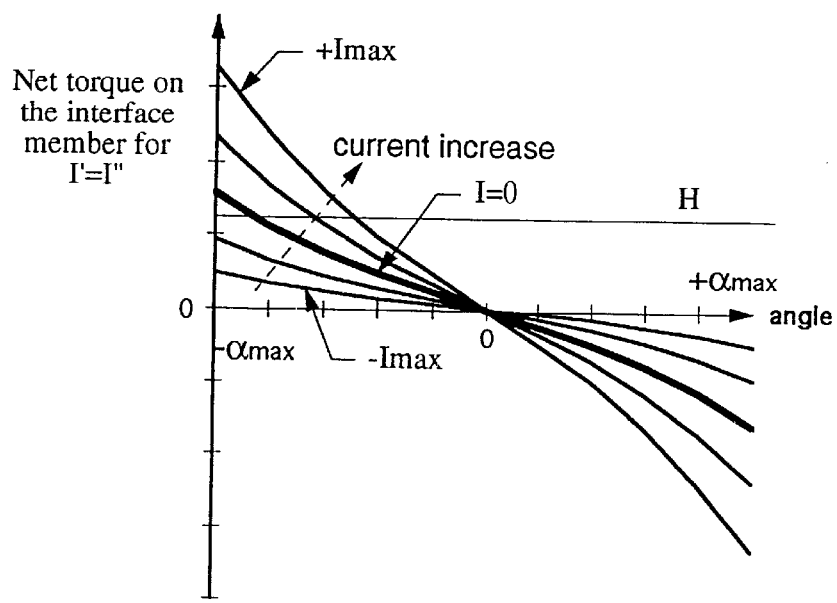
FIG. 8 is a graphical representation showing the net torque applied to a link between two repulsive actuators configured as shown in FIG. 5A, vs. the angular displacement α from a nominal rest position, for different levels of current being supplied equally to each of the two repulsive actuators in the pair.

FIG. 8 illustrates stiffness control of a pair of repulsive electromagnetic actuators. The curves in FIG. 8 show the curves of $\tau_{act}(\alpha)$ when the current in both actuators 101' and 101" are equal. Each curve corresponds to a different level of current. The different curves in FIG. 8 all have the same set position. As the current is increased, the slope of the curve about the set position increases, which indicates an increases in stiffness. When the repulsive actuator includes two permanent magnets along with an electromagnet, as shown in FIG. 1A, a baseline stiffness level occurs with a zero current level. The stiffness can be increased and decreased from the baseline stiffness, through positive and negative current levels as shown in FIG. 9.

FIG. 7 can be considered to be a lookup table for controlling the position and stiffness of the mechanism. The designer can select the desired angular set position by moving along the horizontal axis, and select the desired stiffness by moving vertically. At the desired position and stiffness level, the appropriate current levels, I' and I", for the two actuators, 101' and 101" can be determined by the curves in FIG. 7.

Figure 16:
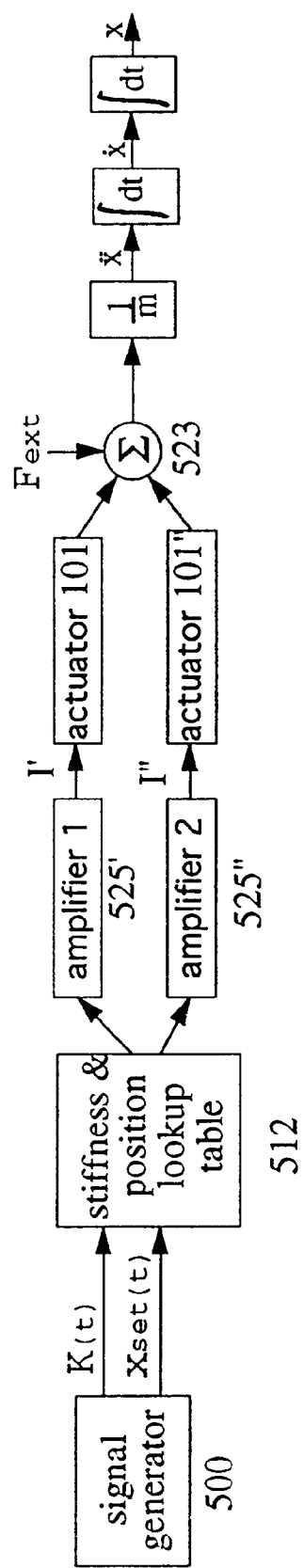
FIG. 16 is a schematic representation, in flow chart form, of a method of the invention of controlling a pair of repulsive actuators to independently signal a stiffness and a position to a user.

A method and apparatus for implementing combined position and stiffness control is shown in FIG. 16. The notation in FIG. 16 corresponds to either rotation or translational mechanisms, such as those shown in FIG. 5A and FIG. 17A. For simplicity both translational and rotational positions are designated to by the variable "x," and the set position of the mechanisms are designated by $x_{set}$. A signal generator 500 specifies the desired position, $x_{set}(t)$, and stiffness, K(t) values, which may be a function of time, t. A lookup table 512 is used to specify the current levels I' and I" that correspond to $x_{set}$ and K. The signals for I' and I" are sent to corresponding amplifiers, 525' and 525", which power a pair of repulsive actuators, 101' and 101" respectively. The actual position of the mechanism depends on the magnitude of the external force. In the absence of an external force $F_{ext}$, the position the mechanism assumes is the specified set position. When an external force $F_{ext}$ is present, the mechanism will be displaced from the set position in an amount corresponding the stiffness level. The external force $F_{ext}$ and the combined forces from the actuators are all applied together to an interface member 523, and are thus summed mechanically there. The interface member moves to a position x, which depends on its mass, as indicated schematically in FIG. 16 by the 1/m box, followed by the two boxes indicating integration over time. It should be noted, that even with closed loop controllers (FIG. 21), disturbance forces generate deviations from the set position with an open loop system. When large deviations from the set position are undesirable, larger stiffness values can be used. Accordingly, the invention presents a method where stiffness and position of a mechanism can be electronically controlled without a feedback loop, real-time controller, or a position sensor.

Various methods can be used to implement the lookup table 572. One could use curves, such as those in FIG. 7, to generate the exact current levels for each actuator that correspond to $x_{set}$ and K. However, a simplified approximation is also possible. The current I' and I" to each actuator can be calculated in terms of constants of proportionality; $C_p$ is a position constant, and $C_k$ is a stiffness constant. When the repulsive actuators contain permanent magnets in a repulsive configuration, such as the embodiment shown in FIG. 1, then even with a zero level of current, repulsive forces are generated. The position and stiffness at a zero level of current, are designated by $x_{set}=x_0$ and $K=K_0$. A simplified method for calculating the current commands can be given by:

$$I'=+C_p(x_{set}-x_0)+C_k(K-K_0) \tag{t6}$$

$$I''=-C_p(x_{set}-x_0)+C_k(K-K_0) \tag{t7}$$

An increase in $x_{set}$ will increase the current I' while decreasing the current I". An increase in K, increases both I' and I". Thus the position, x, and the stiffness, K, can be controlled independently. An advantage of the above equations is the simplicity due to the linear form. These equations provide an approximation based on the actual nonlinear magnetic forces. If higher levels of accuracy are desired, the values of $C_p$ and $C_k$ can be determined from a simple lookup table.

Thus, an advantage of the invention is the ability to control the position and stiffness of a mechanism in an open loop fashion. Moreover, a method is presented for independently controlling position and stiffness. Accordingly, numerous disadvantages associated with active stiffness control can be avoided. A position sensor and real-time feedback controller are not required. The problems due to computational delay, such as instability and reduced performance are eliminated. High quality stiffness control is especially important in haptic displays, where the user may perceive even a slight sluggishness in the system. The advantage of open loop stiffness control is also relevant to high speed mechanisms where even small computational delays will effect system performance.

Single Amplifier Position Control: The control method illustrated in FIG. 16 allows for independent control of position and stiffness, yet requires two amplifiers. In certain circumstances it may only be necessary to control position, without specifying the stiffness value independently. This approach is useful when the default stiffness generated by the repulsive actuators is satisfactory. Under these circumstances it is possible to reduce the cost of the system by using a single amplifier.

Figure 14:
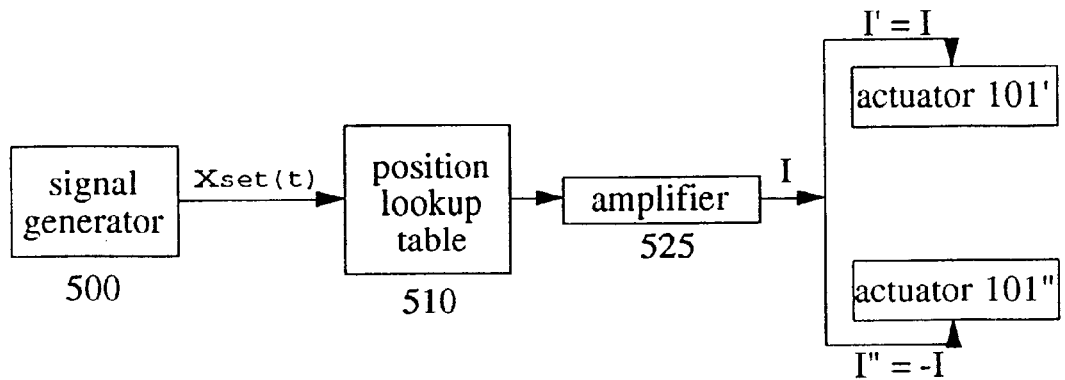
FIG. 14 is a schematic representation, in flow chart form, of a method of the invention of controlling a pair of repulsive actuators to signal a position to a user.

A method and apparatus that uses a single amplifier for controlling the position of a mechanism that uses opposing repulsive actuators, is shown in FIG. 14. A single amplifier, 525, is connected to both repulsive actuators 101' and 101". For the repulsive actuator embodiment shown in FIG. 1A, one side of the electromagnet 14 is connected to the amplifier and the other side is connected electrically to ground. However, for the embodiment shown in FIG. 14, the electrical connections are made such that the direction of current is reversed in one actuator; thus I'=−I". Accordingly, if the control method shown in FIG. 14 is connected to the embodiment shown in FIG. 5A, then an increase in current from the amplifier will increase the repulsive force in one actuator 101' and decrease the repulsive force in the other actuator 101". The net effect will be rotation of the interface member 123 clockwise. A position lookup table 510 similar to the one used for independent control of stiffness and position, can be used to specify the current level for a given position. The simplified approach shown in equations t6 and t7 can also be used, although in this case the stiffness, K, is set equal to $K_0$.

Thus, the method of controlling the position of an output member 123 of an actuator pair wired as described in FIG. 14 is straightforward. A position command is generated by a position commander signal processor 500, based on a user command, a programmed command, etc., and a current signal is generated with reference to a position lookup table 510. The current signal is passed to a current amplifier 525, which generates the current I that corresponds to the position command. As mentioned above, the required current can be calculated, looked up in a table, etc.

An advantage of this position control method is that it only uses one current amplifier. A disadvantage is that the stiffness of the system cannot be independently controlled.

Single Amplifier Stiffness Control: In certain circumstances it may only be necessary to control the stiffness independently, without controlling the set position of the mechanism. For example, it may be desirable for a robot end effector to have a high stiffness during high accelerations, and a low stiffness during times when it is being used to contact a workpiece, while maintaining the same set position of the end effector. Under these circumstances it is also possible to reduce the cost of the system by using a single amplifier.

Figure 15:
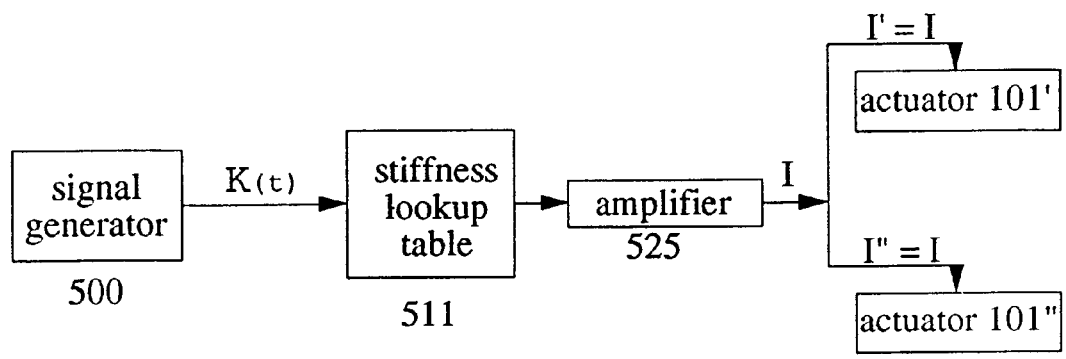
FIG. 15 is a schematic representation, in flow chart form, of a method of the invention of controlling a pair of repulsive actuators to present a stiffness to a user.

A method and apparatus that uses a single amplifier for controlling the stiffness of a mechanism that uses opposing repulsive actuators, is shown in FIG. 15. Here a single amplifier, 525, is connected to both repulsive actuators, such that I'=I". Accordingly, an increase in current from the amplifier will increase the repulsive force in both actuators and increase the mechanism stiffness. For a symmetric mechanism, such as the one shown in FIG. 5A, the stiffness will increase while the set position will remain stationary, as shown by the curves in FIG. 8. A lookup table 511 similar to the one used for independent control of stiffness and position, can be used to specify the current level for a given stiffness. The simplified approach shown in equations t6 and t7 can also be used, although in this case the set position, $x_{set}$, is set equal to $x_0$.

One could implement single amplifier stiffness control in a non-symmetric mechanism, either with a longer lever arm for one actuator, or with different repulsive actuators on either side. In the non-symmetric embodiment, as the current to both actuators is increased, the position of the mechanism will move together with the increase in stiffness. Thus, one could generate a predetermined motion of the interface member that corresponds to changes in stiffness levels. However, with a single amplifier the position and stiffness can not be changed independently.

An advantage of this stiffness control method is that it only uses one current amplifier. A disadvantage is that the position of the system cannot be independently controlled.

Closed Loop Implementation: One of the advantages of the invention is the ability to control the position and stiffness in an open loop fashion. However, under certain circumstances it may be desirable to add closed loop control to the system. With closed loop control one could incorporate sensors, such as position, velocity, acceleration, or force sensors. This sensory information could be used to provide information about the system and enhance system performance.

Figure 22:
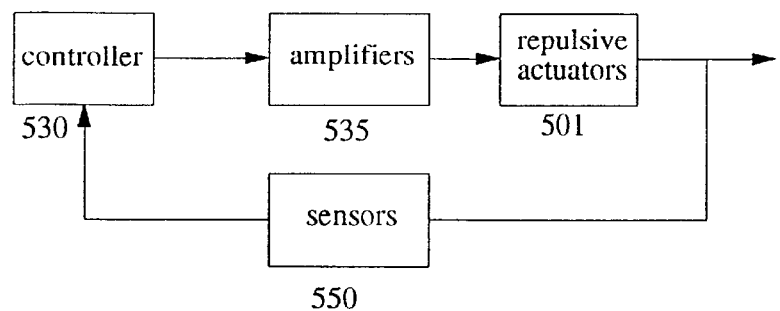
FIG. 22 is a schematic block diagram showing an embodiment of the invention operating under closed loop control.

The ability of the invention to operate under open loop control does not preclude the implementation of closed loop control. Indeed, any closed loop control method that can be implemented in a traditionally actuated system, can also be implemented with a mechanism that is actuated with opposing repulsive actuators. A block diagram of a closed loop control arrangement is shown in FIG. 22. The controller 530 provides commands to amplifiers 535 which power repulsive actuators 501. The output of the system is measured by sensors 550 and fed back to the controller 530. The sensors 550 may measure position, velocity, acceleration, jerk (the derivative of acceleration), or force. The types of sensors that may be used include, but are not limited to, potentiometers, encoders, resolvers, optical, ultrasonic, strain gauges, capacitive, and magnetic.

The feature of open loop stability can improve system performance even when under closed loop control. Many traditional actuators are unstable in open loop control. Accordingly, when closed loop control is implemented with traditional actuators, the feedback delay due to sensor measurement and control calculations can lead to instability and poor system performance. Thus if a controller does not update the commands to a traditional actuator at a sufficiently fast frequency, the system can become unstable. However, systems composed of opposing repulsive actuators such as the one shown in FIG. 5A, have inherent open loop stability. During any computational delay, the commands to the repulsive actuators will remain constant, yet open loop stability and high quality stiffness will be maintained. Thus, excessive computational delay will not cause instability, or low quality stiffness control.

Figure 23:
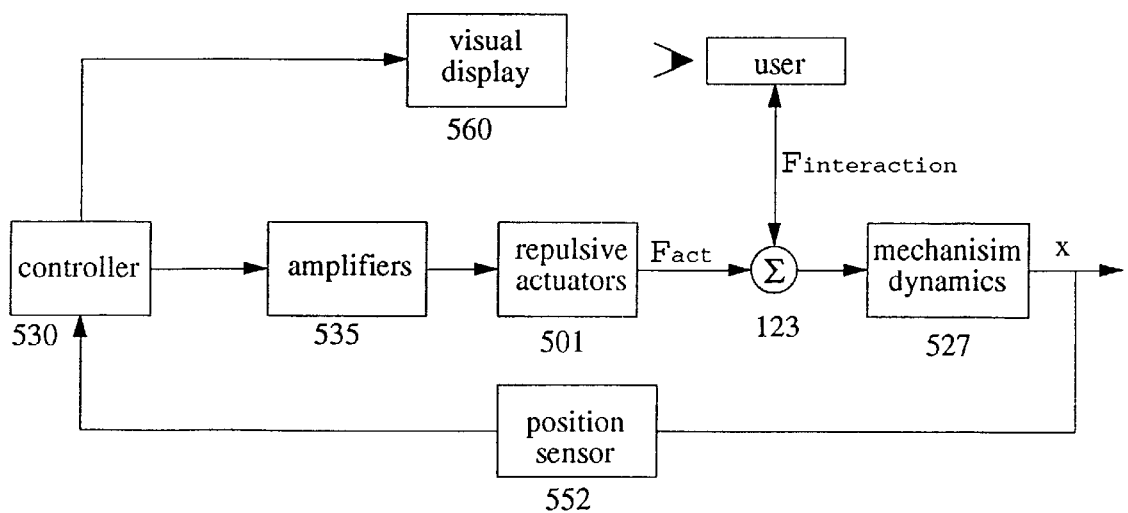
FIG. 23 is a schematic block diagram showing a closed loop control embodiment of the invention configured as a haptic interface.

One application of closed loop control is in the control of a haptic feedback device used for computer or game input. Such haptic devices can impart touch and force sensations to the user. A block diagram of such a system is shown in FIG. 23. The user generates interaction forces, $F_{interaction}$, with the mechanism through grasping an interface member, 123, or through contact with another part of the user's body. The interaction forces contribute to motion of the mechanism 123, due to the components' dynamics, indicated schematically at 527. The position, x, of the mechanism is sensed by a position sensor 552 and fed back to the controller 530. Thus, the user can transmit a signal to the controller 530 by exerting a force and moving the mechanism 123. The position measurement of the mechanism can be used by the controller 530 as an indication of the user's intent. The controller 530 can process this information and generate a corresponding signal on a visual or other display 560 for the user. In addition, the controller 530 can specify signals to amplifiers 535 to generate forces in the repulsive actuators 501.

An example of haptic feedback applications is a simulation of a virtual environment. The controller would be programmed to generate interaction forces that would be similar to the forces that the user would feel if the user were actually contacting such an environment. Another application is the control of a robot at a distant location. Here the controller would be programmed to generate interaction forces with the user that are similar to the forces that are exerted upon the robot. There are numerous other applications of haptic feedback input devices, and the interaction forces can be used to convey various types of information to the user.

Force Control: In certain applications it is desirable to control the level of force, $F_{interaction}$, exerted by a mechanism onto the environment. If the level of force does not have to be precisely controlled, it is often sufficient to implement open loop control of the stiffness and set position as shown in FIG. 16. In general, lower stiffness will result in lower forces, and vice versa. However, for accurate control of the force level, sensory feedback control can be used. The following addresses implementing accurate force control using either a force or position sensor.

A direct method for controlling the interaction force is by incorporating a force sensor among the sensors 550 in the feedback loop shown in FIG. 22. By comparing the measured force to a desired force, the controller 530 can increase or decrease the amplifier 535 commands to the different repulsive actuators 501 until the desired force level is attained.

An alternative method for controlling the interaction force level can be accomplished by using a position sensor. In certain applications, such as a haptic computer input device shown schematically in FIG. 23, position sensors are already present. Accordingly, this approach eliminates the need for a force sensor. FIG. 24 shows how position feedback can be used to control the interaction force, $F_{interaction}$. A force lookup table 513 is provided that relates the position of the interface member 123 to the force generated by the actuators 501. The controller 530 specifies a desired force level, $F_{des}$. The force lookup table 513 is then used to relate the position feedback signal from the position sensor 552 to a desired force, to determine the appropriate commands to the amplifiers 535.

The force lookup table 513 can be based on the curves of net torque (or force for a linear mechanism) vs. position, as shown in FIG. 8. For any combination of currents to an actuator pair, there is a corresponding set position and stiffness. Moreover, the steady state interaction force depends on the deviation of the mechanism from its set position and the stiffness. Accordingly, a horizontal line H could be drawn in FIG. 8 at the level of $F_{des}$. Each point that this horizontal line intersects with a curve of net forces, corresponds to a level of current that can generate the desired force. The input to the lookup table is $F_{des}$ and the position of the mechanism, x. (FIG. 8 shows rotational position α, which is directly analogous to position x, discussed above.) Accordingly, the lookup table could be written to specify either a high stiffness with an $x_{set}$ that is close to x, or a lower level of stiffness and an $X_{set}$ that is farther from x.

An alternative control method is open loop force control, which does not use either a position or force sensor. To implement this method with a two actuator mechanism, such as the one shown in FIG. 17A, one can increase the repulsive force in one actuator and decrease it in the other actuator. The net effect will be a force applied to the interface member, which can be transmitted to an external object which is in contact with the interface member. Thus without measuring position or force, by changing the repulsive force in the actuators it is possible to apply a force. Since the actuators are nonlinear, the magnitude of the applied force may depend on the position of the magnets within the actuators, which correspond to the position of the interface member. Therefore, the exact magnitude of the applied force may not be known, and the accuracy of this open loop force control may not be as high as the alternative approaches described above. Moreover, as the external object which is in contact with the interface member moves, the applied force may also vary. Nevertheless, regardless of the position of the mechanism, increasing the repulsive force in some of the actuators and/or decreasing it in other actuators can exert a force onto the interface member, in an open loop fashion.

Control of a Haptic Input Device: A haptic interface device can be used for computer input, such as for the use of force feedback joystick for a computer game. Such a device consists of an actuated mechanism with a position sensor. The position measurement is used for the computer input. The actuated mechanism can be used to impart interaction forces to the user.

A number of arrangements can be used to control a mechanism with opposing repulsive magnetic forces as a haptic input device. For example, one could use the force control arrangement shown in FIG. 24 to generate the desired interaction forces. However, this method uses sensor feedback to generate the desired level of force, and thus the performance can be degraded by computational delay in the feedback loop. An advantage of a mechanism with opposing repulsive magnetic forces, is its ability for high quality open loop stiffness and position control. This advantage can be applied to haptic interfaces, by using stiffness and position control to generate the desired interaction forces with the user. A position sensor is still required to provide the computer input, but the quality of the stiffness control would not be affected by the computational speed.

In many haptic input applications, the objective is to simulate the user's interaction with a real or virtual control device, such as the interaction between a driver and the steering wheel of a car. In the example of driving a car over a bumpy road, the steering wheel will vibrate in the hands of driver when the car's wheel drives over a series of ruts. The position and forces of the steering wheel depend upon the road conditions, the car, and the driver. A driver who exerts large forces may be able to reduce the steering wheel vibrations. Conversely, when a driver loosely grips the steering wheel, the vibration level will correspond to ruts in the road. Accordingly, the behavior of the steering wheel can be simulated by a trajectory of set positions and stiffness. To simulate the driving example, the set positions of the haptic interface would be defined by the ruts in the road, and the stiffness would correspond to the car's steering mechanism (e.g. power steering would correspond to low stiffness).

In this fashion, high quality haptic feedback can be implemented by specifying the position and stiffness of the device being simulated, and without explicit control of the force level. The position input to the computer can be used to modify the events in the computer program, and thereby change the position and stiffness commands. Thus the overall mechanism is under closed loop control, and it is possible to achieve arbitrary interaction forces with the user. In the case of simulation of a control device, such as the steering wheel simulation described above, the stiffness and set position trajectories can often be specified with only intermittent modifications due to position feedback. Accordingly, high quality of immediate stiffness and position control can be achieved without a high speed feedback loop.

The open loop position control, with a single amplifier, shown in FIG. 14, can also be used for the control of a haptic interface. Forces can be imparted to the user by moving the set position, as seen in FIG. 8. When the set position is moved, the repulsive force in one actuator is increased and decreased in the other, and thereby a net interaction force is imparted to the user. The interaction force also depends on the actual position of the mechanism. Accordingly, the position feedback used for the computer input, can also be used to determine the exact level of the interaction force. Thereby arbitrary levels of forces can be applied to the user using the single amplifier position control.

Damping Control: The dynamics of a mechanism can be characterized by its response to changes in position, velocity, and acceleration. The forces that arise within a mechanism as a result of velocity of the mechanism are its damping. It is often desirable to control the damping of a mechanism, for example to reduce vibrations. As with any actuated mechanism, it is possible to incorporate damping control into a mechanism with opposing repulsive actuators by using a velocity sensor and feedback control, in a configuration such as the one shown in FIG. 22.

However, an advantage of mechanisms with opposing repulsive magnetic actuators, is that open loop damping control can be implemented in a fashion similar to open loop stiffness control. The plots of mechanism force (or torque) shown in FIG. 6 and FIG. 7 correspond to the steady state forces (or torques) applied by the actuators. The steady state is after the motion stops. While motion is occurring in an actuator, a magnet is moving in a magnetic field. Due to the nature of magnetic forces, a component of the magnet forces applied to the moving magnet are proportional to the velocity of the moving magnet and the magnetic field. Thus, such a force corresponds to an internal damping force.

Accordingly, by controlling the current to the actuators in a mechanism, it is possible to modify the damping of the mechanism. As indicated previously, changing the current will also change the stiffness and set position of the mechanism. Thus, it is not possible in a mechanism with opposing repulsive magnetic forces to implement independent open loop control of position, stiffness, and damping. However, one could implement open loop damping control, while forsaking control of either position or stiffness. For example, one could implement position and damping control, by substituting the stiffness and position lookup table in FIG. 16 with a damping and position lookup table.

Adaptive Control: A general advantage of adding a sensor and feedback loop to a mechanical system, is that closed loop control can increase accuracy of the system. However, typical closed loop control systems require real-time feedback control to maintain stability and the feedback loop must be operated quickly to achieve a high bandwidth system. Thus, traditional real-time control has disadvantages; steady state errors can be introduced, and delays in the feedback loop can degrade performance as described above. The adaptive control methods and apparatus described in this section provide the advantages of increased accuracy from sensory feedback, without the aforementioned disadvantages of real-time closed loop systems. The adaptive control methods described here are applied to systems that can be controlled in an open-loop fashion. Thus, sensory feedback is used to increase accuracy, yet is not required for stability or real-time control and the speed of the feedback loop is not as critical for system fidelity. These adaptive control methods can be used for automatic calibration of a mechanism, and automatic generation of an open loop control lookup table.

Figure 41:
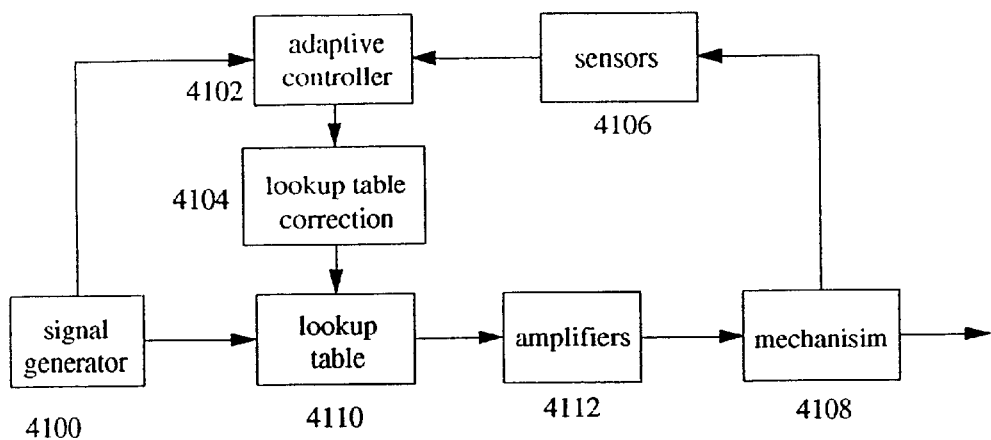
FIG. 41 is a schematic representation of an adaptive control method and apparatus of the invention that can be used to control mechanisms that can be used under open loop control.

FIG. 41 shows an adaptive control method and apparatus that can be used to control mechanisms that have the capability of open loop control, such as those shown in FIG. 14, FIG. 15, FIG. 16, and FIG. 24. Open loop control is provided in the following manner. A signal generator 4100 provides a signal that indicates the desired mechanism output to a lookup table 4110. The lookup table output is sent to the amplifiers 4112, whose output controls the mechanism 4108. Sensor feedback is used for the adaptive component of control. Sensors 4106 measure the mechanism output, which may be position, velocity, force, etc. The sensor measurement is provided to the adaptive controller 4102, which also receives input from the signal generator 4100. If the mechanism output is equal to the desired mechanism output, the there is no need to correct the lookup table 4110. However, if there is a discrepancy between the desired and measured mechanism output, then the adaptive controller can provide a correction to the lookup table to increase accuracy of the system.

One adaptive control method is simply to add a reference point in the lookup table corresponding to the desired output and measured output. In this fashion the adaptive controller can be used to create the lookup table, by having the signal generator 4100 specify a range of output commands. Interpolation can be used in the lookup table to extract values where data points have not been gathered. In this fashion, adaptive control can also be used to automatically calibrate a mechanism, and correct for variations in the manufacturing processes.

Various other types of adaptive controllers exist, and can be applied to the method shown in FIG. 41. For example, the magnitude of the discrepancy between the desired and measured mechanism output can be used to generate a correction that will reduce the error for the current desired output. Other types of adaptive controllers can incorporate mechanism dynamics in the lookup table correction.

Figure 42:
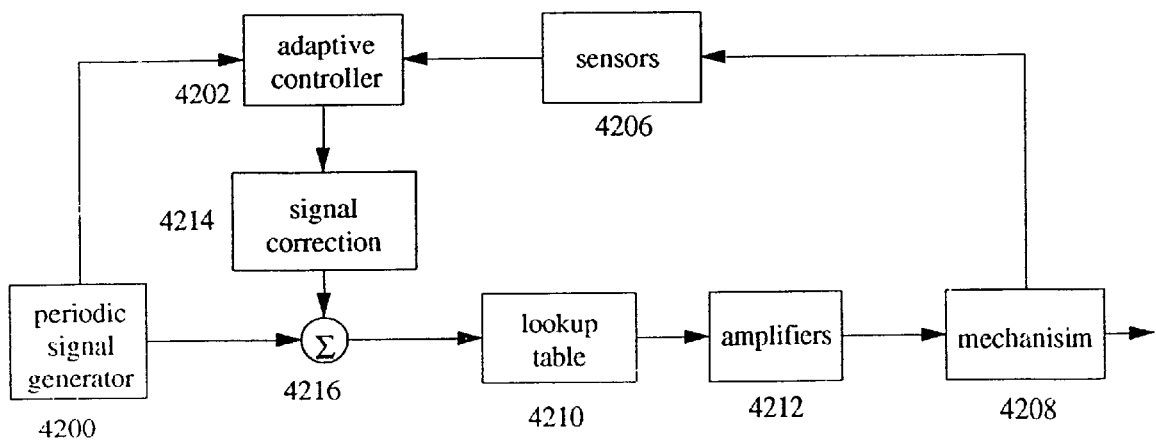
FIG. 42 is a schematic representation of another adaptive control method and apparatus of the invention that is suitable for producing high accuracy periodic output of a mechanism.

FIG. 42 shows another method and apparatus for adaptive control, that is suitable for generating high accuracy periodic output of a mechanism. Many devices have periodic motion such as machines on an assembly line, or motion of a cutting tool that moves back and forth. A periodic signal generator 4200 produces a repeating pattern. The open loop control is implemented in a similar fashion to the method in FIG. 41, using a lookup table 4210, amplifiers 4212, and a mechanism 4208. The adaptive controller 4202 receives measurement of the mechanism output from sensors 4206, and also receives the desired mechanism output from the signal generator 4200. The adaptive controller 4202 provides a signal correction 4214, which is summed with the desired mechanism output signal at the summer 4216.

Since the signals are repetitive, errors in the mechanism output that occur in one cycle will be repeated in the next if there is no correction. However, the adaptive controller can "anticipate: the upcoming error and compensate for them in advance. In this fashion, the error can be reduced in each cycle, until it is reduced to the level of random noise and variation in the system. This approach can automatically compensate for dynamics in the system, and disturbance forces that consistently occur in each cycle.

Controller Architecture Implementation: There are a variety of methods that can be used to implement the various components of control architecture described herein, including those shown in FIGS. 14, 15, 16, 20, 22, 23, 24, 41, and 42. These control components include controllers, signal generators, summers, and feedback loops. Each component can be implemented using a single controller or computer. Another approach is to implement a number of components on a single computer. Alternatively, a single component or function could be implemented on a number of computers using a distributed processes approach.

Use as a Sensor: The mechanisms described herein have been described as actuators that can move an object or apply force to an object. However, it is also possible to use mechanisms with opposing repulsive magnetic actuators, as sensors. If such a mechanism is instrumented with a position sensor, it is possible to use the mechanism as a force sensor. In a similar fashion if such a mechanism is instrumented with a force sensor, it is possible to use the mechanism as a position sensor. The set position and stiffness of these mechanisms can be controlled in an open loop fashion, and thus are known without the aid of a sensor. However, the actual position of the mechanism, also depends on the applied external force. The relationship between applied force and actual position can be specified by a lookup table, using actuator characteristics such as the curves shown in FIG. 7. Accordingly, if the actual position of a mechanism is known, then it is possible to calculate the force applied onto the mechanism. In a similar fashion, if the applied force is known, it is possible to calculate the actual position of the mechanism.

Lever Arm Can Increase Torque Output: An advantage of the invention is that is possible to increase the level of torque output of a mechanism, with only a marginal increase in expense. The following arrangements for increasing the torque output will decrease the range of motion of the mechanism. However, they are very useful for applications that require a limited range of motion. Such applications include haptic interface devices, precision mechanisms, and numerous other limited motion devices.

With a typical electric motor, the torque output can be increased by increasing the diameter of the motor. However, this would require substantial increase in material and component size, since all the components of the motor would have to be increased in size. While an electric motor has the advantage that it can rotate continuously, a disadvantage is that increasing the torque output can cause a significant cost increase.

In the embodiment shown in FIG. 5A, the torque output depends on the force applied by the repulsive actuators, 101' and 101", multiplied by the lever arm of the actuators. In FIG. 5A, the lever arm is equal to L/2 which is half the distance between the two pivots 119. Increasing the lever arm L, increases the torque applied to the connecting link 117 and thus the interface member 123. The lever arm can be increased by simply moving the repulsive actuators 101' and 101" farther apart, thereby increasing the value of L. Due to the modular construction of the mechanism 113, increasing the lever arm can be done at minimal expense, since only an increase in the length of the connecting link 117 is required. Increasing the lever arm will reduce the range of angular motion, α, that is achieved before reaching the limits of travel of the repulsive actuators. However, this tradeoff can be advantageous in applications where a small range of motion is required, at a higher torque level. Alternatively, the lever arm can be decreased, thereby reducing the torque output of the mechanism, but increasing the range of motion.

The lever arm can be increased to increase the torque output of a rotary mechanism, such as the one shown in FIG. 5A. However, in certain circumstance, a large force output may be desired, instead of a torque output. To achieve this, one can generate a force output from a rotary mechanism by using the interface member 123 to apply a force at a desired distance from the pivot 121, such as at the tip of the interface member 123.

Increasing the Range of Force and Stiffness: In addition to changing the moment arm, there is another inexpensive configuration variation, which can be used to increase the range of force (or torque) output of a mechanism with opposing repulsive magnetic forces. This method involves changing the rest gap size, $g_{rest}$, between the repulsive magnets that corresponds to the home position of the mechanism. For example, in the translational mechanism shown in FIG. 17A, decreasing the overall width, w, will compress both repulsive actuators and decrease the gap, $g_{rest}$, in both actuators (in the rotational mechanism shown in FIG. 5A reducing height h will do the same). The reduced rest gap, $g_{rest}$, will increase the repulsive force in both actuators simultaneously, yet not change the home position. As seen in FIG. 9, at a smaller gap, $g_{rest}$, the range of force from a single actuator increases, and thus the range of force output of the mechanism also increases.

In addition to changing the range of output force, changing rest gap, $g_{rest}$, also modifies the range of stiffness. The stiffness lookup table corresponds to FIG. 7, and reducing the rest gap brings the two curves $|\tau'(\alpha)|$ and $|\tau''(\alpha)|$ closer together. Thus changing grest modifies the shape of the $\tau_{act}(\alpha)$ curve, the range of achievable stiffness levels, and the default stiffness value, $K_0$. Moreover, a change in the shape of $\tau_{act}$, can be used to modify the amount of nonlinearity in the $\tau_{act}(\alpha)$ curve.

A tradeoff for decreasing $g_{rest}$ is that the range of motion of the mechanism is decreased, since the limit of motion in the repulsive actuators will be reached with a smaller gap motion. Accordingly, $g_{rest}$ can be increased or decreased to achieve the desired tradeoff between range of motion, and range of output torque and default stiffness levels.

Direct Drive: As indicated above, increasing the torque output of a motor can be expensive. Accordingly, traditional motors are often coupled to transmission systems, such as geared or cable transmissions, to increase the torque output of the system. However, transmission systems have disadvantages that include backlash and friction. Backlash can occur because of gaps between meshing gear teeth, slack in a cable system, or compliance in transmission components. These disadvantages, are especially detrimental to haptic interface devices and precision mechanisms.

An advantage of mechanism with opposing repulsive actuators is that direct drive between the actuator and the interface member can be achieved, and the disadvantages of a transmission can be avoided. As indicated in the previous section, large forces can be generated for a limited range of motion. Thus, there is no need for a transmission to increase the force level. Moreover, the opposing repulsive forces preload the mechanism, and thereby eliminate any backlash in the mechanism. In the mechanism shown in FIG. 5A, the repulsive forces from the actuators 101' and 101", eliminate any gaps in the joints 105, 119 and 12. Thus even the smallest motion within an actuator will generate a corresponding motion in the interface member 123. Moreover, since a transmission is not necessary, friction is reduced thereby further increasing the fidelity of the system. Thus subtle and accurate forces can be imparted to the user of haptic interface comprised of opposing repulsive magnetic actuators.

Advantages of Magnetic Nonlinearities: The magnitude of the magnetic forces change in a nonlinear fashion, as the gaps between the magnets vary, as seen by the curved shape of the repulsive force curve, R, in FIG. 6. These nonlinearities result in much higher forces near the limits of travel. As the gap in a repulsive actuator approaches zero, the magnetic force increases quickly. Thus, before the gap is actually closed, a high magnetic force is generated that opposes the closure of the gap. This nonlinear property is especially advantageous when constructing limited motion mechanisms, such as those shown in FIGS. 5A and 17A.

When a limited motion mechanism reaches its limits of travel it can hit a mechanical stop. The impact force with the mechanical stop can damage the actuators and mechanism. Moreover, if the mechanism is being used for a haptic interface, the abrupt contact with the mechanical stop disrupts the control of the interaction force by the actuators. Thus, it is often desirable that the maximum actuator force be sufficiently large, so that it can prevent an external force from moving the mechanism into the mechanical stops at the limit of travel. To achieve this objective, it is often necessary that the actuator force requirements near the limits of travel be higher than during the remaining range of motion.

The nonlinearity of the repulsive magnetic forces provide high forces near the limits of travel, and thereby achieve the objective of minimizing impact with the mechanical stops. By generating high forces precisely where they are needed the most, a smaller and lower cost repulsive actuator can be used.

Un-powered Operation and Efficiency: Energy conservation can be important in a mechanism to increase its efficiency and avoid overheating. An advantage of mechanisms with opposing repulsive magnetic forces is that certain motions can occur without the expenditure of power. An especially useful motion is the return to home position, as described in the following.

A repulsive actuator can contain two permanent magnets in a repulsive orientation, along with an electromagnet, such as the embodiment shown in FIG. 1A. Such actuators generate repulsive forces from the permanent magnets even when no current is applied to the electromagnet. When two such actuators are incorporated into an opposing configuration mechanism, such as the ones shown in FIG. 5A and FIG. 17A, then the permanent magnet forces create a stable set point even when no power is applied. The set point that occurs when no power is applied to the electromagnets in both actuators, is defined as the home position. Even without power, the mechanism returns to the home position whenever the external forces are removed from the mechanism.

The return to home position motion is especially useful for computer input devices, such as joysticks. Computer input devices are often configured such that in their home position, a neutral command is conveyed. These input devices are typically designed such that they return to their home position whenever the user release the interface member, such as when a joystick bounces back to the center position. Since neutral commands and release of the interface member occur frequently, a significant portion of the interface's motion is due to returning to the home position. Thus these mechanisms that have an un-powered return to home position and thereby provide an increase in efficiency and reduction of overheating.

An additional advantage of un-powered return to home motion is in the retail display of haptic interface devices. Typically no power is applied to devices on retail shelving, yet it is desirable that potential customers can feel some of the performance of the device. With the mechanism described above, even without power, the user feels the return to home motion, the smooth direct drive feel, and the nonlinear magnetic forces that minimize impacts at the limits of travel.

Figure 10A:
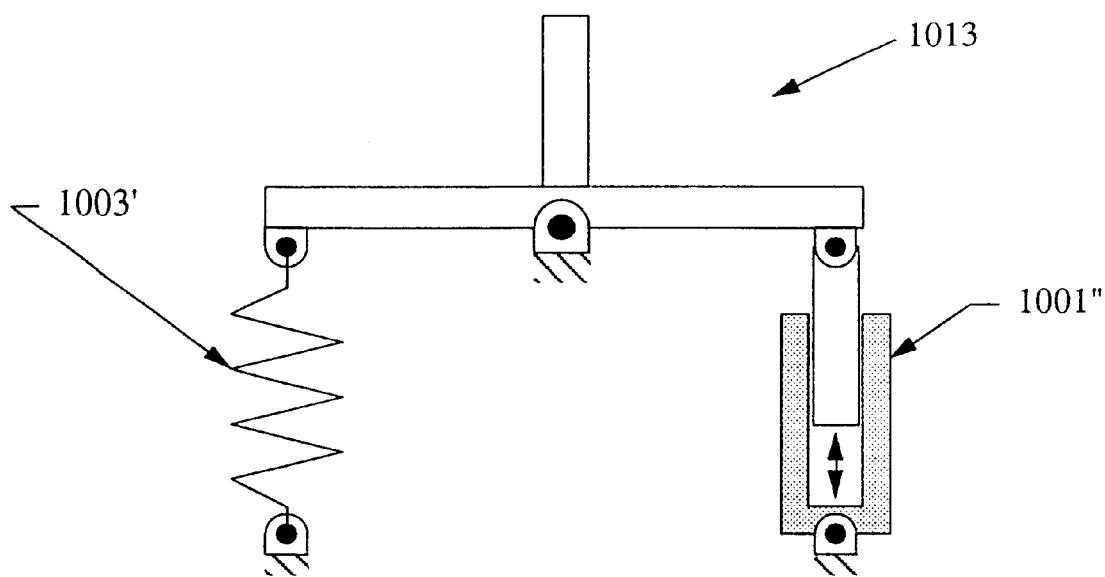
FIG. 10A is a schematic representation of a mechanism for actuating a single DOF, using a single repulsive actuator and a spring, rather than a second repulsive actuator.

Alternative Opposing Forces: In a mechanism with opposing repulsive magnetic forces, such as the ones shown in FIG. 5A and FIG. 17A, the opposing forces can be used to hold the mechanism in equilibrium. However, it is also possible to replace one of the repulsive actuators with an alternative method for generating an opposing force. FIG. 10A shows a mechanism 1013, which is similar to the mechanism 113 shown in FIG. 5A, where one of the actuators is replaced with a spring 1003'. The spring creates an opposing force to the repulsive actuator 1001". The spring may have a linear force vs. displacement relationship. However, nonlinear springs can be used that may approximate a magnetic force vs. displacement relation, or other nonlinear relationship. As shown in mechanism 1015 in FIG. 10B, weight 1005' in a gravitational field can also be used to generate a force opposing that of a repulsive actuator 1001".

Figure 10B:
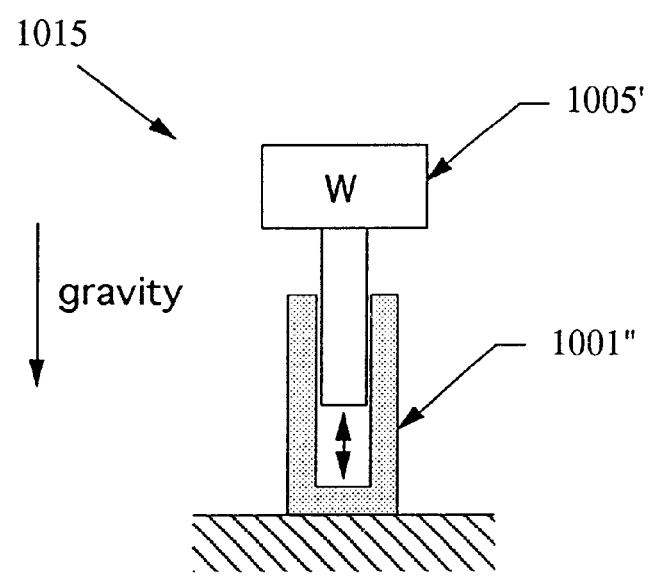
FIG. 10B is a schematic representation of a mechanism for actuating a single DOF, using a single repulsive actuator and a mass, rather than a second repulsive actuator.

The spring 1003' in FIG. 10A, and the weight 1005' in FIG. 10B are passive devices since it is not necessary to supply energy to generate the opposing forces. The advantage of using passive opposing forces is that it reduces the number of actuators in the mechanism, and thereby may reduce the cost, weight, and size of the device. However, to achieve the same range of motion and force of an actuator pair with a single actuator, it would be necessary to increase the size of the actuator.

With mechanisms 1013 and 1015 there is only a single actuator in which it is possible to electrically modulate the force. Nevertheless, it is still possible to control the position or stiffness of these mechanisms. For example an increase in repulsive force in the actuator 1001" will overcome the passive opposing force, and generate a new equilibrium position for the mechanism. In the absence of external forces, the mechanism will move until the actuator and passive forces are balanced again at the new equilibrium position. In the mechanism shown in FIG. 10A, as the actuator force is increased, the spring 1003' will be compressed and the force it applies will also increase. The new equilibrium position will occur when the opposing forces are balanced. In the mechanism shown in FIG. 10B, the gravitational force does not change with motion of the mechanism. However, since the actuator force decreases as the actuator extends, for each current level in the actuator there will be a corresponding position where the actuator force is equal to the opposing weight. Thus, by changing the electrical current to the actuator, it is possible to control the position of a mechanism that uses passive opposing forces.

It is also possible to control the stiffness of a mechanism with a passive opposing force (such as mechanism 1013 and 1015), since as the current to the repulsive actuator 1001" increases, the stiffness of the actuator also increases. However, modifying the actuator force will also move the equilibrium position. Thus it is not possible to independently control the stiffness and position of a mechanism with a single repulsive actuator and a passive opposing force.

Figure 10C:
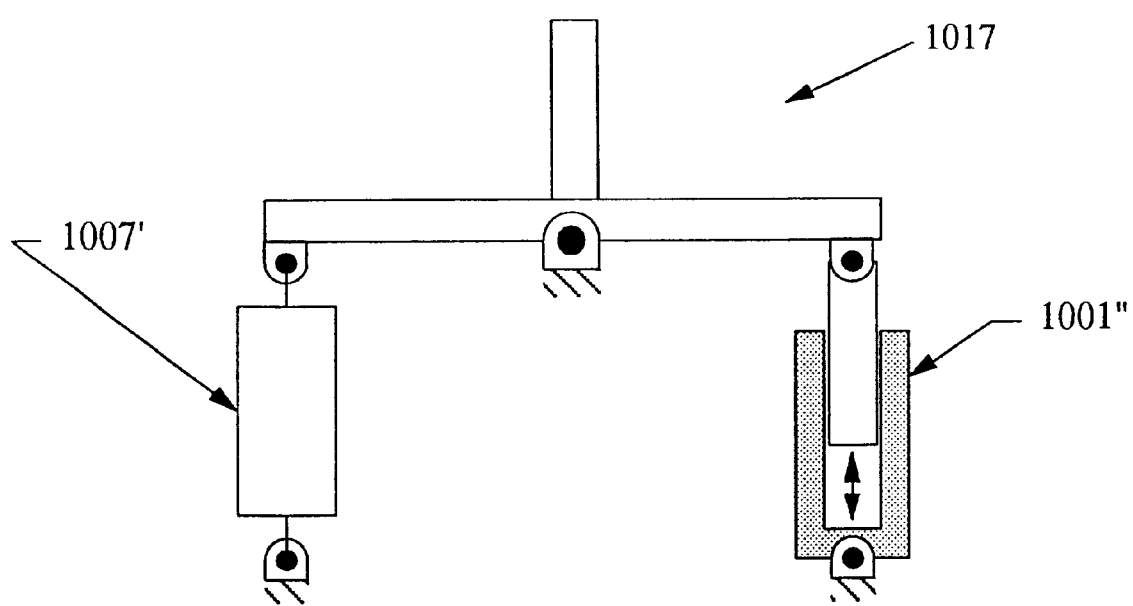
FIG. 10C is a schematic representation of a mechanism for actuating a single DOF, using a single repulsive actuator and a generic energy storage device, rather than a second repulsive actuator.

As shown in mechanism 1017 in FIG. 10C, instead of a passive opposing force, it also possible to replace one of the actuators in mechanism 113 in FIG. 5A with an active actuator 1007' that uses a method other than repulsive magnetic forces to generate the opposing force in the mechanism. For example, a traditional motor, pneumatic piston, or other type of actuator could be configured to generate forces that oppose actuator 1001". As long as the opposing force does not decrease as the gap in actuator 1001" extends, then passive stability can be maintained.

Sharing of Magnets between Repulsive Actuators: It is possible to integrate the construction of a number of repulsive magnetic actuators, and thereby reduce the number of components and cost of the mechanism. For example, two repulsive magnetic actuators configured in an opposing pair, can share some of their magnets. FIG. 25 shows a single degree of freedom linear mechanism, where the moving magnet is shared between two actuators. An interface member 623 is connected to a moving magnet 610. The motion of the mechanism is linear, and is designated by the variable x. The north and south poles of magnet 610 are on right and left sides as shown. On each side, a repulsive actuator is configured to repel the magnet 610. On the left side as shown is the actuator 601', where magnet 616' is fixed relative to reference frame 602 and its north pole repels the north pole of magnet 610. Magnet 614' is also fixed relative to ground and surrounds magnet 616'. The magnet 614' may be an electromagnet, and its field can be used to increase or decrease the repulsive force between magnets 616' and 610. On the right side is an actuator 601", where a magnet 616" is fixed relative to ground and its south pole is configured to repel the south pole of magnet 610. Magnet 614" is also fixed relative to ground and surrounds magnet 616". The magnet 614' may be an electromagnet, and its field can be used to increase or decrease the repulsive force between magnets 616" and 610. Thus, the magnet 610 is held between opposing repulsive magnetic forces. Since the magnet 610 is shared between the two actuators, the mechanism has only five magnets, compared to the six magnets in the mechanism shown in FIG. 17A (assuming the nominal three magnets per actuator configuration discussed above).

In order to modulate the repulsive forces on the interface member 623, at least one of the magnets shown in FIG. 25 must be an electromagnet. A number of options are possible. The stationary magnets 614' and 614" could be specified as electromagnets, while the moving magnet 610, and the stationary magnets 616' and 616" could be permanent magnets. In this configuration, the currents in the electromagnets 614' and 614" could be used to either increase or decrease the repulsive force in each actuator, and thereby control the position and stiffness of the interface member 623. Even without current to the electromagnets, the repulsive forces would exist between the stationary magnet 616' and the moving magnet 610, and between the stationary magnet 616" and the moving magnet 610. A modification to this configuration would be to remove the stationary magnets 616' and 616", and to generate opposing repulsive forces through current in the electromagnets 614' and 614".

An alternative configuration would be to specify that the only electromagnet in FIG. 25 is the moving magnet 610. Here an increase in current to the moving electromagnet 610, would increase the magnetic repulsive forces simultaneously with both actuators 601' and 601", and thereby increase the stiffness of the interface member 623. However, due to symmetry the set position would not change.

Sharing of Magnets for a Rotary Mechanism: In a rotary mechanism it is also possible to share magnets between actuators. FIG. 26 shows a single degree of freedom rotary mechanism. The interface member 723 is connected to a curved magnet 710, which is coupled to a connecting member 732. These components, 723, 710 and 732, rotate about a pivot 721, which is fixed relative to a reference frame (mechanical ground) 702. Another curved magnet 730 is fixed relative to the reference frame through a support 734, and its poles are oriented such that they repel the poles of the first curved magnet 710. Thus, as the first curved magnet 710 rotates counterclockwise, the gap g' closes between the north poles of the two curved magnets 710 and 730, increasing the repulsive magnetic force that pushes magnet 710 back in the clockwise direction. In a similar fashion a rotation of magnet 710 in the clockwise direction closes the gap g" between the south poles of magnets 710 and 730, and generates an increase in the repulsive force that pushes magnet 710 back in the counterclockwise direction.

An electromagnet 714' surrounds the gap g', and can increase or decrease the repulsive forces in the gap, depending on the direction of the current in the electromagnet. In a similar fashion, the electromagnet 714" can increase or decrease the repulsive force in gap g". Thus, by controlling the currents in the electromagnet it is possible to control the stiffness and set position of the interface member 723, using control methods such as shown in FIG. 14, FIG. 15, and FIG. 16.

The embodiment shown in FIG. 26 shares both the moving magnet 710 and the stationary magnet 730, between both sides of the mechanism. Accordingly, the mechanism in FIG. 26 uses only four magnets, while the rotational mechanism that uses modular actuators shown in FIG. 5A uses six magnets (assuming the nominal three magnet per actuator configuration discussed above). If the stationary magnet 730 is removed, the mechanism could still be controlled, but would always require current in the electromagnets 714' and 714".

Curving the stationary magnet 730 brings the opposing magnetic poles onto either side of the mechanism, and thereby uses both poles of the magnet to create a repulsive force. It is also possible to use such a curved magnet in a linear mechanism by curving the magnet around to reach both ends of the opposing actuators. In this fashion, the magnets 616' and 616" in FIG. 25, could be integrated into a single curved magnet.

Figure 49:
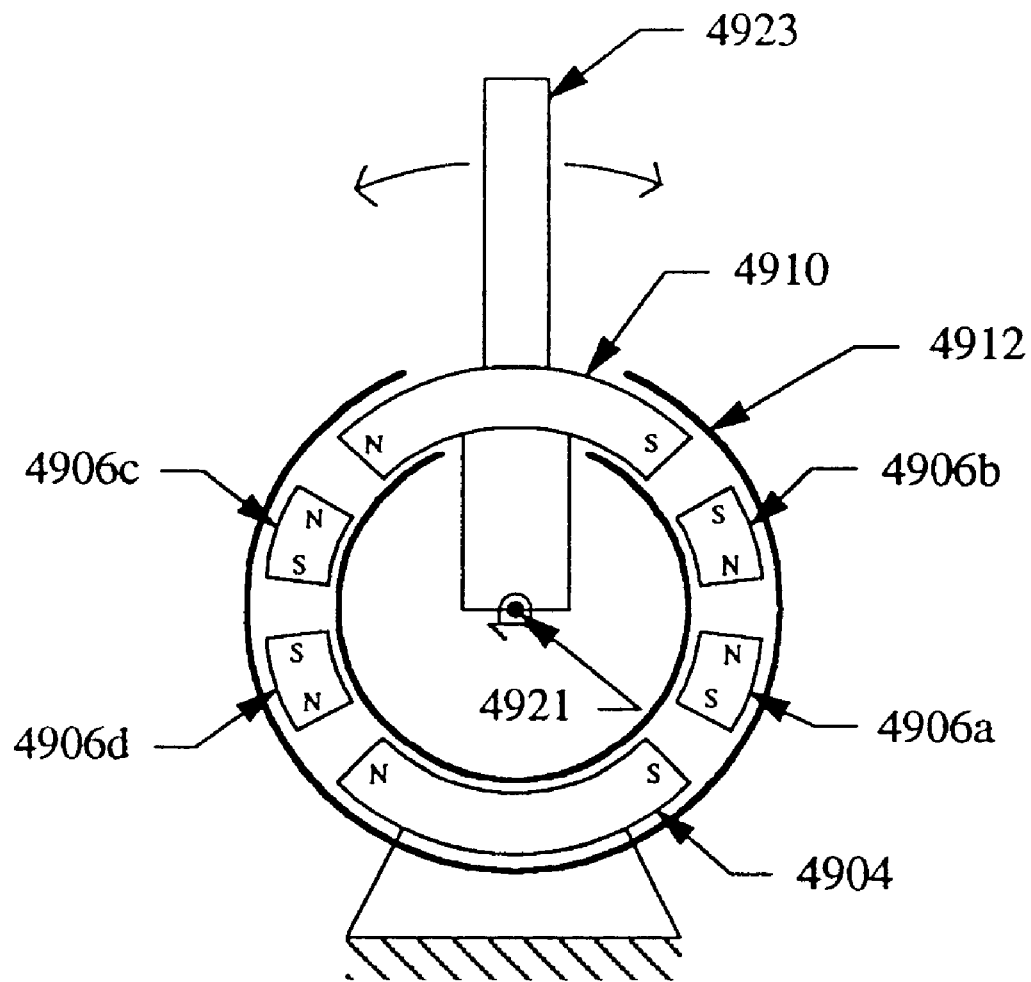
FIG. 49 shows schematically an embodiment of the invention that incorporates shared magnets and multiple gaps in a one DOF rotary mechanism.

Another embodiment is shown in FIG. 49 that incorpartes shared magnets and mulitple gaps in a one DOF rotary mechanism. The interface member 4923 is constrained to rotate about the travel guide pivot 4921. The interface member is attached to the curved magnet 4910. Another magnet 4904 is held stationary relative to a reference frame. Movable magnets 4906a, 4906b, 4906c, 4906d are constrained to move within the travel guide 4912. The magnets are configured such that each magnet repels the magnets adjacent to it. Thus as the interface member is moved, gaps between the moving magnets changes and restroing repulsive forces are applied to the interface member.

Ferromagnetic Fluid In Actuator: One modification to actuators described in the previous sections is to incorporate ferromagnetic fluid into the mechanism to increase the magnetic forces. Ferromagnetic fluid can be magnetized like other ferromagnetic materials, yet has fluid properties. One such configuration is shown in a front view in FIG. 45B, and in a cross section at lines A—A of FIG. 45B, in FIG. 45A. This mechanism has similarities with the mechanism shown in FIG. 25. However, here the moving magnet 4510 has a tubular shape, where ferromagnetic fluid 4525 can flow through the center of the tube. The moving magnet 4510 is repelled by the stationary magnets 4514' and 4516' on the left, and the stationary magnets 4514" 4516" on the right. The surrounding electromagnets 4514' and 4514" can modulate the repulsive forces applied onto the moving magnet. The magnitude of magnetic force decreases as the gap between the magnets increases. The ferromagnetic fluid effectively reduces the gap between the magnets and thus increases the magnitude of the magnetic forces applied ont the interface member. Ferromagnetic fluid becomes magnetized when in proximity to a magnetic field, and thus extends the effective length of both the stationary and moving magnets. As the moving magnet 4510 slides from side to side, the ferromagnetic fluid flows back and forth through the hole in the moving magnet. The ferromagnetic fluid is constrained within a travel guide 4521, which guides the moving magnet. The interface member 4523 is attached to the moving magnet though a seal 4504. An alternative to using a seal, is to magnetically couple the interface member to the moving magnet. This would eliminate the need for a seal around the interface member. In this configuration the interface member would be made of magnetic or ferromagnetic material, and would be a separate part surrounding the travel guide adjacent to the moving magnet. As the moving magnet slides, the interface member also moves.

Tangential and Direct Gap Closure: In the repulsive actuator shown in FIG. 1, the gap between the moving magnet 10 and the stationary magnet 16 closes directly, and eventually the gap is reduced and the motion stops. Direct gap closure refers to those actuator configurations where the motion of the moving magnet is in a direction that is substantially collinear with a line between the repelling poles of the moving and stationary magnets. With direct gap closure, the range of motion will always be limited by the stationary magnet, yet the magnitude of the repulsive forces near the limits of motion can be high since the repelling poles are directly facing each other.

Another type of repulsive magnetic actuator, can use tangential gap closure. Examples of such actuators are shown in FIG. 27A and FIG. 27B. FIG. 27A shows a single DOF rotational mechanism. The moving magnet 740 is held by a link 732 and is constrained to rotate about a pivot 721, which is fixed to the ground 702. The output member 723 is attached to the moving magnet 740. The moving magnet shares its poles with both sides of the mechanism, to create opposing repulsive forces. On the left, the North pole of the magnet 740 is repelled by the North pole of a stationary magnet 742'. As the magnet 740 rotates to the left, the repulsive force begins to increase between the magnets 740 and 742', yet the gap distance will never drop to zero. Eventually, the interface member 723 or some other mechanical obstruction, will limit the range of motion. In a similar fashion the South pole of a stationary magnet 742" repels the South pole of the magnet 740.

The mechanism in FIG. 27B is similar to the one in FIG. 27A, yet here the magnets are magnetized in a radial fashion. The moving magnet 746 has its North pole on its outside radius, and is repelled by the North poles of both stationary magnets 748' and 748" which have their North poles on their internal radius.

Tangential gap closure actuators can also be applied to linear actuators and multi-gap actuators. An advantage of tangential gap closing actuators, is the commercial availability of magnets suited for these configurations.

Figure 11:
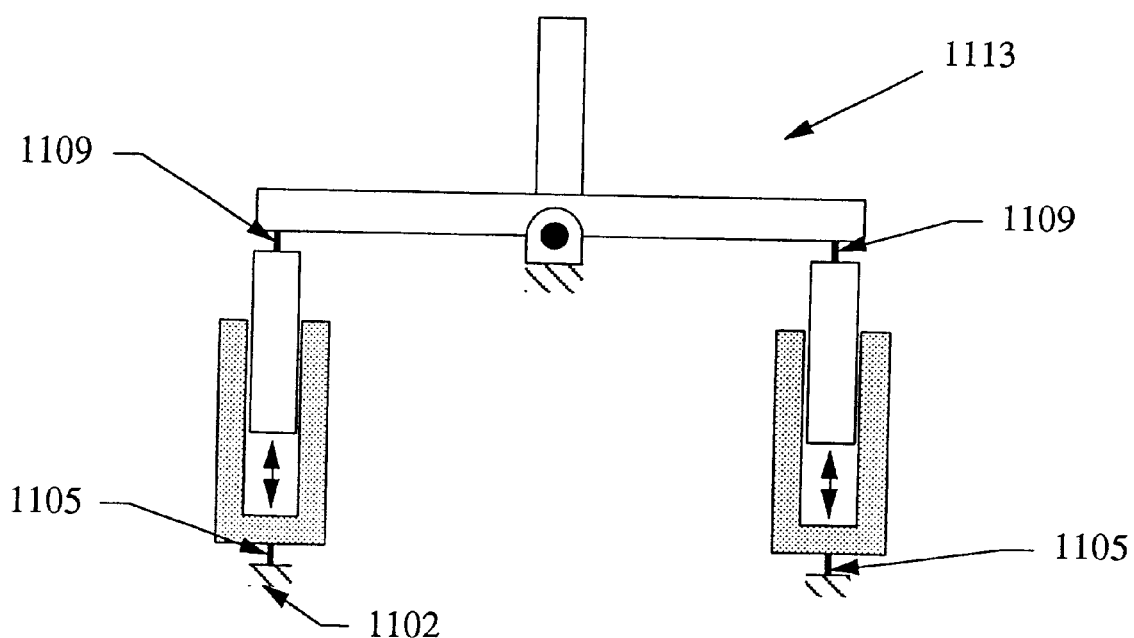
FIG. 11 is a schematic representation of a pair of repulsive actuators arranged to actuate a single DOF, similar to that shown in FIG. 5A, but with flexures joining each repulsive actuator to the link between the two, and between each repulsive actuator and the ground reference.

Joint Configurations: Various mechanisms can be used to connect the stationary magnets to the reference frame and the moving magnets to a moving link. As shown in the mechanism 113 in FIG. 5A, both connections are through rotary hinges 105 and 119, with an axle. In a similar embodiment, shown in FIG. 11, the stationary magnets are connected to the reference frame 1102 with flexure joints 1105, and the moving magnets are connected to the moving link with flexure joints 1109.

Figure 12A:
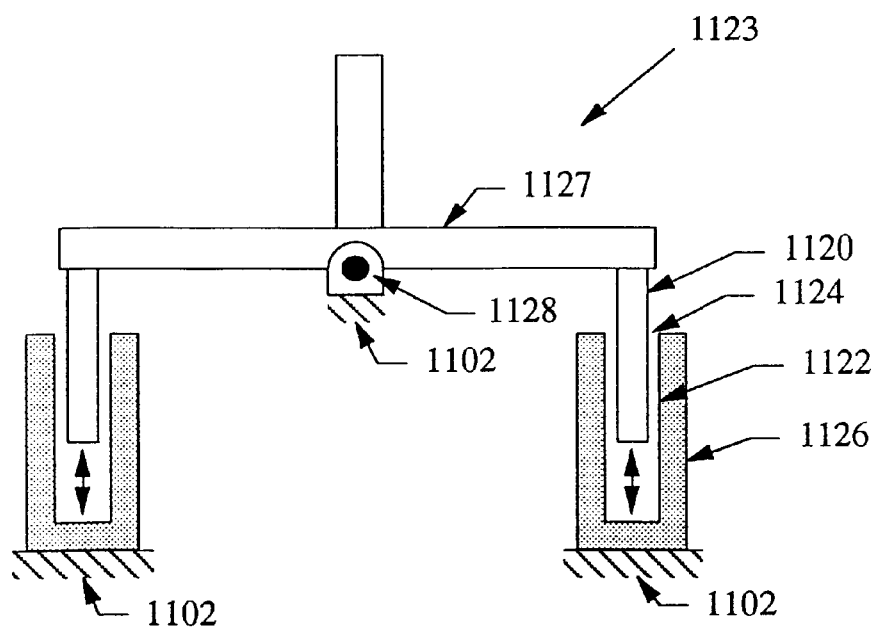
FIGS. 12A and 12B are schematic representations of a pair of repulsive actuators arranged to actuate a single DOF, similar to that shown in FIG. 5A, but with rigid connections or a bearing joining each repulsive actuator to the link between the two, and between each repulsive actuator and the ground reference, and with a gap in each repulsive actuator to allow for small rotations of the moving magnets around the fixed pivot point.

Another embodiment is the mechanism 1123 shown in FIG. 12A, and is similar to the mechanism 113 shown in FIG. 5A. Both of the connections in the mechanism 1123 are rigid connections that allow substantially no relative rotation. The stationary component of the actuator 1126 is fixed to the reference frame 1102, and the moving magnet 1120 is fixed to the link 1127. However, there is a space 1124 between the moving magnet 1120 and the travel guide 1122, which accommodates the slight rotation of the moving magnet 1120 around the axis of the hinge 1128.

Figure 12B:
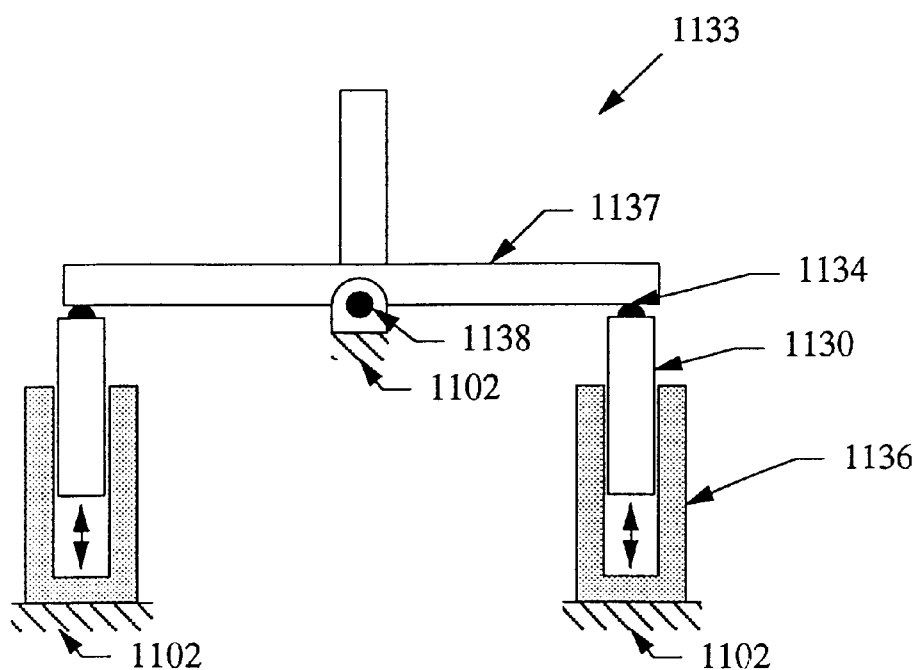

Another embodiment is mechanism 1133 shown in FIG. 12B, and is similar to the mechanism 113 shown in FIG. 5A. However in the mechanism 1133, the stationary component of actuator 1136 is fixed to the reference frame 1102. Here the moving magnet 1130 of the actuator 1136 is configured with a curved bearing surface 1134, and can slide relative to the link 1137. Thus, as the moving magnet 1130 moves vertically, the link 1137 rotates about the joint 1138, and sliding motion occurs between the link 1137 and the bearing surface 1134. The bearing surface 1134 may be part of the magnet 1130, or may be made of a separate element. The material of the link 1137 and bearing surface 1134 can be selected to reduce friction. The repulsive force applied onto the moving magnet 1130 from actuator 1136, generates a preload force on the bearing surface 1134 which tends to keep the moving magnet in contact with link 1137. To prevent loss of contact during high speed motion between link 1137 and the moving magnet 1130, the preload force can be increased by incorporating ferromagnetic material into the link 1137. Thus the moving magnet 1130 will be magnetically attracted to the link 1137, yet sliding motion could still occur at the surface 1134. In a similar fashion, the link 1137 could incorporate magnetic material oriented to attract the moving magnet 1130, and thus further increase the attraction force between them.

Any combination of the foregoing can be used, or any other connection scheme that allows for the relative motions that arise.

Figure 13:
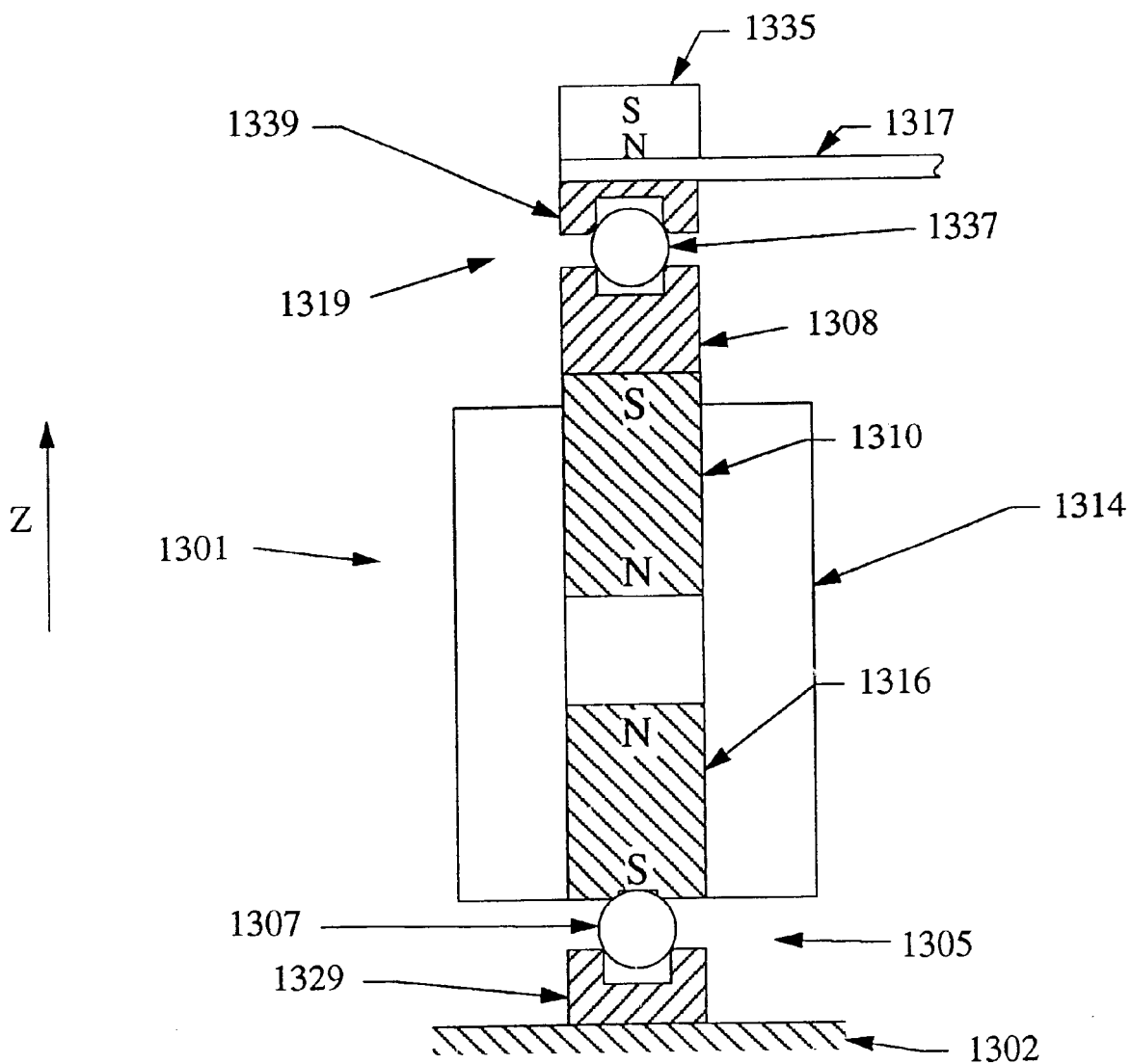
FIG. 13 is a schematic representation of a repulsive actuator coupled to a link and to ground reference, through a magnetically enhanced ball-joint.

FIG. 13 shows schematically another method of coupling a repulsive magnetic actuator to both the ground reference 1302 and the link 1317. Here a ball joint is used which allows rotation at the joint about three axes. Such a joint is useful in multi-degree of freedom mechanisms described in following sections. An actuator 1301 is configured as described above, with a stationary magnet 1316, a moving magnet 1310, and a stationary electromagnet 1314. The stationary permanent magnet 1316 is coupled to the ground reference 1302, either through a fixed connection as shown in any of the foregoing figures, or a ball joint connection 1305, comprised of a ball 1307 seated in a ball socket 1329.

Similarly, the moving magnet 1310 is coupled to the link 1317, optionally through a piece 1308 of ferromagnetic material, through another ball joint 1319. The upper ball joint also includes a ball 1337 and a ball socket 1339. On the upper face of the link 1317 is a holding magnet 1335, configured to attract the ball 1337. The holding magnet 1335 is magnetized to have the same polarity as the moving magnet, with a S pole facing upwards as shown in FIG. 13.

With the configuration shown in FIG. 13, both balls 1307 and 1337 are ferromagnetic, and thus are attracted to their respective adjacent magnet, stationary magnet 1316 and moving magnet 1310, respectively. The repulsion forces from the actuator presses the ball 1337 into the ball socket 1339. However if the link 1317 moves quickly away from the actuator and the repulsive forces are low, contact between the ball and socket may be lost due to the limited acceleration of the moving magnet. The holding magnet 1335 can prevent such loss of contact, through attractive magnetic forces that pulls the ball towards the socket.

Furthermore, when the actuator is held vertically in a gravitational field, the weight of the actuator presses the stationary ball 1307 into the ball socket 1329. The ball can additionally be attracted towards the socket if the socket contains ferromagnetic material, or a magnet oriented to attract the ball 1307.

The ball joint 1319 in FIG. 13 can be modified to also allow sliding relative to link 1317. This modification provides a three dimensional equivalent to the joint shown in FIG. 12B. If the stationary magnets 1314 and 1316 are fixed to the ground reference 1302, the upper ball socket 1339 can be eliminated. The ball 1337 will slide against the surface of the link 1317, which can be coated with a low friction material. The holding magnet 1335 will still hold the ball 1337 to the link with magnetic attraction.

The use of magnetic forces in creating a joint as shown in FIG. 12B and FIG. 13 eliminates the need for another type of fastening method, can reduce the size of the joint, and also facilitates disassembly if desired. Such magnetic joints can also be useful in nano-technology applications where it can be difficult to construct traditional joints.

Actuating More than One DOF

The foregoing discussion has focused on actuating a single degree of freedom (DOF), such as the rotation α about the hinge 121 shown in FIG. 5A, or motion in the x direction of the linear mechanism shown in FIG. 17A. However, as with most actuators, it is possible to combine repulsive magnetic actuators to create multi-DOF mechanisms. There are numerous ways to configure multi-DOF mechanisms. Indeed any actuator (known or yet to be developed) with a limited range of motion in a multi-DOF mechanism can be replaced with one of the single DOF mechanisms described previously. However, there are some multi-DOF configurations that take advantage of the unique characteristics of repulsive magnetic actuators. The following will present a number of the multi-DOF configurations possible. Some of these configurations provide methods to reduce the number of required actuators. Reducing the number of actuators can decrease cost and size of a mechanism. However, as will be shown, reducing the number of actuators also limits the control options, especially with open loop control.

Figure 43:
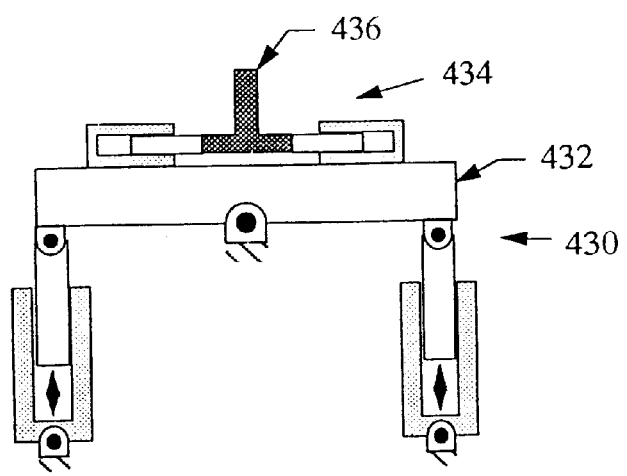
FIG. 43 is a schematic representation of a 2 DOF serial embodiment of the invention.

Serial Mechanisms: One type of multi-DOF mechanism is a serial mechanism. Here the output from one DOF is used to move the actuators that generate the following DOF. An example of a serial mechanism is shown in FIG. 43. A linear mechanism 434, which is similar to the mechanism shown in FIG. 17A, is mounted onto the output member 432 of a rotary mechanism 430, which is similar to the mechanism shown in FIG. 5A. The output member of the serial mechanism 436 has both a translational and rotational DOF.

Using the series approach, it is possible to construct a mechanism with as many DOFs as desired, by simply adding additional single DOF mechanisms to the series. However, a disadvantage of series configurations is that the actuator that is mounted to the ground, must move the mass of the second stage actuators, and any other actuators farther in the series. Thus a significant portion of the actuator force is applied towards moving the mass of the actuators, which decreases the bandwidth of the system.

Parallel Mechanisms: Another type of multi-DOF mechanism is a parallel mechanism. An advantage of a parallel configuration is that the bases of all the actuators are stationary, and only a relatively small mass moves. Accordingly, in a parallel mechanism the dynamic load due to the internal mass of the mechanism is relatively low, which increases the dynamic performance and bandwidth of the mechanism. The use of parallel mechanisms range from microscopic manipulation to the control of full scale flight simulators. Since many parallel mechanisms have a limited range of motion, they are well suited to the repulsive actuators described previously that also have a limited range of motion. The following sections describe parallel mechanism, and the number of repulsive magnetic actuators required per mechanism.

N DOF With 2N Actuators: The single DOF mechanism shown in FIG. 17A uses two actuators to actuate a single DOF. Thus, by simply combining actuator pairs, it is possible to actuate N DOF with 2N actuators. For example, a two translational DOF parallel mechanism 834 is shown in FIG. 28A. Four repulsive magnetic actuators 801 are fixed at one end to a reference frame 802. The other end of each actuator is connected to a pushing member 804. The repulsive force from the actuators press the pushing members 804 up against a circular cross-section interface member 823. In this two DOF embodiment, the interface member is constrained to move on the xy plane. Sliding motion is permitted between the pushers 804 and the interface member 823. One actuator pair is aligned with the x axis, while the other is aligned with the y axis. Each actuator pair can be controlled independently in open loop control, in either position control as shown in FIG. 14, stiffness control as shown in FIG. 15, or position and stiffness control as shown in FIG. 16. Force control using position feedback, as shown in FIG. 24, can also be implemented in each actuator pair. Accordingly, it is possible to independently control the set position and stiffness of the interface member in both the x and y directions, using only open loop control. Of course, closed loop control, such as shown in FIG. 22, can also be implemented.

The actuator configuration of the mechanism 834 is parallel, since the bases of all of the actuators are stationary relative to the reference frame. The bases of the actuators are typically heavier than the moving magnet component, thus only a relatively small mass of the total mechanism moves which improves the dynamic performance of the device. In addition, the repulsive forces continually apply a preload force to the interface member 823, and thereby prevent any backlash in the system.

A parallel three DOF translational mechanism could be created by adding to the two DOF mechanism in FIG. 28A, a third repulsive pair aligned with the z axis (into the plane of the page). To continue use of the pushing members that slide relative to the interface member, the interface member could be spherical shaped. The pusher 804z of an actuator that activates the z axis is shown in phantom (to simplify the drawing). Alternative methods of coupling the actuators to the interface member, such as a pin and slot, can also be implemented. If it is desired that the interface member translate without any rotation, a linear guide may be provided for the interface member.

Figure 18:
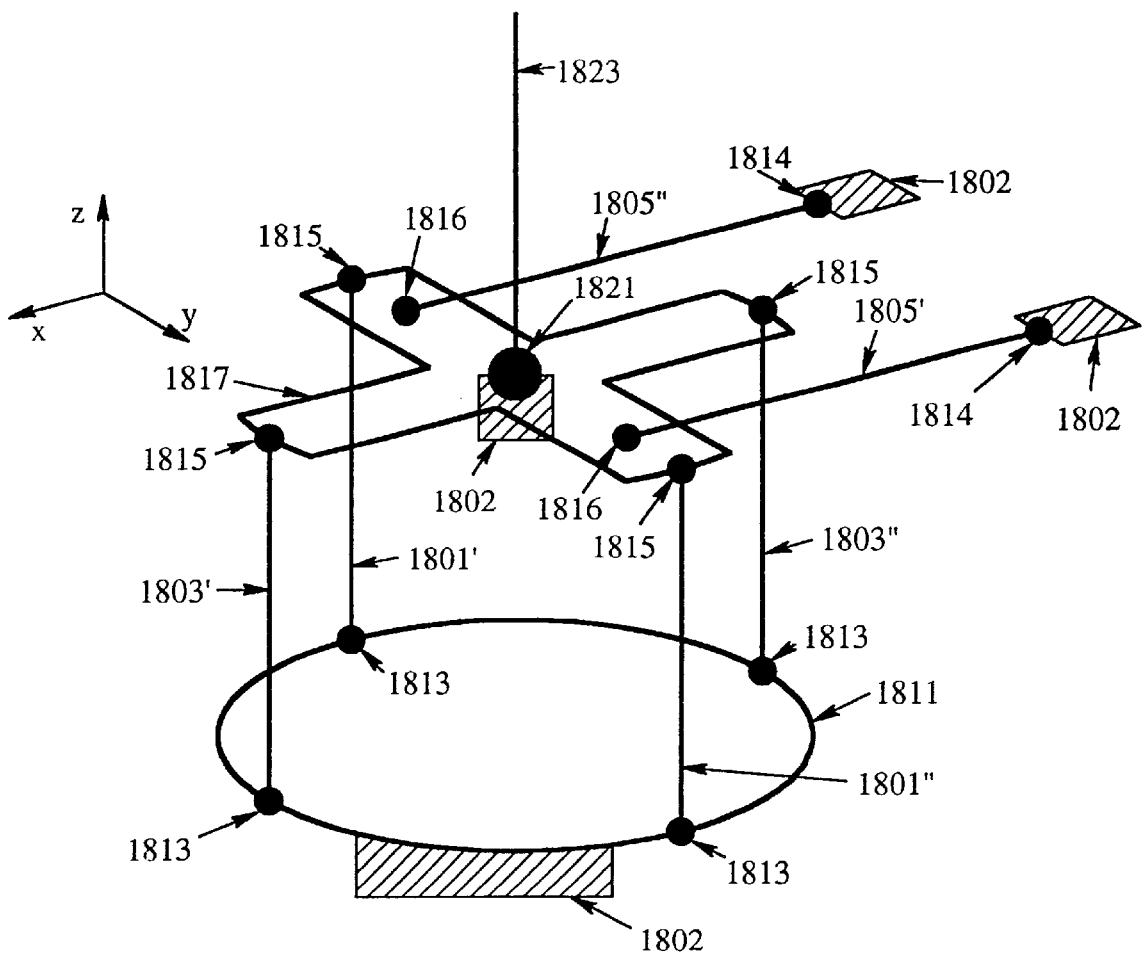
FIG. 18 is a schematic representation in perspective view of a machine output/input device of the invention that can display a position with three DOF, and can exert a force that is defined with three DOF, using pairs of repulsive actuators.

A parallel configuration that uses three actuator pairs to generate a three DOF rotary mechanism is shown in FIG. 18. Each actuator pair is similar to the. embodiment shown in FIG. 5A. The output member 1823 can be in the form of a hand-grip, and is coupled to a link plate 1817, and both are attached to a central ball joint 1821, which is fixed relative to a reference frame 1802. Thus, the output member 1823 can rotate about the x, y, and z axes as shown, and the center of rotation is the ball joint 1821. A first pair of actuators 1801' and 1801" are configured as an opposing pair, generally as described above in connection with FIG. 5A, and generate a rotation of the output member about the x axis. The first actuator pair, 1801' and 1801", are attached via ball joints 1813 to a base plate 1811 which is fixed to the reference frame 1802. The top of the actuators 1801' and 1801" are attached via ball joints 1815 to the link plate 1817.

Rotation about the y axis is actuated by the pair of actuators 1803' and 1803", which are configured in a similar fashion as the first actuator pair with ball joints 1813 to the base plate 1811, and with ball joints 1815 to the link plate 1817. An additional pair of opposed actuators 1805' and 1805" actuate rotation around the z axis. These actuators are attached with ball joints 1814 to the reference frame 1802, and to the link plate 1817 with ball joints 1816. This pair is mounted in a horizontal plane at the height of the ball joint 1821 connecting link plate 1817 to the reference frame. Each pair of actuators is aligned in the home position such that, the plane defined by the force vectors from both actuators passes through the central ball joint 1821. Thus, in the home position the force vectors from one pair do not apply a torque or force onto another pair.

Thus, through the combination of the three pairs of actuators, the orientation of the linking plate 1817 can be controlled, in any of the ways described above: position (orientation) control; stiffness control; force control, or a combination of the three. Either open loop or closed loop control can be used. If closed loop embodiments are used, a position or orientation sensor would be provided, most likely under the link plate 1817.

Activating N DOF with N+1 Actuators

In the embodiments discussed in the previous section, a pair of actuators is used to actuate each DOF. Thus, 2N actuators actuate N DOFs. This has some advantages, such as simplicity in control, symmetry, etc. However, in some circumstances, it may be desirable to reduce the number of actuators, and thereby reduce the weight, size and perhaps the cost of a mechanism. It is possible to actuate a mechanism with N DOFs, with only N+1 repulsive magnetic actuators. This is illustrated for two DOFs in FIG. 28B.

Figure 28B:
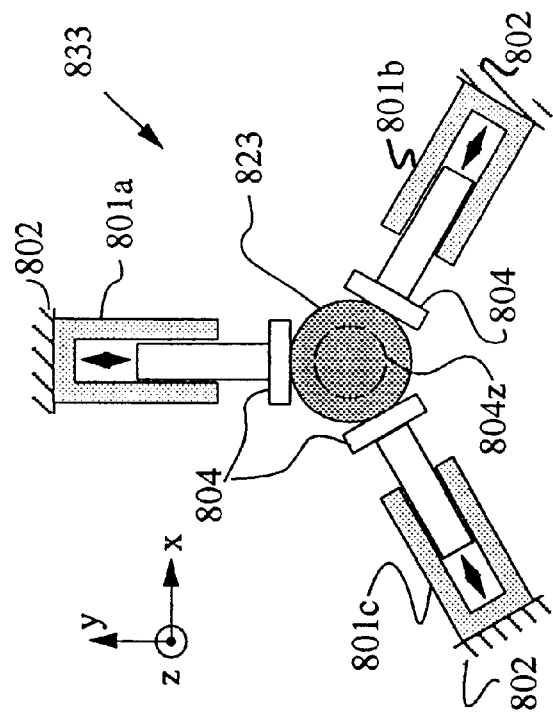
FIG. 28B is a schematic representation of an embodiment of the invention having three repulsive actuators, arranged in a triplet, to actuate two degrees of freedom.
Figure 28A:
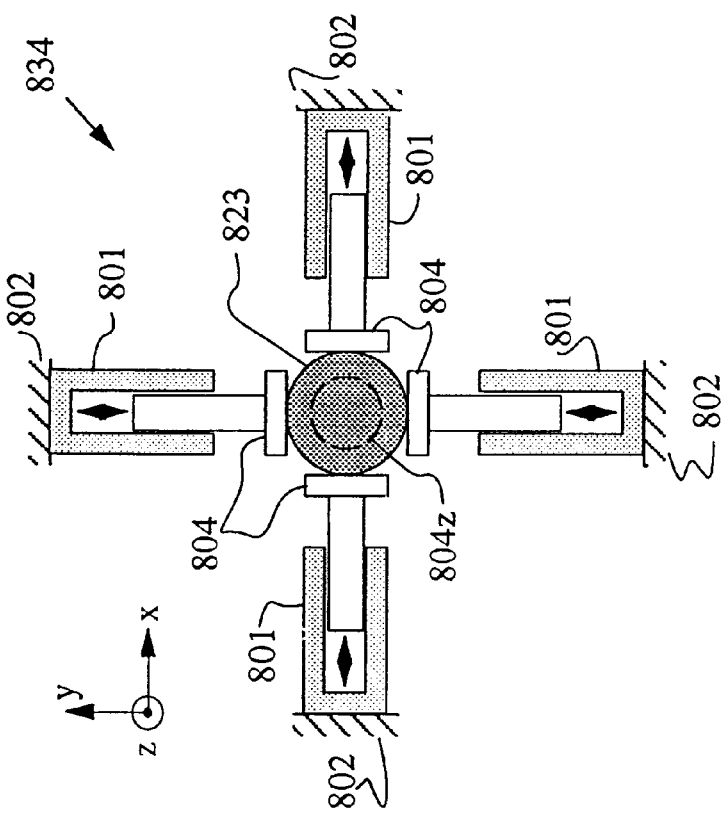
FIG. 28A is a schematic representation of an embodiment of the invention having four repulsive actuators, arranged in two pairs, to actuate two degrees of freedom.

With mechanism 833, shown in FIG. 28B, three individual actuators 801, 801b and 801c, are fixed to ground 802. Each actuator is connected to a pushing member 804. The repulsive force from the actuators press the pushing members 804 up against the circular shaped interface member 823. Sliding motion is allowed between the pushers 804 and the interface member 823. One actuator 801a is aligned with the y axis, while the motion of the other two actuators 801b and 801c generate motion along both the x and y axes. This embodiment is an N+1 configuration, since the mechanism has N=2 degrees of freedom and N+1=3 actuators. In such a configuration, it is necessary that for each actuator there be an opposing force generated by another actuator or combination of actuators. In addition, it is necessary that each DOF of the mechanism can be actuated by one or more of the actuators.

For the mechanism 833 in FIG. 28B, motion and force can be generated along both the x and y axes. Motion along the y axis can be generated by extending or retracting the actuator 801a, while allowing the two other actuators 801b and 801c to extend or retract together to maintain contact with the interface member 823. Motion along the x axis could be achieved by keeping the actuator 801a in a fixed position, while extending the actuator 801b and allowing the actuator 801c to retract. As with other actuated systems it is possible to implement closed loop control of the mechanism by incorporating sensors and controllers into the system. To coordinate the control of the individual actuators, the triangular geometric relationship among the actuators can be used to specify the desired motion or force of the individual actuators. Closed loop control can implemented for individual actuators as shown in FIG. 22. Thus, multi-DOF closed loop control of the interface member 823 can be implemented, including control of position, velocity, force, and stiffness.

The z axis can be actuated independently, with a pair of actuators aligned along the z axis, as discussed above in connection with the embodiment shown in FIG. 28A. The pusher 804z of one of the z axis actuators is shown in phantom, engaging the interface member 823. (This embodiment would not be purely N+1, having five actuators for three DOFs.)

Some, but not all, of the advantages of open loop position and stiffness control can also be applied to mechanisms with an N+1 actuators/DOF configuration. For example, by increasing the current to all three actuators in the mechanism 833 in FIG. 28B, the open loop stiffness in both the x and y directions will be increased without changing the set position. Open loop position control is also possible in both the x and y directions. To move the interface member in the y direction, the current to the actuator 801a can be increased or decreased. To move the interface member along the x axes, the current to one of the other actuators 801b or 801c can be increased, while it is decreased to the other lower actuator. Thus, it is possible to independently control the open loop position in the both the x and y directions simultaneously. However, while the open loop position control is implemented, the stiffness of the mechanism is being changed in a dependent way.

Therefore, a limitation of open loop control in an N-DOF mechanism with N+1 actuators, is that it is not possible to independently control the position along N dimensions, while also independently controlling the stiffness along N dimensions. For example, with the mechanism 833 in FIG. 28B it would not be possible with open loop control to increase the stiffness in the y direction, decrease the stiffness in the x direction, and maintain the same set position.

Figure 19A:
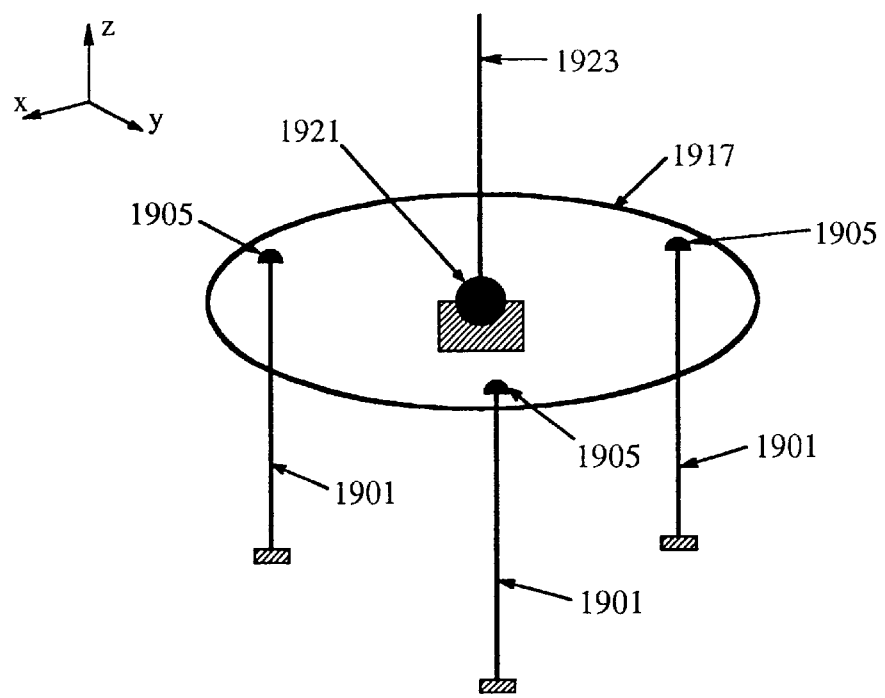
FIG. 19A is a schematic perspective view representation of three repulsive actuators that are linked together in a configuration that provides position output through two DOF.

Numerous N+1 DOF actuator configurations are possible. For example, FIG. 19A shows a mechanism with two actuated rotational DOFs, activated by three actuators. The three repulsive actuators 1901 are fixed on one end to ground, and connected at their other end to pushers 1905. These pushers can slide on the plate 1917, and apply the actuator force onto the plate. The plate 1917 is rigidly connected to an interface member 1923, and both are held relative to ground by a ball joint 1921, which allows for rotation of the interface member about the x, y, and z axes. The three actuators can control motion and force about the x and y axes; the interface member can freely rotate about the z axis.

Figure 19B:
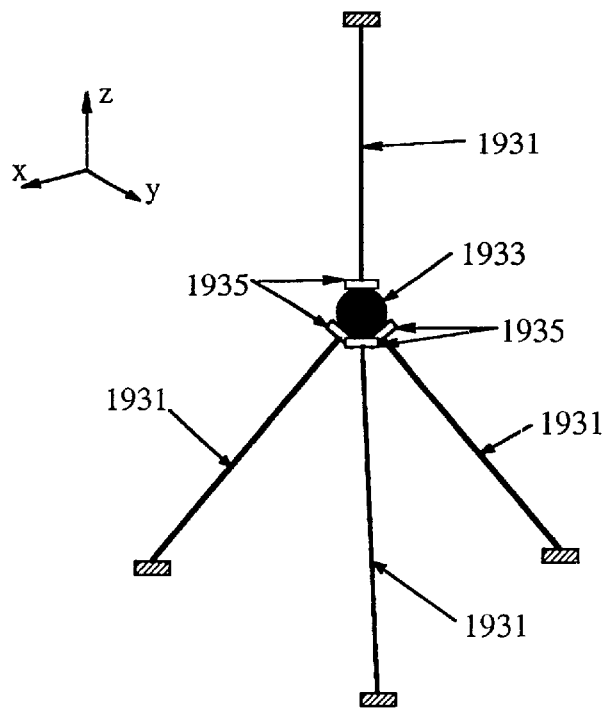
FIG. 19B is a schematic representation of four repulsive actuators that are linked together in a configuration that provides position output through three degrees of freedom.

In another N+1 configuration, the mechanism in FIG. 28B can be extended to three translational DOF by placing four actuators in the corners of a tetrahedron, such as is shown in FIG. 19B. The four actuators 1931 are fixed to ground on one end, and attached to pushers 1935 on the other end. The shape of the interface member 1933 can be spherical, to accommodate the three DOF.

It is possible to use more actuators than N+1, while still using less than 2N. For example, as discussed above, an actuator pair aligned with the z axis (into the page) could be added to the mechanism 833 of FIG. 28B. Here, the open loop position and stiffness could be independently controlled along the z axis, while the open loop position and stiffness in the xy plane would be coupled. Thus, adding actuators can be used to increase the open loop control options.

An advantage of using exactly N+1 actuators is that with a relatively small number of actuators, open loop position control is possible, and it is also possible to control the open loop stiffness of the entire mechanism. This may be helpful in the design of a micro-manipulator that is mounted at the end of a robotic arm. During high acceleration of the robotic arm, the stiffness of the micro-manipulator could be increased to avoid large deflections or vibrations. When the robotic arm slows down, the stiffness can be decreased and position control of the actuators in the micro-manipulator can be used to perform fine motion tasks that require low stiffness.

Activating N DOF with N Actuators

Figure 28C:
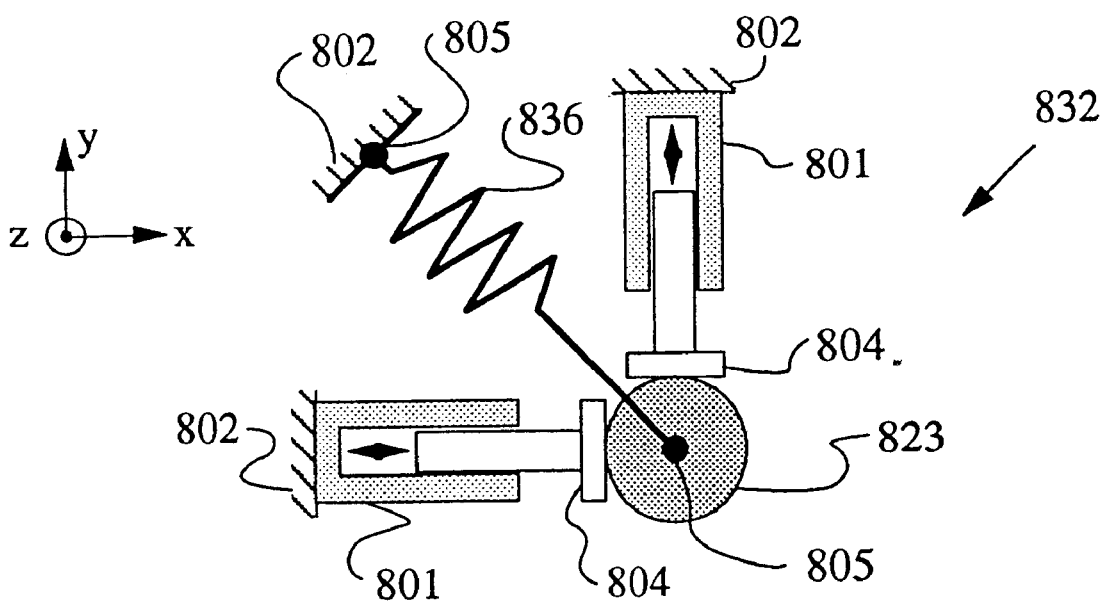
FIG. 28C is a schematic representation of an embodiment of the invention having two repulsive actuators, arranged orthogonally, and a spring, to actuate two degrees of freedom.

The number of actuators in a mechanism can be further decreased by using only N repulsive magnetic actuators for an N DOF mechanism. However, this approach requires use of at least one alternative force generators, such as the passive spring shown in FIG. 10A, or other type of actuator as shown in FIG. 10B. A two DOF mechanism with two repulsive magnetic actuators is shown in FIG. 28C. Here two actuators 801 are connected to a reference frame 802. A pusher member 804 is connected to each actuator, and pushes up against the interface member 823. Sliding motion is allowed between the pushers 804 and the interface member 823. Here the alternative opposing force is a spring 836, which is mounted through hinges 805 between ground and the interface member. In this embodiment, the spring 836 has an internal force that tends to shorten the spring, yet still generates a force that opposes the repulsive forces from both actuators.

The actuators in the mechanism 832 in FIG. 28C can generate forces and motion along both the x and y axes. As current is increased in the actuator aligned with the x axis, the force on the interface member 823 increases along the x direction, and in a similar fashion forces can be generated in the y direction using the other actuator. Since, both the x and y mechanism forces can be controlled, it is possible to implement closed loop control of the mechanism. Individual actuators can be controlled in the closed loop method shown in FIG. 22, and thereby the dynamics of the interface member can be controlled, including its position, velocity, acceleration, stiffness, or damping.

Open loop position control in both the x and y directions is also possible for the mechanism shown in FIG. 28C. For each current command provided to the actuators there exists a set position where the actuator force will be equal to the opposing spring force. In addition, the open loop stiffness of the mechanism varies as the current in the actuators are modified. Thus one could control the open loop stiffness of the mechanism, but motion of the set position would also occur. Thus, with a mechanism with N repulsive magnetic actuators it is not possible to independently control all N positions, and to control the stiffness in all N directions in an open loop fashion. An additional disadvantage of reducing the number of actuators in the mechanism, is that larger actuators would be required to achieve the same range of motion and force.

The actuators in FIG. 28C are aligned in a perpendicular orientation. Thereby the motion of one actuator controls the position of the interface member, in a direction that is independent of the other actuator. This uncoupled configuration simplifies the multi-DOF control of the mechanism. However, there are other types of mechanism where the motion of one of the actuators interact with motion of other actuators. One such example, is the Stewart platform shown in FIG. 29, which provides for six DOF of motion in the interface member. The embodiment shown in FIG. 29 uses N (here six) repulsive magnetic actuators 2901, together with a passive spring 2915. In addition, it is also possible to configure a Stewart platform in the N+1 configuration by replacing the spring with another repulsive actuator. The base plate 2911 is typically held stationary, and the top plate 2917 is the output member which has six DOF. The six actuators 2901 and the spring 2905 are linked to the base plate and top plate with ball joints 2913. In the embodiments shown in FIG. 29, the top plate is smaller than the bottom plate, and the actuators are angled inwards towards the top plate. However, all the actuators are aligned so that a component of their repulsive force pushes the top plate away from the bottom plate. The spring provides a force that pulls the top plate toward the bottom plate, and thus applies an opposing force for all the actuators. In this fashion the repulsive force in each actuator can be controlled to move the top plate. The geometry of the mechanism defines the relationship between actuator motion and the motion of the output member. This geometric relationship can be incorporated into the control method to achieve coordinate motion of the actuators, so that the desired six dimensional motion of the output member is achieved.

Figure 46:
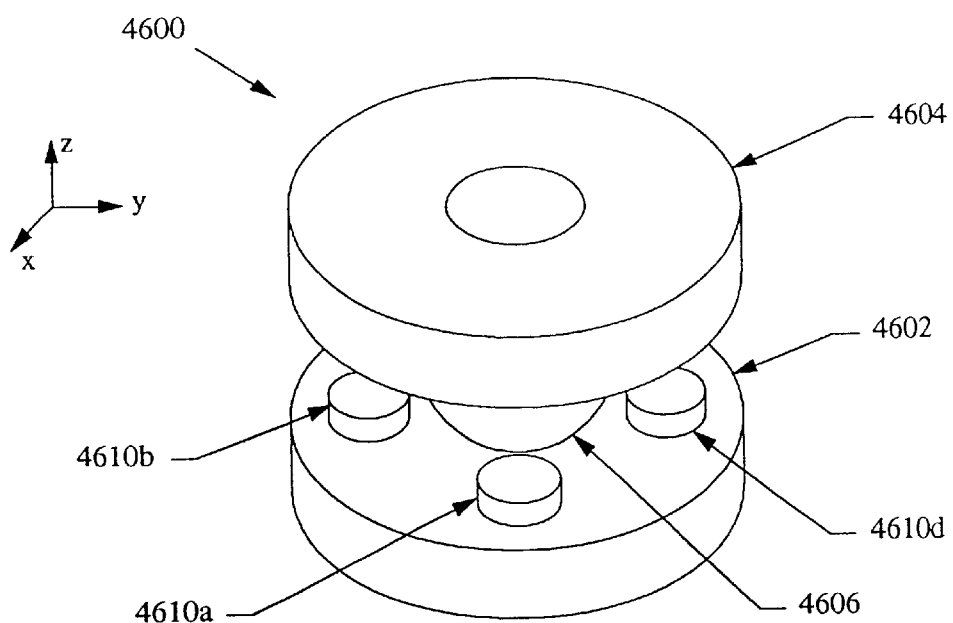
FIG. 46 shows schematically, in perspective view, an embodiment of an actuator unit of the invention, where a single moving magnet is shared among actuators of a multiple DOF apparatus.
Figure 46A:
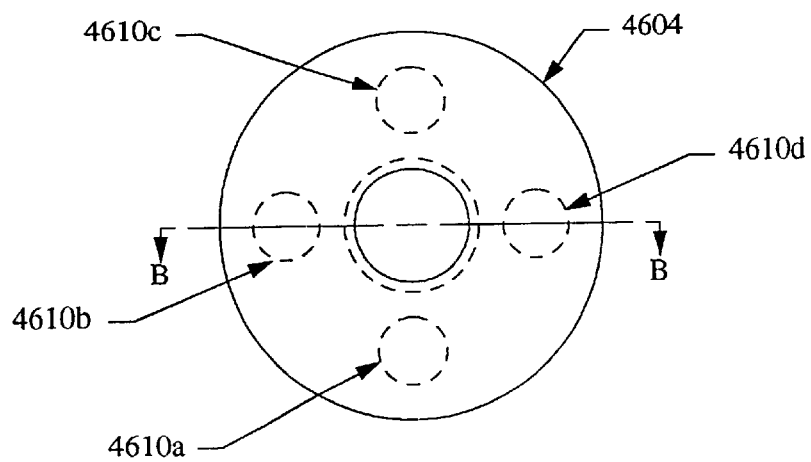
FIG. 46A shows schematically a top view of the shared moving magnet with multiple DOF apparatus shown in FIG. 46.
Figure 46B:
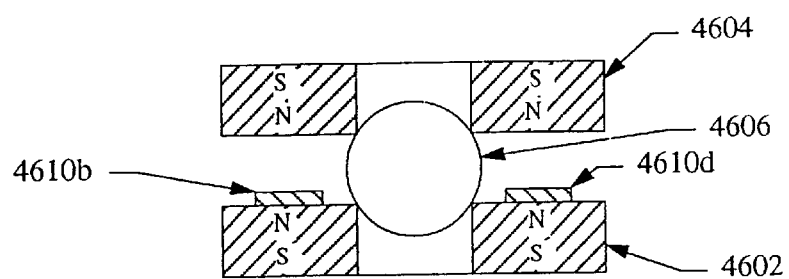
FIG. 46B shows schematically in a cross-sectional view at lines B—B of FIG. 46A, the shared moving magnet with multiple DOF apparatus shown in FIG. 46.

Sharing Magnets Among Multiple DOF: It is possible to share a single moving magnet among actuators of a multi-DOF mechanism. One such mechanism 4600 is shown in FIG. 46 in perspective, in top view in FIG. 46A, and in FIG. 46B, in section along lines B—B of FIG. 46A. In this embodiment, the interface member is a circular annular ring shaped magnet 4604, which is constrained by a spherical travel guide 4606. The travel guide allows rotation of the interface member about the x, y, and z axes. A second annular shaped magnet 4602 is the base of the mechanism. The magnets 4602 and 4604 are magnetized in an axial orientation such that they repel each other. One such orientation is shown in FIG. 46B by the North (N) and South (S) poles on the top and bottom surfaces of the magnets. Thus the upper surface of magnet 4602 repels the lower surface of magnet 4604. Any rotation of magnet 4604 about the x or y axes, will bring a region of one magnet 4604 closer to a region of the other magnet 4602. This will result in an increase in repulsive magnetic forces, which will tend to restore the interface member to its set position.

Electromagnets may be incorporated into the mechanism 4600 to modulate the magnetic forces. One such embodiment is shown in FIG. 46A by electromagnets 4610a, 4610b, 4610c, and 4610d. These electromagnets can be controlled to increase or decrease the repulsive magnetic forces applied to different regions of the moving magnet 4604. For example, if the electromagnet 4610d increases the repulsive force in its region, and electromagnet 4610b decreases the repulsive force in its region, then a torque will be applied to the moving magnet 4604 which will tend to rotate it about the x axis. The electromagnets may be controlled using the methods described in previous sections. One such approach to controlling rotation about the x and y axes would be to use three electromagnets equally spaced around the magnet 4602, in an analogous fashion to the mechanism shown in FIG. 28B. Another approach would be to use two electromagnets together with a passive spring, in an analogous fashion to the mechanism shown in FIG. 28C.

The spherical travel guide 4606 may be made of a ferromagnetic material, which would magnetically attract both magnets 4602 and 4604. Thus, the mechanism can be held together simply be magnetic forces. Alternatively, the travel guide may constructed as a traditional ball joint, with a mechanical means of constraining the motion of the moving magnet to rotate about a single point.

Figure 47A:
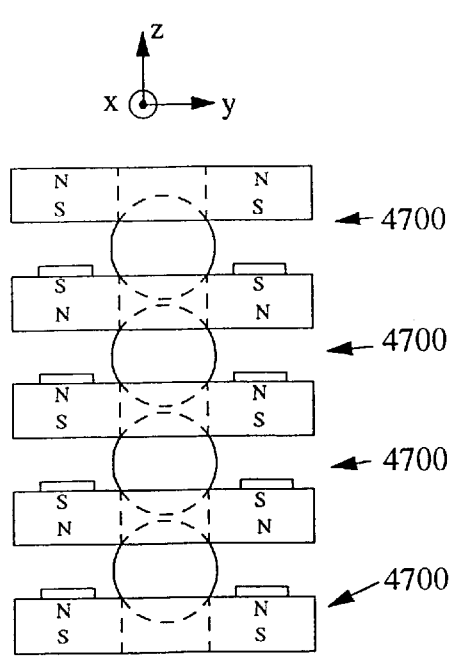
FIG. 47A shows schematically in a side view a mechanism with a high number of DOF constructed by combining a number of actuator assemblies of the ort shown in FIG. 46, in series, in a nominal home position.
Figure 47B:
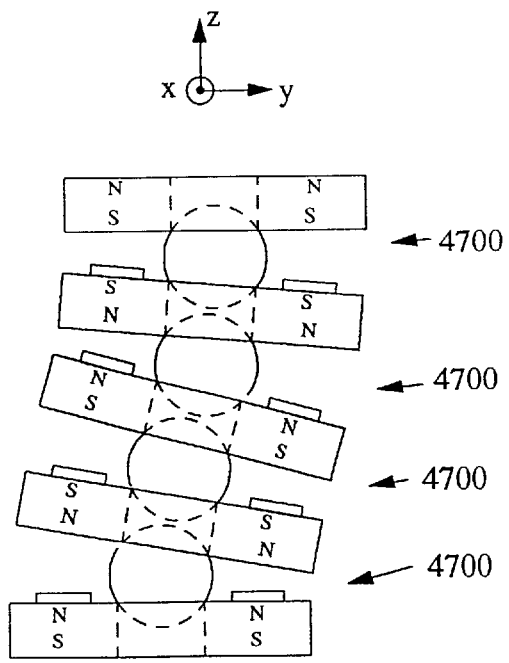
FIG. 47B shows schematically the embodiment shown in FIG. 47A in a displaced position.

A mechanism with a high number of DOF can be constructed by combining a number of mechanism units 4600 in series as shown in FIGS. 47A and 47B. The upper magnet on one mechanism unit serves as the base for the next mechanism unit. FIG. 47A shows a side view of the overall mechanism in its home position. It is possible to independently control the orientation of each of the mechanism units, and control the overall shape of the mechanism, as shown in FIG. 47B. This type of mechanism can thus move in a snake like fashion. Such a mechanism could be used as a robotic arm that could reach around corners, or as a medical device that can navigate through body orifices and cavities.

Figure 48:
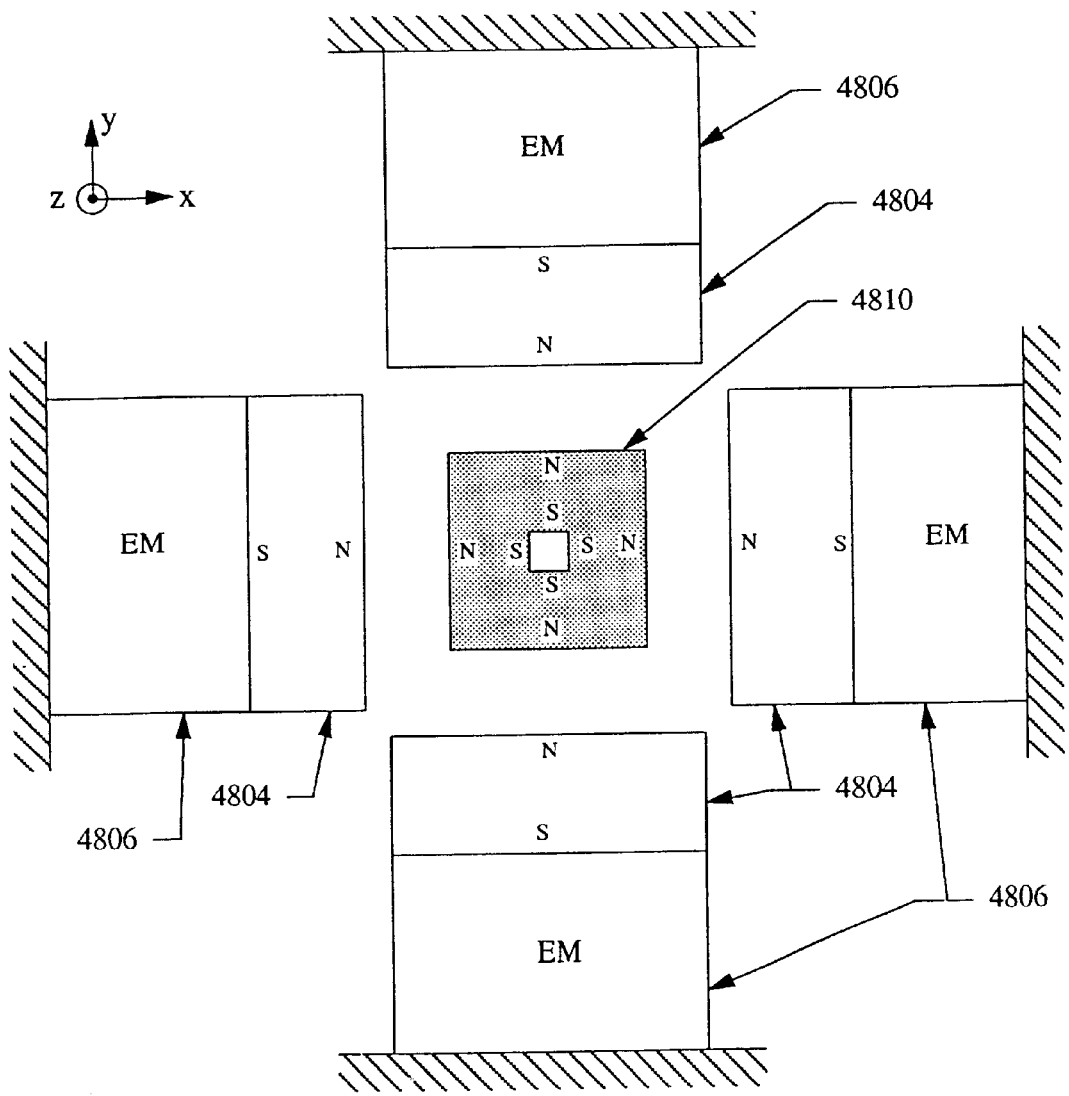
FIG. 48 shows schematically in a top view an embodiment that shares a singlemoving magnet within a two DOF mechanism.

Another embodiment that shares a single moving magnet within a two DOF mechanism is shown in FIG. 48. Here the interface member 4810 is a magnet with a square cross section, and is magnetized radially as shown. The interface member 4810 is constrained to move on the xy plane, and can be controlled in translation along the x and y axes. Four permanent magnets 4804 surround the interface member, and are oriented such that they repel the interface member towards the center of the mechanism. Four electromagnets 4806 are fixed to a corresponding permanent magnet, and held stationary relative to a reference frame. The electromagnets 4806 can be controlled to increase or decrease the repulsive force between the permanent magnets 4804 and the interface member 4810. Accordingly, the electromagnets 1806 can be controlled using the methods described previously to control the position and stiffness of the interface member.

Robotic End-Effector Application

Figure 44:
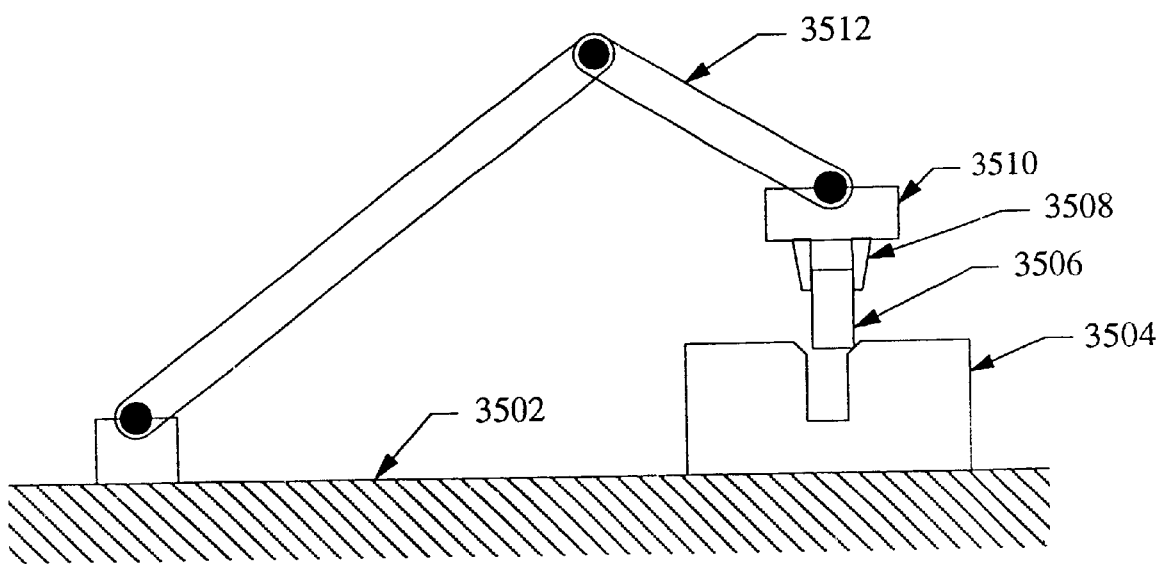
FIG. 44 shows schematically a robot arm equipped with an end-effector that uses opposing repulsive magnetic actuators.

One application of the mechanisms describe in the foregoing discussion is in robotics. As shown in FIG. 44, a robot arm 3512 is attached to a reference frame (ground) 3502. An end-effector 3510 attaches a robot gripper 3508 to the end of the robot arm. The end-effector 3510 uses opposing repulsive magnetic actuators, as described above. For example, the end effector may use a Stewart platform as shown in FIG.

29, or a planar mechanism such as the one shown in FIG. 28B. The gripper 3508 holds a peg shaped part 3506, which is being inserted into a workpiece 3504. The workpiece is fixed relative to the reference frame.

The end-effector 3510 can serve as a micro-manipulator, or compliant device to improve robot performance. For example, the end-effector 3510 can be used to correct for misalignments between the part 3506 and the workpiece 3504. One method for accommodating part misalignment, is to hold the part with compliance, so that mating parts can be inserted without excessive contact forces that may damage the parts. This compliance can easily be achieved with end-effector 3510, using open loop stiffness control (as described above) with a low stiffness setting. However, low compliance can be detrimental during high accelerations of the robot arm, and result in excessive deflections and vibrations. Accordingly, it is advantageous to increase the stiffness of the end-effector 3510 during high accelerations. The end-effector can easily accommodate these needs using its open loop stiffness control capabilities.

In FIG. 44, the part 3506 is in contact with the workpiece 3504, and thus there may be an interaction force between them. The interaction force applied onto the workpiece 3504 is equal and opposite to the force applied onto the part 3506. During static equilibrium, the interaction force applied onto the workpiece follows a load path through the workpiece and into the reference frame. In a similar fashion, the interaction force applied onto the part follows a load path through the part, then through the end-effector, and finally through the robot arm into the same reference frame. Within the end-effector 3510, the load path may travel from the base of the mechanism through opposing repulsive magnetic actuators, to the output member of the mechanism. The load on the output member is balanced by contact with the part 3506 that also has a load path to the reference frame. Thus, the force applied to the output member of the end-effector, travels through a load path to the reference frame.

In a similar fashion any of the mechanisms described in the foregoing discussion, can apply a force through its output member onto another object that has a load path through solid members to the reference frame of the mechanism.

Summary: The foregoing discussion presents actuators that utilize repulsive magnetic forces. These actuators have been combined in numerous configurations to create a variety of mechanisms. In many of these mechanisms, the force from an actuator is opposed by another actuator or an alternative source.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The corresponding structures, materials, acts and equivalents of all means or step plus function elements in the claims below are intended to include any structure, material, or acts for performing the functions in combination with other claimed elements as specifically claimed.

Although only a few exemplary embodiments of this invention have been described in detail above, those skilled in the art will readily appreciate that many modifications are possible in the exemplary embodiments without materially departing from the novel teachings and advantages of this invention. Accordingly all such modifications are intended to be included within the scope of this invention as defined in the following claims. In the claims, means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

Having described the invention, what is claimed is:

1. An actuator comprising:
   a. an electromagnet, fixed relative to a reference body;
   b. a second magnet, movable relative to said reference body;
   c. a third magnet, fixed relative to said reference body and oriented relative to said second magnet such that magnetic repulsion arises between said second and third magnets; and
   d. a travel guide, arranged to constrain motion of said second magnet relative to said reference body, so that said second magnet is movable relative to said travel guide and so that magnetic repulsion between said second and third magnets is maintained non-zero;
   said electromagnet being shaped and spaced relative to said second and third magnets to generate a magnetic field that:
      i. counters any magnetic repulsion that arises between said second and third magnets it current is applied to said electromagnet in a first direction;
      ii. enhances any magnetic repulsion that arises between said second and third magnets if current is applied to said electromagnet in a second, opposite direction; and
      iii. one of said electromagnet and said second magnet, has an internal open space, sized and arranged relative to the other of said electromagnet and said second magnet, such that a portion of the other of said electromagnet and said second magnet is locatable inside said internal open space.

2. The actuator of claim 1, further comprising a fourth magnet, movable relative to said reference body, said fourth magnet being spaced from said second magnet and arranged such that magnetic repulsion arises between said second and fourth magnets, said fourth magnet being constrained in its motion so that said magnetic repulsion between said second and fourth magnets is maintained non-zero.

3. The actuator of claim 1, said internal open space of one of said electromagnet and said second magnet comprising a circular space.

4. The actuator of claim 1, where in s aid magnet having said open internal space is said electromagnet.

5. The actuator of claim 1, wherein said magnet having said open internal space is said movable second magnet.

6. The actuator of claim 1, said travel guide comprising a rod located within said internal open space.

7. An actuator comprising:
   a. an electromagnet;
   b. a second magnet, movable relative to a reference body;
   c. a third magnet, fixed relative to said reference body and oriented relative to said second magnet such that magnetic repulsion arises between said second and third magnets;
   d. a fourth magnet, movable relative to said reference body and said second magnet and oriented relative to said second magnet such that magnetic repulsion arises between said second and fourth magnets; and d. a travel guide, arranged to constrain motion of said second and fourth magnets relative to said reference body, so that said second and fourth magnets are movable relative to said travel guide and so that magnetic repulsion between said second and third magnets and between said second and fourth magnets is maintained non-zero;

said electromagnet being shaped and located relative to said first, second and fourth magnets to generate a magnetic field that:
  i. counters any magnetic repulsion that arises between said second and third magnets if current is applied to said electromagnet in a first direction; and
  ii. enhances any magnetic repulsion that arises between said second and third magnets if current is applied to said electromagnet in a second, opposite direction.

8. The actuator of claim 7, said electromagnet being located concentric with said second magnet.

9. The actuator of claim 7, said electromagnet being fixed relative to said reference, and being located between said third and said second magnets.

10. The actuator of claim 9, further comprising a fifth magnet, which is an electromagnet, being fixed relative to one of said movable second and fourth magnets, being located between said third and said second magnets, to generate a magnetic field that:
  a. counters any magnetic repulsion that arises between said second and fourth magnets if current is applied to said electromagnet in a first direction; and
  b. enhances any magnetic repulsion that arises between said second and fourth magnets if current is applied to said electromagnet in a second, opposite direction.

11. An actuator comprising:

a. at least one electromagnet;

b. a second magnet, movable relative to a reference body;

c. a third magnet, fixed relative to said reference body and oriented relative to said second magnet such that magnetic repulsion arises between said second and third magnets;

d. a fourth magnet, movable relative to said reference body and said second magnet and oriented relative to said second magnet such that magnetic repulsion arises between said second and fourth magnets; and d. a travel guide, arranged to constrain motion of said second and fourth magnets relative to said reference body, so that said second and fourth magnets are movable relative to said travel guide and so that magnetic repulsion between said second and third magnets and between said second and fourth magnets is maintained non-zero; and e. a current director that controls the flow of current to said electromagnet based on the location of said second magnet relative to said reference body;

said electromagnet being shaped and located relative to said first, second and fourth magnets to generate a magnetic field that:
  i. counters any magnetic repulsion that arises between said second and fourth magnets if current is applied to said electromagnet in a first direction; and
  ii. enhances any magnetic repulsion that arises between said second and fourth magnets if current is applied to said electromagnet in a second, opposite direction.

12. The actuator of claim 11, said current director comprising a sliding electrical contact between said second magnet and said travel guide.

13. An actuator unit comprising:

a. a first actuator member comprising:
  i. a first magnetic region; and
  ii. a second magnetic region, coupled to said first magnetic region such that motion of one magnetic region with respect to a reference results in motion of the other region with respect to said reference;

b. a second actuator member, comprising:
  i. a first magnetic region, arranged to magnetically repel said first magnetic region of said first actuator member; and
  ii. a second magnetic region, arranged to simultaneously magnetically repel said second magnetic region of said first actuator member;

said second actuator member being arranged relative to said first actuator member such that said first and second magnetic regions are in opposition relative to each other;

c. an electromagnet, arranged with respect to said first magnetic regions of said first and second actuator members to generate a magnetic field that:
  i. counters any magnetic repulsion that arises between said first magnetic regions, if current is applied to said electromagnet in a first direction; and
  ii. enhances any magnetic repulsion that arises between said first magnetic regions if current is applied to said electromagnet in a second, opposite direction.

14. The actuator unit of claim 13, said first magnetic actuator member comprising a permanent magnet.

15. The actuator unit of claim 14, said second magnetic actuator member comprising a permanent magnet.

16. The actuator unit of claim 13, said first and second magnetic regions comprising spaced apart regions of said permanent magnet.

17. The actuator unit of claim 13, further comprising a travel guide, coupled to said first magnetic actuator member such that it is supported during motion through an actuator member DOF in response to variations in said magnetic repulsion arising between said first regions of said first and second actuator members, such that the magnitude of said opposing magnetic repulsion is maintained non-zero.

* * * * *